(12) United States Patent
Saeda et al.

(10) Patent No.: US 11,704,520 B2
(45) Date of Patent: Jul. 18, 2023

(54) IMAGE FORMING APPARATUS, IMAGE FORMING SYSTEM AND CONTROL METHOD OF IMAGE FORMING APPARATUS

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/573,977

(22) Filed: Jan. 12, 2022

(65) Prior Publication Data
US 2022/0230029 A1    Jul. 21, 2022

(30) Foreign Application Priority Data

Jan. 15, 2021   (JP) .................................. 2021-004615
Jan. 15, 2021   (JP) .................................. 2021-004616

(51) Int. Cl.
*G06K 15/02*     (2006.01)
*G06F 3/12*      (2006.01)

(52) U.S. Cl.
CPC ....... *G06K 15/1828* (2013.01); *G06F 3/1205* (2013.01); *G06F 3/1208* (2013.01); *G06F 3/1256* (2013.01); *G06K 15/1831* (2013.01); *G06F 3/12* (2013.01)

(58) Field of Classification Search
CPC .......... G06K 15/1828; G06K 15/1831; G06K 15/1825; G06K 15/1882; G06K 15/1822; G06F 3/1205; G06F 3/1208; G06F 3/1256; G06F 3/12
USPC .......................................................... 358/1.1
See application file for complete search history.

(56) References Cited

U.S. PATENT DOCUMENTS

| | | | |
|---|---|---|---|
| 9,420,121 B2* | 8/2016 | Grosz | G06Q 10/00 |
| 2002/0060805 A1* | 5/2002 | Tomita | G06F 3/1208 |
| | | | 358/1.15 |
| 2009/0109227 A1* | 4/2009 | Leroy | G06T 11/203 |
| | | | 345/467 |

FOREIGN PATENT DOCUMENTS

JP    2016-047606 A    4/2016

* cited by examiner

*Primary Examiner* — Darryl V Dottin
(74) *Attorney, Agent, or Firm* — ScienBiziP, P.C.

(57) ABSTRACT

An image forming apparatus has an office direct print function, and when a non-installed font that is not installed in the image forming apparatus is included in application data, a font substitution guidance screen is displayed on a display. A drop-down list that is an operator for selecting a substitute font is provided in the font substitution guidance screen, whereby a user can arbitrarily select a substitute font. The font substitution guidance screen displays also a sample character group having a typeface according to the selected substitute font.

11 Claims, 25 Drawing Sheets

| NON-INSTALLED FONT | REGULAR FONT |
|---|---|
| ⋮ | ⋮ |

| NON-INSTALLED FONT | SUBSTITUTE FONT | SUBSTITUTION POSITION | ------- |
|---|---|---|---|
| ⋮ | ⋮ | ⋮ | ⋮ |

IMAGE FORMING APPARATUS, IMAGE FORMING SYSTEM AND CONTROL METHOD OF IMAGE FORMING APPARATUS

CROSS REFERENCE OF RELATED APPLICATION

This application claims priorities to Japanese Patent Application Nos. 2021-004615 and 2021-004616 both filed on Jan. 15, 2021, and the entire contents of which are incorporated herein by reference.

BACKGROUND OF THE INVENTION

Field of the Invention

The present invention relates to an image forming apparatus, an image forming system comprising the image forming apparatus and a control method of the image forming apparatus.

Description of the Related Art

In a Japanese patent application laying-open No. 2016-47606 (Literature 1), there is disclosed a technology that when font substitution occurs through analyzing print data (print job) received from a client device such as a personal computer (PC), in an image forming apparatus such as a printer, a multifunction peripheral (MFP), a preview image of a page that such font substitution occurs is displayed. According to this technology, when the font substitution occurs, a user can recognize that prior to a print job is executed. In addition, a font adopted for the font substitution, that is, a substitute font is selected automatically.

Then, there is an image forming apparatus having an office direct print function that can receive an input of application data (so-called office files such as document files and spreadsheet files) created by predetermined application software (so-called office software such as word processing software and spreadsheet software), and execute a print job based on such application data. According to this office direct print function, it is possible to directly execute a print job based on the application data created by the predetermined application software (of a certain software company) without using print job generation device such as a personal computer. Moreover, in the office direct print function in recent years, it is possible to support not only application data created by the predetermined application software but also application data created by compatible application software that is compatible with the predetermined application software. On the other hand, since there are various types of fonts (typeface data) included in the application data, multiple types of fonts are installed (prepared) in the image forming apparatus.

However, depending on the application data, especially depending on the application data created by the compatible application software, the same font included in the application data, that is, an original font (standard font) may not be installed in the image forming apparatus. In other words, there is an occasion that a font that is not installed in the image forming apparatus, that is, a non-installed font is included in the application data. In this case, a print job is executed by substituting the non-installed font with any one of fonts installed in the image forming apparatus. In addition, the substitute font to be substituted for the non-installed font is conventionally automatically selected as in the technology disclosed in Literature 1 described above.

Here, if the substitute font can be arbitrarily selected by a user that operates an image forming apparatus, for example, it is very useful for the user. Specifically, there is an occasion that a print result of character to which the substitute font is applied may differ from an expected (original) print result depending on the substitute font, that is, the expected print result may not be obtained. Extremely, some of characters to which the substitute font is applied, that is, a part of object (character or letter, photograph, pattern or figure, etc.) may protrude from a print range. Therefore, if the user can select a substitute font arbitrarily, it is very useful for the user, such as obtaining a print result close to what is expected.

Furthermore, for example, if there is a measure to execute a print job in a state where the original font that is the non-installed font is applied as it is without substituting for the non-installed font, there is an occasion that the user wants to select such a measure. On the other hand, the non-installed font may be allowed to be substituted if there is no particular inconvenience, such as no significant influence on the print result even if the non-installed font is substituted. Therefore, when a non-installed font is included in the application data, if there are a plurality of options including a first option that a print job is executed with being substituted for the non-installed font and a second option that a print job is executed with being applied with the non-installed font that is the original font as it is, it is very useful for the user.

SUMMARY OF THE INVENTION

It is a primary object of the present invention is to provide a novel image forming apparatus, image forming system and control method of image forming apparatus.

It is a first object of the present invention is to provide a novel technology that in an image forming apparatus having an office direct print function, when a non-installed font is included in the application data, a user can arbitrarily select a non-installed font for a substitute font to be substituted for the non-installed font.

It is a second object of the present invention is to provide a novel technology that it is possible to present to the user a plurality of options including a first option that a print job is executed with substituting the non-installed font and a second option that a print job is executed with being applied with the non-installed font as it is.

In order to achieve a first object, the present invention includes a first embodiment concerning an image forming apparatus, and a second embodiment concerning a control method of an image forming apparatus.

An image forming apparatus according to the first embodiment has an office direct print function. Specifically, the image forming apparatus according to the first embodiment is capable of receiving an input of application data created by predetermined application software or application data created by compatible software that is compatible with the predetermined application software, and executing a print job based on the application data.

Moreover, the image forming apparatus according to the first embodiment comprises a font data storage unit; a font determination unit; a guidance unit; a selection operation reception unit; and a display unit. The font data storage unit stores font data on multiple types of fonts. The font determination unit determines whether a non-installed font is included in application data. The non-installed font referred to here is a font of type different from those of the multiple types of fonts based on the font data stored in the font data storage unit, that is, a font that is not installed in the image forming apparatus.

Furthermore, the guidance unit performs guidance to a user, when it is determined by the font determination unit that the non-installed font is included in the application data, that it is possible for the user to select the non-installed font to be substituted with any of the multiple types of fonts installed in the image forming apparatus. Then, the selection operation reception unit receives a selection operation that is performed by the user in response to the guidance by the guidance unit. This selection operation is an operation for selecting a substitute font that is to be substituted for the non-installed font out of the multiple types of fonts installed in the image forming apparatus.

In addition, the display unit includes a character data storage unit and a display execution unit, for example. The character data storage unit is stored with predetermined character data. Then, the display execution unit displays the character with the substitute font by applying the substitute font to the character data stored in the character data storage unit.

Aside from this, the display unit may also include an extraction unit and a display execution unit, for example. The extraction unit extracts a part or all the character data to which the non-installed font in the application data is applied. Then, the display execution unit displays the character with the substitute font by applying the substitute font to the part or all the character data included in the extracted data, that is, the character data included in the application data.

In the first embodiment, a first preview image display unit may be further provided with. The first preview image display unit displays a first preview image based on the application data after the non-installed font is substituted with the substitute font.

Moreover, in the first embodiment, a first protrusion judgement unit and a first information output unit may be further provided with. The first protrusion judgement unit judges whether an object included in a print result by the print job based on the application data after the non-installed font is substituted with the substitute font may protrude from a print range by the print job. Then, the first information output unit outputs first predetermined information when it is determined by the first protrusion judgement unit that the object included in the print result may protrude from the print range by the print job.

Moreover, in the first embodiment, a second protrusion judgement unit and a narrowing unit may be further provided with. Moreover, the second protrusion judgement unit assumes that the non-installed font is substituted with each of the multiple types of fonts installed in the image forming apparatus. The second protrusion judgement unit judges whether an object included in a print result by the print job based on the application data after the non-installed font is substituted with each of the fonts installed in the image forming apparatus may protrude from a print range by the print job. Then, the narrowing unit narrows down selection candidate for a selection operation by the user so that only a substitution adaptive font out of the multiple types of fonts installed in the image forming apparatus can be selected by the selection operation by the user. The substitution adaptive font referred to here is a font that is determined by the second protrusion judgement unit that the object included in the print result may not protrude from the print range by the print job.

In the structure that such a second protrusion judgement unit and a narrowing unit are comprised, a second information output unit may be further provided with. The second information output unit outputs second predetermined information when no substitution adaptive font exists.

The control method of an image forming apparatus concerning the second embodiment according to the present invention includes a font determination step; a guidance step; a selection operation reception step; and a display step. Here, the image forming apparatus has an office direct print function. Specifically, the image forming apparatus is capable of receiving an input of application data created by predetermined application software or application data created by compatible software that is compatible with the predetermined application software, and executing a print job based on the application data. Moreover, the image forming apparatus comprises a font data storage unit. The font data storage unit stores font data on multiple types of fonts.

Moreover, the font determination step determines whether a non-installed font is included in application data. The non-installed font referred to here is a font of type different from those of the multiple types of fonts based on the font data stored in the font data storage unit, that is, a font that is not installed in the image forming apparatus.

Then, in the guidance step, it is guided to a user that it is possible for the user to select the non-installed font to be substituted with any of the multiple types of fonts installed in the image forming apparatus when it is determined by the font determination step that the non-installed font is included in the application data. Furthermore, in the selection operation reception step, a selection operation that is performed by the user in response to the guidance in the guidance step is received. This selection operation is an operation for selecting a substitute font that is to be substituted for the non-installed font out of the multiple types of fonts installed in the image forming apparatus. Then, in the display step, a character with the substitute font selected by the selection operation is displayed when the selection operation is received in the selection operation reception step.

In order to achieve the second object, the present invention includes a third embodiment concerning an image forming apparatus, a fourth embodiment concerning an image forming system comprising such an image forming apparatus, and a fifth embodiment concerning a control method of an image forming apparatus.

The third embodiment concerning the image forming apparatus has an office direct print function. Specifically, the image forming apparatus according to the third embodiment is capable of receiving an input of application data created by predetermined application software or application data created by compatible software that is compatible with the predetermined application software, and executing a print job based on the application data.

Moreover, the image forming apparatus according to the third embodiment comprises a font data storage unit; a font determination unit; a presentation unit; an operation reception unit; and a processing execution unit. The font data storage unit stores font data on multiple types of fonts. The font determination unit determines whether a non-installed font is included in application data. The non-installed font is a font of type different from those of the multiple types of fonts based on the font data stored in the font data storage unit, that is, a font that is not installed in the image forming apparatus. The presentation unit presents a plurality of options to a user. The operation reception unit receives an operation by the user. Then, the processing execution unit executes processing according to the operation received by the operation reception unit.

Specifically, the presentation unit presents a first option and a second option when it is determined by the font determination unit that a non-installed font is included in the application data. The first option is an option that a print job is executed after the non-installed font is substituted with a substitute font corresponding to the non-installed font out of multiple types of fonts that are installed in the image forming apparatus. On the other hand, the second option is an option that a print job is executed in a state where the non-installed font is applied as it is.

Then, the processing execution unit executes first processing according to the first option when an operation for selecting the first option is received by the operation reception unit. On the other hand, the processing execution unit executes second processing according to the second option when an operation for selecting the second option is received by the operation reception unit.

The second processing includes transmission processing that transmits the application data to an external support device. The support device is a device capable of converting the application data into predetermined format data that a print job can be executed in a state where the non-installed font is applied as it is.

In addition, the second processing may further include reception processing that receives the predetermined format data converted by the support device from the support device.

In the third embodiment, a second preview image display unit may be further provided with. The second preview image display unit displays a second preview image indicating an image that is expected to be formed by the print job according to the first processing or the second processing.

Moreover, the presentation unit may present a third option in addition to the first option and the second option. The third option is an option that guides to the user first procedure for converting the application data into predetermined format data by a first device that is an external device other than the support device. The processing execution unit executes third processing according to the third option when an operation for selecting the third option is received by the operation reception unit.

Specifically, the processing execution unit makes the presentation unit present a first guidance option and a second guidance option as the third processing. The first guidance option is an option that outputs first access information for accessing a first website that the first procedure is disclosed. Then, the second guidance option is an option that outputs first procedure information indicative of the first procedure. Moreover, the processing execution unit executes first guidance processing according to the first guidance option when an operation for selecting the first guidance option is received by the operation reception unit. On the other hand, the processing execution unit executes second guidance processing according to the second guidance option when an operation for selecting the second guidance option is received by the operation reception unit.

Furthermore, in the third embodiment, it may be impossible to convert the application data into the predetermined format data by the support device. A guidance unit may be provided with in order to deal with such a case. The guidance unit guides to the user second procedure for converting the application data into the predetermined format data by a second device that is a further external device different from the support device when it is impossible to convert the application data into predetermined format data by the support device.

Specifically, the guidance unit makes the presentation unit present a third guidance option and a fourth guidance option. The third guidance option is an option that second access information for accessing a second website that discloses the second procedure is output. The fourth guidance option is an option that second procedure indicative of the second procedure is output. Furthermore, the guidance unit makes the processing execution unit execute third guidance processing according to the third guidance option when an operation for selecting the third guidance option is received by the operation reception unit. On the other hand, the guidance unit makes the processing execution unit execute fourth guidance processing according to the fourth guidance option when an operation for selecting the fourth guidance option is received by the operation reception unit. Thus, the guidance unit guides the second procedure to the user.

In the third embodiment, a third protrusion judgement unit may be further provided with. The third protrusion judgement unit judges whether an object included in the application data may protrude from a print range by the print job based on the application data when an operation for selecting the above-described first option is received by the operation reception unit prior to the first processing is executed by the processing execution unit.

Here, when it is judged by the third judgement unit that the object may protrude from the print range by the print job, the presentation unit presents to the user a fourth option and a fifth option. The fourth option is an option that the print job is executed in a state where the non-installed font is applied as it is. On the other hand, the fifth option is an option that guides to the user third procedure for converting the application data into the predetermined format data by a third device that is an external device different from the support device.

Then, the processing execution unit executes the above-described second processing when an operation for selecting the fourth option is received by the operation reception unit. On the other hand, the processing execution unit executes the fifth processing according to the fifth option when an operation for selecting the fifth option is received by the operation reception unit.

Furthermore, the processing execution unit shelves the first processing when it is judged by the third protrusion judgement unit that the object included in the application data may protrude from the print range by the print job even if the operation for selecting the first option is received by the operation reception unit. On the other hand, the processing execution unit executes the first processing when it is judged by the third protrusion judgement unit that the object included in the application data may not protrude from the print range by the print job.

Here, the processing execution unit may make the presentation unit present a fifth guidance option and a sixth guidance option as the fifth processing. The fifth guidance option is an option that third access information for accessing a third website that discloses third procedure is output. Then, the sixth guidance option is an option that third procedure information indicative of the third procedure is output. Moreover, the processing execution unit executes fifth guidance processing according to the fifth guidance option when an operation for selecting the fifth guidance option is received by the operation reception unit. On the other hand, the processing execution unit executes sixth guidance processing according to the sixth guidance option when an operation for selecting the sixth guidance option is received by the operation reception unit.

An image forming system concerning a fourth embodiment according to the present invention comprises the image forming apparatus according to the third invention and the above-described support device.

A control method of an image forming apparatus concerning a fifth embodiment according to the present invention includes a font determination step; a presentation step; an operation reception step; and a processing execution step.

Here, the image forming apparatus has an office direct print function. Specifically, the image forming apparatus according to the first embodiment is capable of receiving an input of application data created by predetermined application software or application data created by compatible software that is compatible with the predetermined application software, and executing a print job based on the application data. The image forming apparatus is provided with a font storage unit. The font data storage unit stores font data on multiple types of fonts.

Moreover, it is determined whether a non-installed font is included in the application data in the font determination step. In the presentation step, a plurality of options are presented to a user. In the operation reception unit, an operation by the user is received. Then, a plurality of options are presented to a user in the presentation step. Furthermore, an operation by the user is received in the operation reception step. Then, processing according to the operation received in the operation reception step is executed in the processing execution step.

Specifically, in the presentation step, a first option and a second option are presented when it is determined in the font determination step that a non-installed font is included in the application data. The first option is an option that a print job is executed after the non-installed font is substituted with a substitute font corresponding to the non-installed font out of multiple types of fonts that are installed in the image forming apparatus. On the other hand, the second option is an option that a print job is executed in a state where the non-installed font is applied as it is.

Then, in the processing execution step, first processing according to the first option is executed when an operation for selecting the first option is received in the operation reception step. On the other hand, in the processing execution step, second processing according to the second option is executed when an operation for selecting the second option is received in the operation reception step.

The second processing includes transmission processing that transmits the application data to an external support device. The support device is a device capable of converting the application data into predetermined format data that a print job can be executed in a state where the non-installed font is applied as it is.

The above mentioned objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view conceptually showing structure of a regular font table in the first embodiment.

FIG. 8 is an illustrative view conceptually showing structure of a font substitution implement table in the first embodiment.

DETAILED DESCRIPTION OF NON-LIMITING EXAMPLE EMBODIMENTS

First Embodiment

Figure 1:
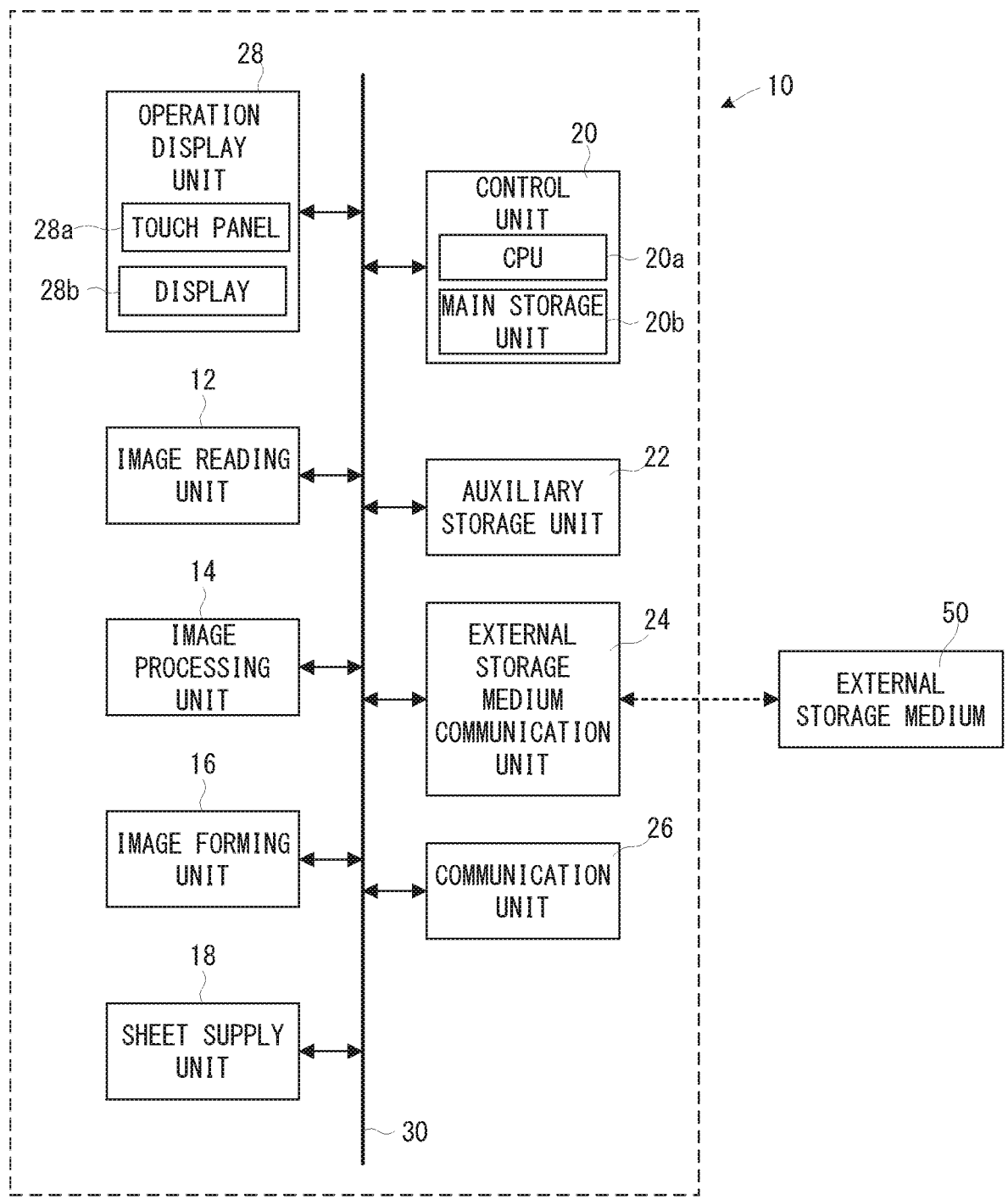
FIG. 1 is a block diagram showing electric structure of a multifunction peripheral related to a first embodiment according to the present invention.

A first embodiment according to the present invention will be described by taking a multifunction peripheral 10 as an example.

The multifunction peripheral 10 is provided with multiple functions such as a copying function, a printer function, a image scanner function, a facsimile function, etc. Therefore, the multifunction peripheral 10 comprises an image reading unit 12, an image processing unit 14, an image forming unit 16 and a sheet feeder 18. The multifunction peripheral 10 further comprises a control unit 20, an auxiliary storage unit 22, an external storage medium communication unit 24 and a communication unit 26. Furthermore, the multifunction peripheral 10 is provided with an operation display 28. These components are mutually connected via a common bus 30.

The image reading unit 12 is an example of an image reading means. Specifically, the image reading unit 12 bears image reading processing that reads an image of an original not shown, and outputs two-dimensional read image data according to the read image. Therefore, the image reading unit 12 is provided with an original platen not shown on which the original is put. Moreover, the image reading unit 12 is provided with an image reader including a light source, a plurality of mirrors, a focus lens, a line sensor, etc., and a drive mechanism for moving tan image reading position by the image reading unit, etc., all not shown. Furthermore, the image reading unit 12 is provided with a platen cover not shown for pressing down the original placed on the original platen. In addition, the platen cover may be provided with an automatic document feeder (ADF) not shown that is one of optional devices.

The image processing unit 14 is an example of an image processing means. Specifically, the image processing unit 14 performs suitable image processing to various kinds of image data such as the above-described read image data. Such an image processing unit 14 has an image processing execution means such as a DSP not shown. Processing for generating preview image data described later is included in the image processing by this image processing unit 14.

The image forming unit 16 is an example of an image forming means. Specifically, the image forming unit 16 bears image forming processing that forms an image based on image data such as data after the image processing by the image processing unit 14 on a sheet not shown as an image recording medium, that is, a print job. This print job is performed by a known electrophotography system (Carlson process system), for example. Therefore, the image forming unit 16 is provided with a photoreceptor drum, an electrostatic charge device, an exposure device, a development device, a transfer device, a fixing device, a cleaning device, a discharge device, etc. A sheet after the print job by this image forming unit 16, that is, a printed sheet is discharged onto a sheet discharge tray not shown. In addition, the image forming unit 16 may perform a print job with other systems such as an inkjet print system, not limited to the electrophotography system.

The sheet feeding unit 18 is an example of a sheet feeding means. Specifically, the sheet feeding unit 18 has one or more sheet feeding cassettes not shown, for example. In each sheet feeding cassette, sheets of a suitable predetermined size are contained. Furthermore, the sheet feeding unit 18 includes one or more manual feeding trays not shown, for example. Sheets of a suitable specified size are also set on the manual sheet feeding tray. Then, the sheet feed unit 18 supplies a sheet from any of the sheet feeding cassettes or the manual sheet feeding tray as the sheet feed source to the image forming unit 16 one by one.

The control unit 20 is an example of a control means that is in charge of overall control of the multifunction peripheral 10. Therefore, the control unit 20 has a computer as a control execution means, for example, a CPU 20a. Moreover, the control unit 20 includes a main storage unit 20b as a main storage means to which the CPU 20a can access directly. The main storage unit 20b includes a ROM and a RAM not shown, for example. A control program for controlling an operation of the CPU 20a, that is, firmware is stored in the ROM. The RAM constitutes a working area and a buffer area at the time of the CPU 20a executing processing based on the control program.

The auxiliary storage unit 22 is an example of an auxiliary storage means. Specifically, various data including various image data such as the above-described read image data are appropriately stored by the auxiliary storage unit 22. Such an auxiliary storage unit 22 has a hard disk drive not shown, for example. The auxiliary storage unit 22 may have a rewritable nonvolatile memory such as a flash memory, etc.

The external storage medium communication unit 24 is an example of an external storage medium communication means. Specifically, the external storage medium communication unit 24 has an attachment port to which a portable external storage medium 50 is attachable. Then, the external storage medium communication unit 24 bears bidirectional communication processing with the external storage medium 50 attached to the attachment port. In addition, as the external storage medium 50, a semiconductor medium such as a USB memory, an SD memory card, etc. and a disk type medium such as a CD and a DVD.

Figure 22:
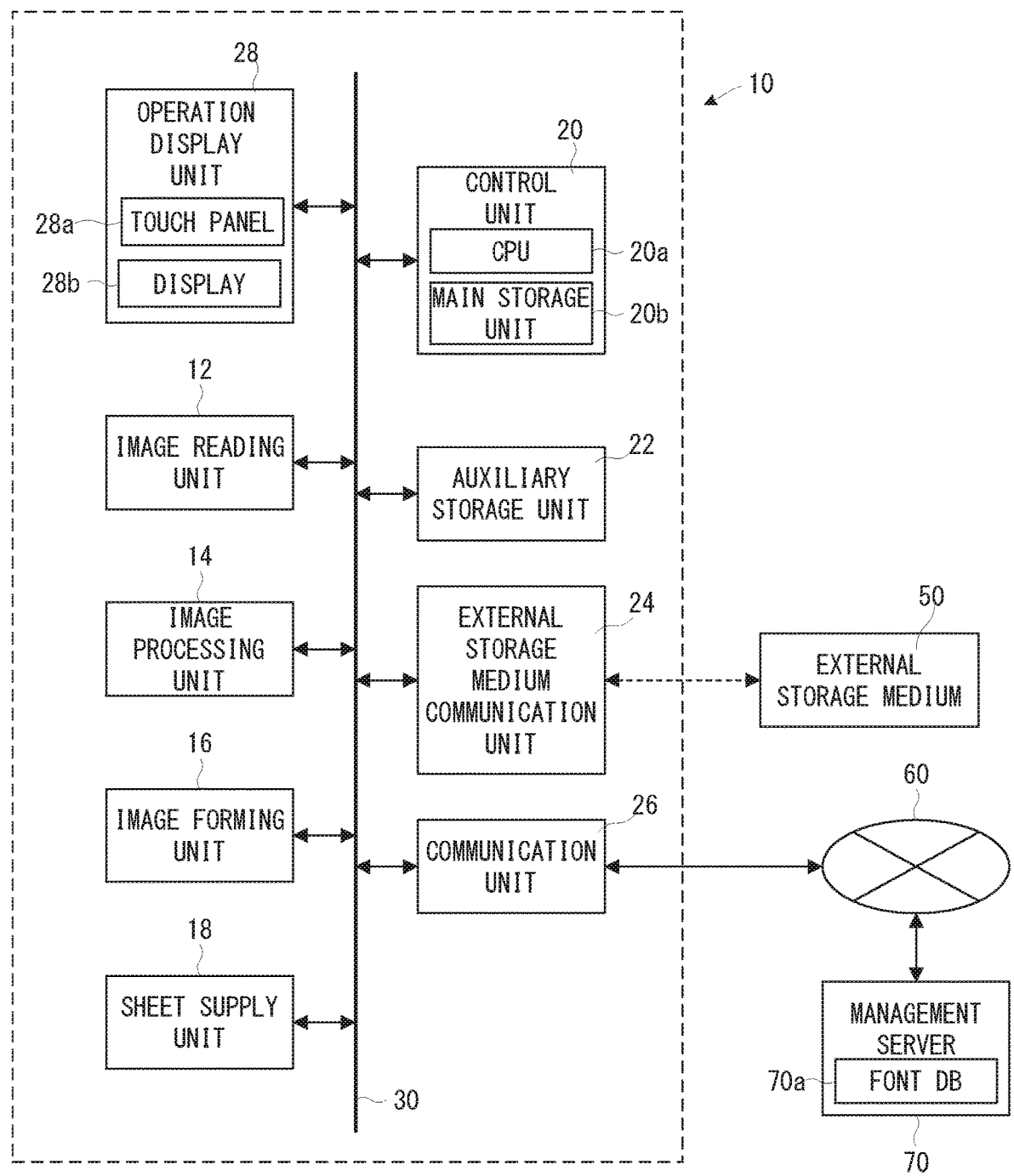
FIG. 22 is a block diagram showing electric structure of a multifunction peripheral concerning a fifth embodiment according to the present invention.

The communication unit 26 is an example of a communication means. Specifically, the communication unit 26 bears a bidirectional communication with an external device when being connected to the external device not shown in FIG. 1 via a communication network 60 (see FIG. 22) not shown in FIG. 1. As the communication network 60 referred to here, there are a LAN, an internet, a public switched telephone network, etc. Moreover, the LAN includes a wireless LAN, especially Wi-Fi (registered trademark). Moreover, the communication unit 26 bears wireless-communication processing according to Bluetooth (registered trademark) that is one of short distance wireless communication standards. Furthermore, the communication unit 26 also bears the wireless communication processing according to IrDA (registered trademark) that is one of short distance wireless communication standards. Then, as the external device, a personal computer, a server, etc. correspond. In addition, as an external device, there are also a portable communication terminal such as a smart phone and a tablet computer. This portable communication terminal is connected with the communication unit 26 via the wireless LAN, for example. Moreover, a portable communication terminal may be connected with the communication unit 26 by Bluetooth or IrDA.

The operation display unit 28 is a so-called operation panel, and has a touch panel 28a as an example of an operation reception means and a display 28b as an example of an information display means, that is, has the display 28b with the touch panel 28a. Specifically, the touch panel 28a is an almost transparent rectangle sheet-like member, and the display 28b has an almost rectangle-like display surface. The display 28b with the touch panel 28a is constituted by mounting the touch panel 28a so as to overlap with the display surface of the display 28b. In addition, the touch panel 28a is a panel of an electric capacitance system, for example; however, it may be a panel of another system such an electromagnetic induction system, a resistance film system, an infrared system, etc. Then, although the display 28b is a liquid crystal display (LCD), for example, it may be a display of another system such an organic electroluminescence (EL) display, etc. Moreover, the operation display unit 28 has appropriate hardware switch means such as a push button switch not shown in addition to touch panel 28a. Furthermore, the operation display unit 28 has appropriate light emitting means such as a light emitting diode (LED) not shown in addition to display 28b.

In addition, the multifunction peripheral 10 according to the first embodiment is installed in public spaces such as a convenience store and a supermarket on the assumption that it is used by an unspecified number of users, for example, and is especially used for pay. The multifunction peripheral 10 premised on such a use is provided with various components not shown in FIG. 1, such as a cash processing unit for settling in cash the usage fee of the multifunction peripheral 10, for example, a paper-pieces printer for printing various pieces of paper including the receipt in the settlement of accounts concerned, etc. However, since such components not shown in FIG. 1 are not directly related to the objects of the present invention, detailed description thereof will be omitted here.

Now, the multifunction peripheral 10 according to the first embodiment has an office direct print function capable of receiving an input of application data created by predetermined application software and executing a print job based on such the application data. According to this office direct print function, it is possible to execute directly a print job based on the application data created by the predetermined application software, without passing a print job generation device such as a personal computer. Moreover, according to the office direct print function in the first embodiment, it is possible to support not only application data created by the predetermined application software but also application data created by compatible application software that is compatible with the predetermined application software. This is very useful in usess that are premised on being used by an unspecified number of users as described above. On the other hand, since there are various types of fonts included in the application data, the multifunction peripheral 10 is installed with multiple types of fonts.

However, depending on the application data, especially on application data created by the compatible application software, the same font included in the application data may not be installed in the multifunction peripheral 10. In other words, there is an occasion that a font that is not installed in the multifunction peripheral 10, that is, a non-installed font is included in the application data. In this case, a print job is executed by substituting the non-installed font with any one of fonts installed in the multifunction peripheral 10.

Here, a substitute font that is substituted for the non-installed font is basically determined in advance for each non-installed font, and specifically, a font with a typeface similar to a typeface of the non-installed font is determined as a predetermined substitute font. Moreover, the substitute font can be arbitrarily selected by an operation of the user, and for example, a font other than a regular font that is defined as the substitute font can be selected as the substitute font.

Figure 2:
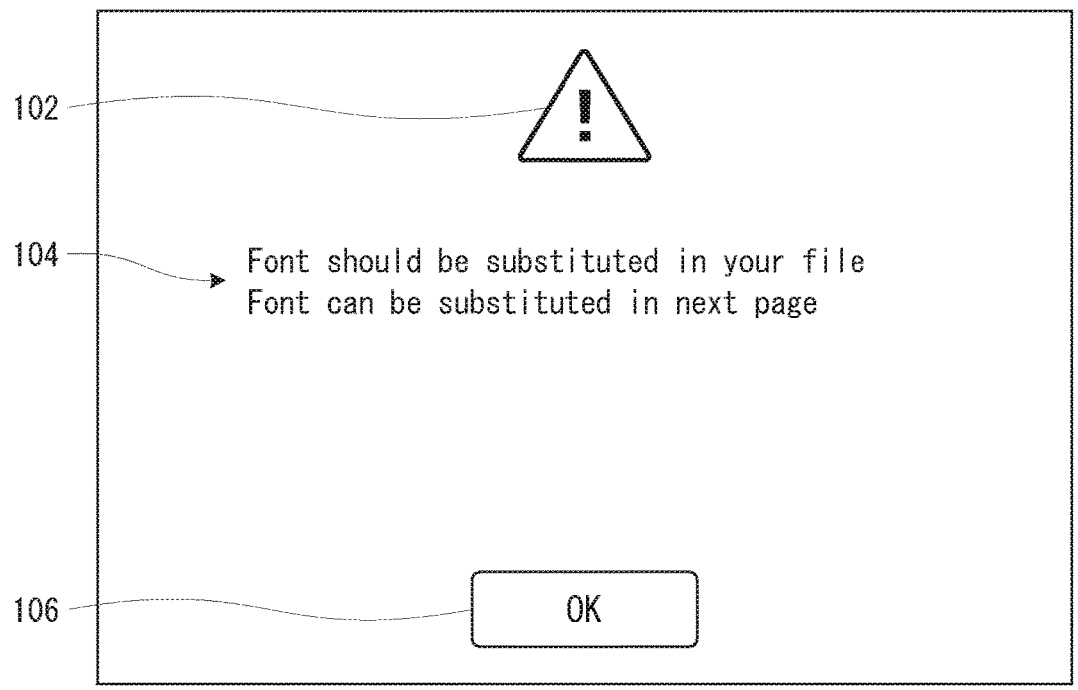
FIG. 2 is an illustrative view showing an attention message screen in the first embodiment.

Specifically, when a non-installed font is included in the application data, an attention message screen 100 as shown in FIG. 2 is displayed on the display 28b. This attention message screen 100 is a modal dialog, for example. In addition, the application data is fetched from the external storage medium 50, for example. Moreover, the application data can be fetched also from a portable communication terminal. Furthermore, the application data can be fetched also from a suitable server such as a cloud server, etc. Specifically, the application data can be fetched from a suitable data source such as the external storage medium 50, a portable communication terminal and a server. Then, the application data is fetched from the suitable data source, and when it is determined that the non-installed font is included in the application data, the attention message screen 100 is displayed.

In the attention message screen 100, for example, an appropriate alert mark 102 with an exclamation mark (!) is arranged in the center of the upper portion thereof. Moreover, an appropriate character string 104 indicative of an intention of this attention message screen 100 is arranged below the alert mark 102. This character string includes a content that informs the user that a font is to be substituted in a file of the user, that is, in the application data to be used for a print job by the office direct print function from now on. Moreover, the character string 104 includes a content that informs the user that the font can be substituted in a next screen (font substitution guidance screen 200). Furthermore, an "OK" key 106 is arranged below the character string 104, that is, in a lower portion in the attention message screen 100. This "OK" key 106 is an operation key for the user to express that when the user recognizes the contents of the attention message screen 100, especially, the content indicated by the character string 104.

Figure 3:
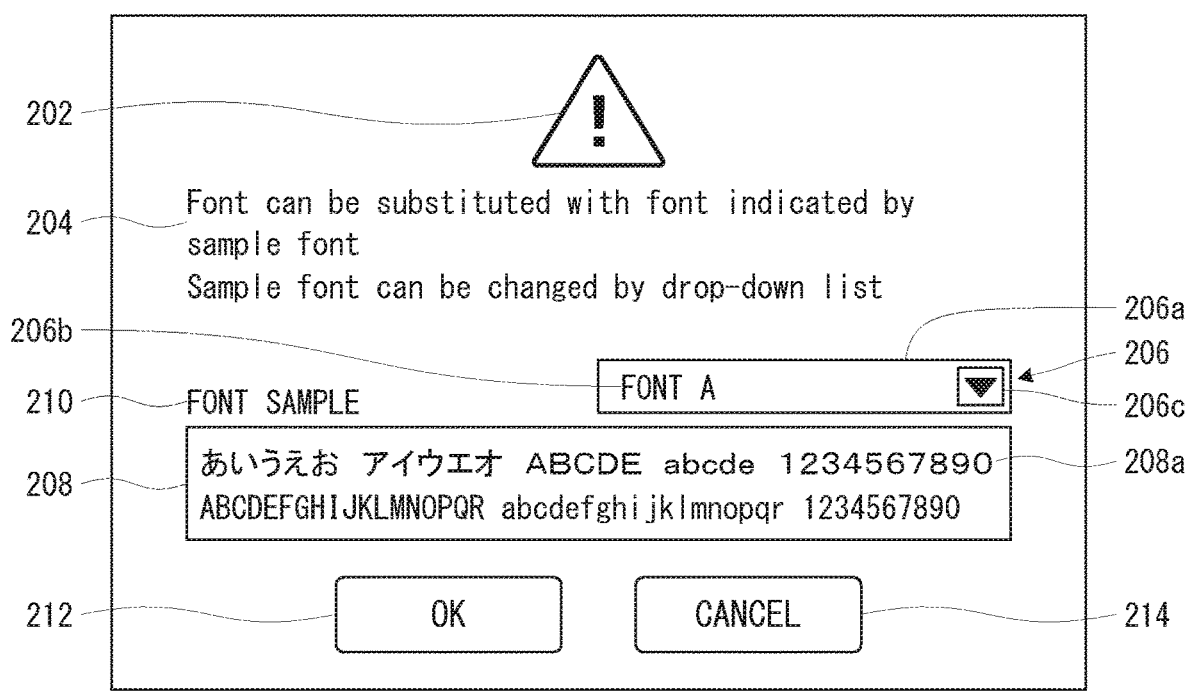
FIG. 3 is an illustrative view showing a font substitution guidance screen in the first embodiment.

In response to displaying such an attention message screen 100, the user can recognize that it is necessary to substitute the font in his/her own file (application data) to be used for a print job now by the office direct print function. The user can also recognize that the font can be substituted in a next screen. If the "OK" key 106 is operated (depressed) by the user, the attention message screen 100 will be deleted. Moreover, the font substitution guidance screen 200 shown in FIG. 3 is displayed on the display 28b. In addition, the font substitution guidance screen 200 is also a modal dialog, for example.

In this font substitution guidance screen 200, an alert mark 202 similar to that in the attention message screen 100 is arranged in the center of the upper portion thereof. Moreover, an appropriate character string 204 indicative of the intention of this font substitution guidance screen 200 is arranged below the alert mark 202. This character string 204 includes a content that informs the user that the font (non-installed font) to be substituted is substituted with a font (substitute font) as shown in each sample character (typeface) of a sample character group 208a described later. Moreover, the character string 204 includes a content that informs the user a font to be adopted for substitution (substitute font) can be changed through a drop-down list 206 described next. Then, the drop-down list 206 is arranged below the character string 204, specifically in a position to the right.

Figure 4:
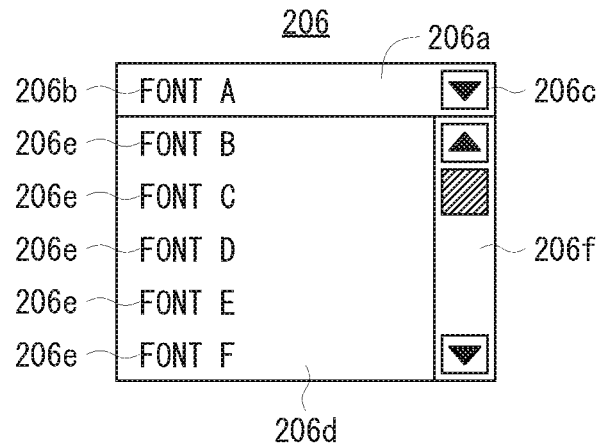
FIG. 4 is an illustrative view showing a state of a drop-down list in the first embodiment.

In the drop-down list (or referred to as "pull-down list") 206, strictly in a box 206a of the drop-down list 206, a character string 206b representing a font selected as the substitute font is displayed. In addition, FIG. 3 shows a state where a font referred to as "font A" is selected as the substitute font. Moreover, the above-described regular font is automatically selected as the substitute font immediately after displaying the font substitution guidance screen 200. Then, if an expansion key 206c in a right end of the drop-down list 206 is operated, a list box 206d as shown in FIG. 4 is expanded (displayed).

Multiple character strings 206e, 206e,—representing all the fonts installed in the multifunction peripheral 10 are arranged in a vertical line in the list box 206d. Moreover, a scroll bar (arrow and knob) 206f is arranged in a right side of the list box 206d, and the scroll bar is for scrolling the character strings 206e, 206e,—in the list box 206d in an up-down direction as necessary (that is, in a case where all the character strings 206e, 206e,—corresponding to all the fonts are not displayed at once in the list box 206d). Then, if any one of the character strings 206e in the list box 206d is operated in a state where the list box 206d is expanded as shown in FIG. 4, the font corresponding to the operated character string 206e will be selected as the substitute font. Accordingly, the character string 206b in the box 206a is changed to a content indicative of the font that is selected as the substitute font. Moreover, the list box 206d is closed, and returns to a state as shown in FIG. 3.

In the font substitution guidance screen 200 shown in FIG. 3, a rectangular sample display area 208 is arranged below the drop-down list 206. In this sample display area 208, various predetermined sample character groups 208a including sample characters such as full-width hiragana (Japanese letter) and half-width alphanumerical characters are displayed. A typeface of each sample character included in the sample character group 208a follows a font selected as the substitute font in the drop-down list 206, that is, a font indicated by the character string 206b in the box 206a. Therefore, the user can imagine the typeface of the substitute font by referring to each sample character of the sample character group 208a. Moreover, near the sample display area 208, in an upper left position above the sample display area 208, for example, there is arranged an appropriate character string 210 that indicates that each sample character of the sample character group 208a is "sample", in other word, a title indicative of the sample display area 208.

Furthermore, below the sample display area 208, in other word, in a lower portion of the font substitute guidance screen 200, two operation keys 212 and 214 are arranged side-by-side. The operation key 212 on a left side out of the two operation keys 212 and 214 is an "OK" key for instructing to set (settle) a font indicated by the character string 206b in the box 206a as the substitute font. On the other hand, the operation key 214 on a right side is a "cancel" key for instructing to cancel the print job of the application data that is tended to be used by the office direct print function.

According to such a font substitution guidance screen 200, the user can select a substitute font arbitrarily by operating the drop-down list 206. Then, the user can imagine the typeface of the substitute font by referring to each sample character of the sample character group 208a displayed in the sample display area 208. Specifically, the user can select a font close to the original font (non-installed font), for example, a favorite font as the substitute font by appropriately operating the drop-down list 206 while referring to the sample characters of the sample character group 208a.

Figure 5:
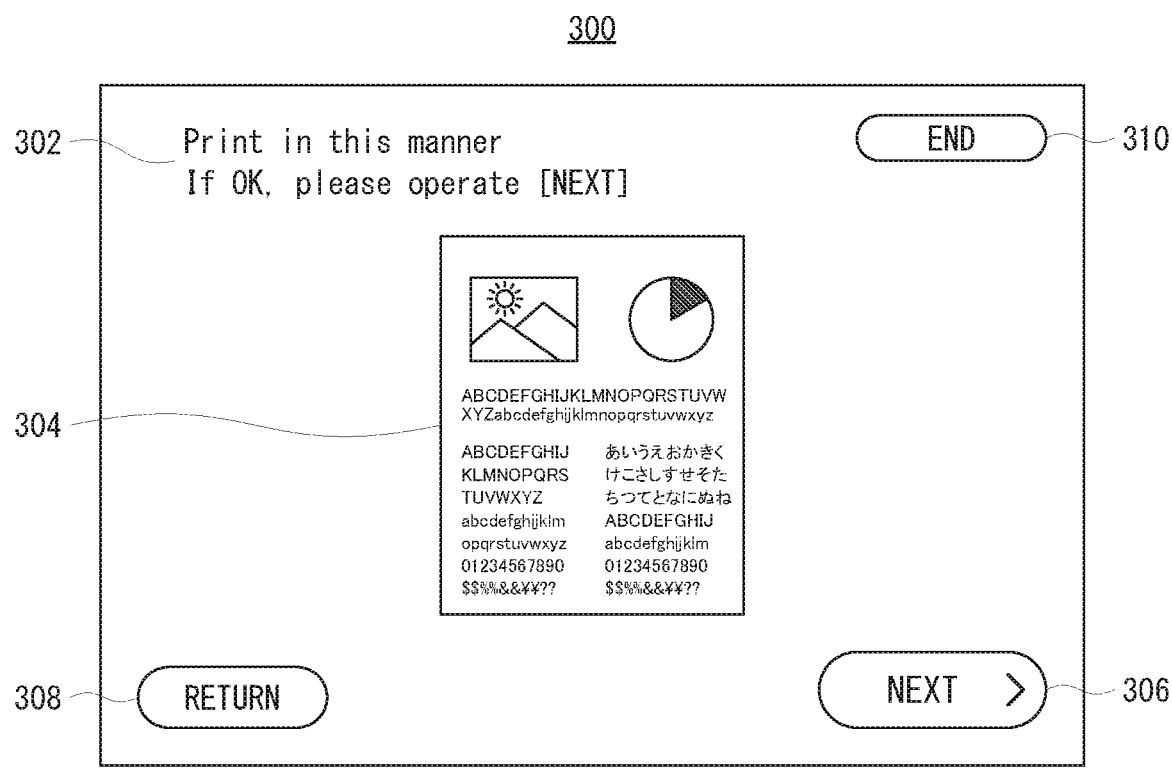
FIG. 5 is an illustrative view showing an example of a preview screen in the first embodiment.

Moreover, if the "OK" key 212 is operated, for example, the selected substitute font is set. Then, the font substitution guidance screen 200 is deleted and a preview screen 300 as shown in FIG. 5 is displayed on the display 28b. On the other hand, if the "cancel" key 214 in the font substitution guidance screen 200 is operated, the print job is cancelled. Then, the font substitution guidance screen 200 is deleted and a data acquisition screen not shown for fetching again application data from the above-described data source is displayed on the display 28b. In this case, the user can appropriately redo the previous operations including fetching further application data from the data source.

In the preview screen 300 shown in FIG. 5, an appropriate character string 302 indicative of an intention of the preview screen 300 is arranged in a position in an upper left portion thereof. The character string 302 includes a content that informs the user that a print result (output image) as represented by the preview image 304 described later is expected to be obtained by the print job to be executed from now on. Additionally, the character string 302 includes a content that prompts the user to operate a "next" key 306 described later if the user agrees that the print result as represented by the preview image 304 can be obtained (if there is no particular problem). Then, below the character string 302, in other word, in an approximately center position of the preview screen 300, a preview image 304 is arranged.

The preview image 304 is a reduced image of an image (predicted image) expected as a print result, and is arranged based on the preview image data generated by the above-described image processing unit 14. Specifically, the image processing unit 14 generates preview image data based on the application data after the non-installed font is substituted with the substitute font, that is, application data after substitution. Then, the preview image 304 is arranged based on this preview image data. In addition, FIG. 5 shows an example of the preview image 304 based on the application data (document file) created by certain word processing software as the compatible application software, strictly based on the application data after substitution. Then, although it does not understand from FIG. 5, the typeface of a character portion of the substitute font in the preview image 304 is slightly different from that of the original font. Incidentally, when application data is created by application software other than word processing software such as spreadsheet software, a preview image 304 based on the application data, strictly, based on application data after substitution is arranged.

Furthermore, a "next" key 306 is arranged in a suitable position, near a lower right corner of the preview screen 300, for example. This "next" key 306 is an operation key for instructing to advance to next procedure required for executing a print job. Moreover, a "return" key 308 is arranged near a lower left corner of the preview screen 300. This "return" key 308 is an operation key for instructing the font substitution guidance screen 200 that is the previous screen for the preview screen 300 to return to a state displayed on the display 28b again. Furthermore, an "end" key 310 is arranged near an upper right corner of the preview screen 300. This "end" key 310 is an operation key for instructing to forcibly end the use of the office direct print function.

In response to displaying such a preview screen 300, the user can confirm, prior to the print job is executed, what kind of print result is obtainable by especially referring to the preview image 304. Here, if the user agrees that a print result as represented by the preview image 304 can be obtained, for example, it is possible for the user to proceed to next procedure required for executing the print job by operating the "next" key 306. In this case, a suitable operation screen not shown is displayed on the display 28b instead of the preview screen 300, which is for advancing to next procedure, that is, to next procedure required for executing a print job based on the application data after substitution.

In contrast, if the "return" key 308 is operated in the preview screen 300, the font substitution guidance screen 200 that is the previous screen for the preview screen 300 is displayed on the display 28b again instead of the preview screen 300. As a result, the user can appropriately redo the previous operations including selecting a substitute font again. In addition, when the font substitution guidance screen 200 is displayed again by operating the "return" key 308, the font substitution guidance screen 200 in a state where a regular font is selected as the substitute font is displayed.

On the other hand, when the "end" key 310 in the preview screen 300 is operated, the use of the office direct print is forcibly ended. In this case, the print job is, of course, canceled. Then, instead of the preview screen 300, an end message screen not shown that represents that the use of the office direct print function is to be ended is displayed on the display 28b during a predetermined period of time (several seconds, for example). Then, a home screen (also referred to as a "portal screen") not shown that is a basic operation screen of the multifunction peripheral 10 is displayed on the display 28b.

Here, a memory map 400 that conceptually represents structure of the main storage unit 20b in the RAM.

As shown in this memory map 400, the RAM has a program storage area 410 and a data storage area 450. The above-described control program is stored in the program store area 410. Specifically, the control program includes a display control program 412, an operation detection program 414, an image reading control program 416, an image processing control program 418, an image forming control program 420, a sheet supply control program 422, an auxiliary storage control program 424, an external storage medium communication control program 426 and a communication control program 428. Moreover, the control program includes an office direct print program (also referred to as an "office direct lettering program") and a font substitution control program 432.

The display control program 412 is a program for generating display screen data required for displaying various screens including the attention message screen 100 on the display 28b. The operation detection program 414 is a program for detecting an operation state to the touch panel 28a. The image reading control program 416 is a program for controlling the image reading unit 12. The image processing control program 418 is a program for controlling the image processing unit 14. The image forming control program 420 is a program for controlling the image forming unit 16. The sheet supply control program 422 is a program for controlling the sheet supply unit 18. The auxiliary storage control program 424 is a program for controlling the auxiliary storage unit 22. The external storage medium communication control program 426 is a program for controlling the external storage medium communication unit 24. The communication control program 428 is a program for controlling the communication unit 26. The office direct print program 430 is a program for implementing the office direct print function. Then, the font substitution control program 432 is a program for causing the CPU 20a to execute a font substitution control task described later.

On the other hand, various data is stored in the data storage area 450. As these various data, there are the display image generation data 452, the operation data 454, font data 456, sample data 458, table data 460, etc.

The display image generation data 452 is data of polygon data, texture data, etc. used for the generation of display screen data based on the above-described display control program 412. The operation data 454 is data indicative of an operation state to the touch panel 28a, and specifically, time series data indicative of a touch position (coordinate) onto the touch panel 28a. Then, the font data 456 is data of fonts installed in the multifunction peripheral 10, and specifically, data of a plurality of types of Japanese fonts and alphanumeric fonts. Based on these font data 456, respective character strings 206e, 206e,—in the above-described list box 206d, that is, a list of fonts installed in the multifunction peripheral 10 is displayed. Then, the sample data 458 is data of the above-described sample character group 208a, and is so-called text data. Specifically, if applying the font that is selected as the substitute font to the text data that is the sample data 458, each sample character of the sample character group 208a is displayed by a typeface according to the substitute font. Then, the table data 460 includes data of various tables, and especially, includes a regular font table 460a shown in FIG. 7 and a font substitution implementation table 460b shown in FIG. 8.

The regular font table 460a shown in FIG. 7 is a table that relationship between various fonts assumed as non-installed fonts and the regular fonts corresponding thereto is organized. Specifically, when a non-installed font is included in the application data, the regular font first selected as the substitute font that is substituted for the non-installed font is selected based on this regular font table 460a.

Then, the font substitution implementation table 460b shown in FIG. 8 is a table for storing detailed information when the non-installed font is substituted with the substitute font. For example, when substituting a certain non-installed font with a certain substitute font, a relationship between the both is stored in the font substitution implementation table 460b in association with each other. Moreover, a substitution position of the font, that is, a top position (coordinate) is stored in the font substitution implementation table 460b. Furthermore, various information including a size, width, typeface, etc. of a character to which the substitute font is applied is also stored in the font substitution implementation table 460b.

Figure 9:
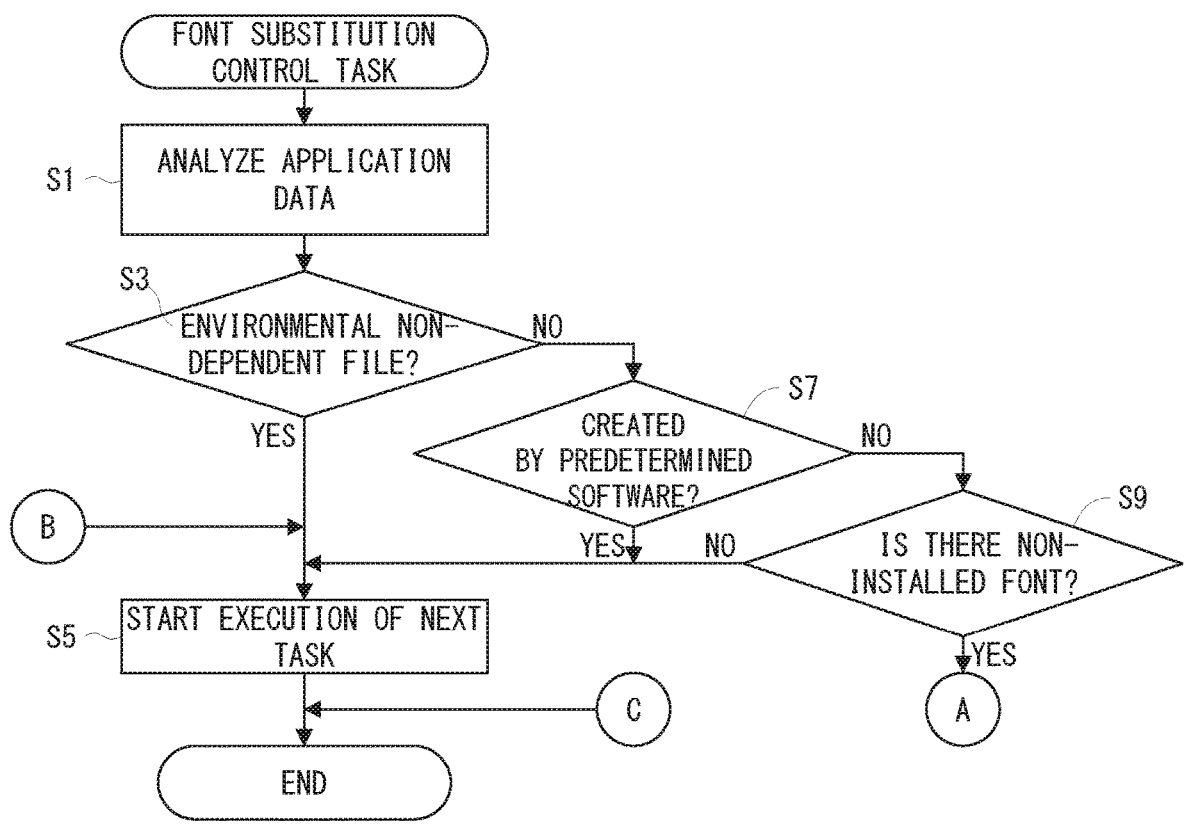
FIG. 9 is a flowchart showing a part of a font substitution control task in the first embodiment.
Figure 10:
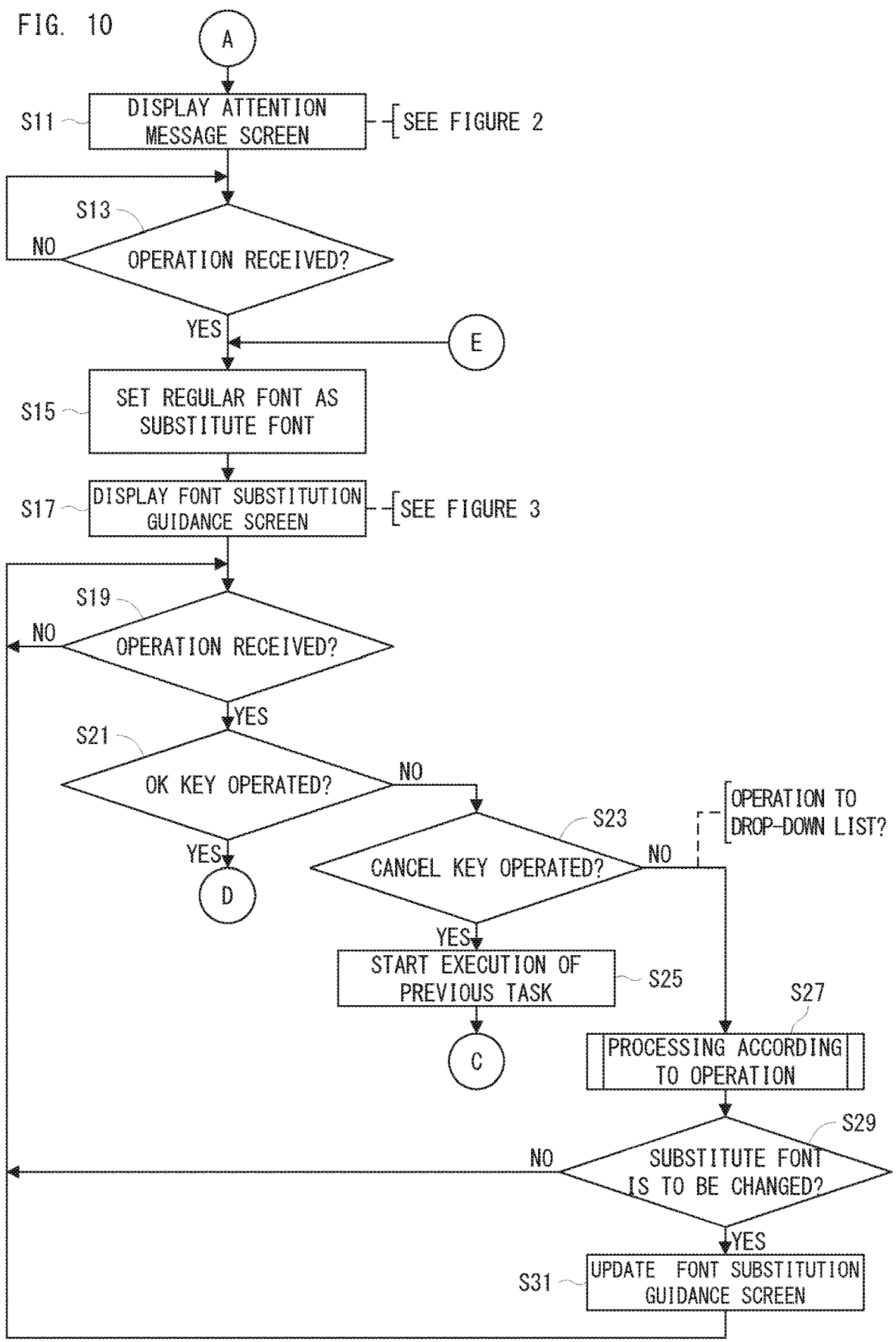
FIG. 10 is a flowchart showing another part of the font substitution control task in the first embodiment.
Figure 11:
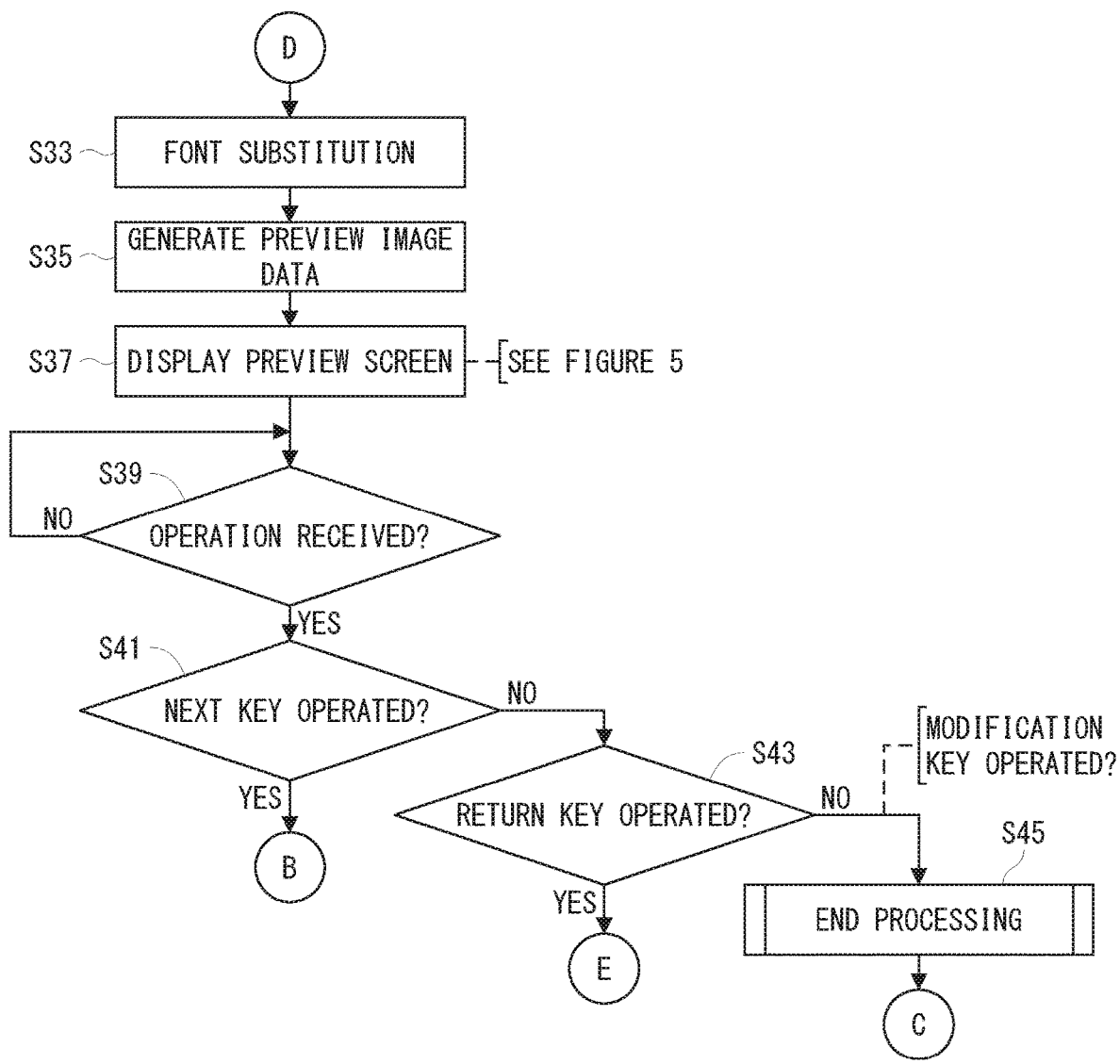
FIG. 11 is a flowchart showing a remaining part of the font substitution control task in the first embodiment.

Although the CPU 20a operates according to the control program as described above, especially executes a font substitution control task when performing a print job by the office direct print function. The procedure of this font substitution control task is shown in FIG. 9-FIG. 11. In addition, the font substitution control task is executed according to the font substitution control program 432. Moreover, when the application data is fetched from the above-described data source, the font substitution control task is executed in response thereto. In other words, the font substitution control task is executed by the above-described data acquisition screen, strictly, executed by acquisition of the application data from the suitable data source by the data acquisition task executed prior to the font substitution control task. As for the data acquisition task, detailed description including illustration will be omitted here.

In the font substitution control task, in a step S1, the CPU 20a first analyzes the application data, and analyzes attribute information including a file extension of the application data, etc., for example. Then, the CPU 20a advances the process to a step S3.

In the step S3, the CPU 20a determines whether the application data is environment non-dependent file such as a PDF file based on an analysis result in the step S1. Here, when the application data is the environment non-dependent file (S3: "YES"), the CPU 20a advances the process to a step S5. On the other hand, when the application data is not the environmental non-dependent file (S3: "NO"), the CPU 20a advances the process to a step S7 described later.

In the step S5, the CPU 20a starts execution of a next task required for executing a print job based on the application data. As a result, the operation screen for advancing to the above-described next procedure is displayed on the display 28b. With this, the CPU 20a ends the font substitution control task.

Whereas, when the process proceeds to a step S7 from the step S3, the CPU 20a determines, in the step S7, whether the application data is created by the predetermined application software. Determination in this step S7 is also performed based on the analysis result in the step S1. When it is determined that the application data is created by the predetermined application software in the step S7 (S7: "YES"), the CPU 20a advances the process to the step S5. On the other hand, when it is not determined that the application data is created by the predetermined application software, that is, that the application data is created by the compatible application software (S7: "NO"), the CPU 20a advances the process to a step S9.

In the step S9, the CPU 20a determines whether a non-installed font is included in the application data, that is, whether a font not included in the font data 456 is included in the application data. Determination in this step S9 is also performed based on the analysis result in the step S1. Here, when the non-installed font is not included in the application data (S9: "NO"), for example, the CPU 20a advances the process to the step S5. On the other hand, when the non-installed font is included in the application data (S9: "YES"), the CPU 20a advances the process to a step S11. In addition, when no font is included in the application data, the CPU 20a advances, of course, the process to the step S5.

In the step S11, the CPU 20a displays the attention message screen 100 on the display 28b. Then, the CPU 20a advances the process to a step S13.

In the step S13, the CPU 20a waits for the attention message screen 100 to receive an operation, that is, waits for the "OK" key 106 to receive an operation (S13: "NO"). Then, if the "OK" key 106 receives an operation (S13: "YES"), the CPU 20a advances the process to a step S15.

In the step S15, the CPU 20a sets the regular font as the substitute font that is substituted for the non-installed font. At this time, the CPU 20a refers to the regular font table 460a. Moreover, the CPU 20a advances the process to a step S17.

In the step S17, the CPU 20a displays the font substitution guidance screen 200 on the display 28b instead of the attention message screen 100. At this time, the CPU 20a displays in the box 206a the character string 206b indicative of the regular font. Moreover, the CPU 20a displays each sample character of the sample character group 208a with the typeface according to the regular font by applying the regular font that is set as the substitute font to the text data that is the sample data 458. Then, the CPU 20a advances the process to a step S19.

In the step S19, the CPU 20a waits for the font substitution guidance screen 200 to receive an operation (S19: "NO"). Then, if the font substitution guidance screen 200 receives an operation (S19: "YES"), the CPU 20a advances the process to a step S21.

In the step S21, the CPU 20a determines whether the operation received in the step S19 is an operation to the "OK" key 212 in the font substitution guidance screen 200. Here, when the operation received in the step S19 is an operation to the "OK" key 212 (S21: "YES"), the CPU 20a advances the process to a step S33 described later. On the other hand, when the operation received in the step S19 is not an operation to the "OK" key 212 (S21: "NO"), the CPU 20a advances the process to a step S23.

In the step S23, the CPU 20a determines whether the operation received in the step S19 is an operation to the "cancel" key 214 in the font substitution guidance screen 200. When the operation received in the step S19 is an operation to the "cancel" key 214 (S23: "YES"), the CPU 20a advances the process to a step S25 described later. On the other hand, when the operation received in the step S19 is not an operation to the "cancel" key 214 (S23: "NO"), that is, is an operation to the drop-down list 206, the CPU 20a advances the process to a step S27.

In the step S25, the CPU 20a starts execution of the data acquisition task that is a task prior to a font substitution control task in order to display the above-described data acquisition screen on the display 28b. As a result, the font substitution guidance screen 200 is deleted and the data acquisition screen is displayed on the display 28b. As a result, the CPU 20a ends the font substitution control task.

In contrast, if advancing the process to the step S27 from the step S23, that is, when the operation received in the above-described step S19 is an operation to the drop-down list 206, in the step S27, the CPU 20a executes processing according to the operation to the drop-down list 206. For example, when the expansion key 206c of the drop-down list 206 is operated, strictly, when the expansion key 206c is operated, in a state where the drop-down list 206d is closed, the CPU 20a expands the list box 206d as shown in FIG. 4. Moreover, when any character string 206e in the list box 206d is operated in a state where the list box 206d is expanded, the CPU 20a closes the list box 206d while selecting the font indicated by the operated character string 206e as the substitute font. The CPU 20a advances the process to a step S29 after execution of such the processing in the step S27.

In the step S29, the CPU 20a determines whether the substitute font is changed by the processing in the step S27. When the substitute font is changed (S29: "YES"), the CPU 20a advances the process to a step S31. On the other hand, when the substitute font is not changed (S29: "NO"), the CPU 20a returns the process to the step S19.

In the step S31, the CPU 20a updates the content of display of the font substitution guidance screen 200 according to the changed substitute font. Specifically, the CPU 20a changes the character string 206b in the box 206a to the content indicative of the substitute font after change. Moreover, the CPU 20a changes the typeface of each sample character of the sample character group 208a to the typeface according to the substitute font after change by applying the substitute font after change to the text data that is the sample data 458. Then, the CPU 20a returns the process to the step S19.

Furthermore, when advancing the process to the step S33 from the above-described step S21, in the step S33, the CPU 20a substitutes the non-installed font included in the application data with the substitute font. Specifically, the CPU 20a substitutes for the non-installed font with the font indicated by the character string 206b in the box 206a. Moreover, the CPU 20a stores the detailed information of substitution of this font on the font substitution implementation table 460b. Moreover, the CPU 20a advances the process to a step S35.

In the step S35, based on the application data after substitution, the CPU 20a controls the image processing unit 14 so as to generate preview image data. Accordingly, the image processing unit 14 performs the image processing for generating preview image data, including rasterizing. Then, the CPU 20a advances the process to a step S37 after execution of the step S35.

In the step S37, the CPU 20a displays the preview screen 300 on the display 28b after deleting the font substitution guidance screen 200. At this time, the CPU 20a arranges the preview image 304 to the preview screen 300 based on the preview image data generated in the step S35. Then, the CPU 20a advances the process to a step S39.

In the step S39, the CPU 20a waits for the preview screen 300 to receive an operation (S39: "NO"). Then, if the preview screen 300 receives an operation (S39: "YES"), the CPU 20a advances the process to a step S41.

In the step S41, the CPU 20a determines whether the operation received in the step S39 is an operation to the "next" key 306 in the preview screen 300. When the operation received in the step S39 is an operation to the "next" key 306 (S41: "YES"), the CPU 20a advances the process to the above-described step S5. On the other hand, when the operation received in the step S39 is not an operation to the "next" key 306 (S41: "NO"), the CPU 20a advances the process to a step S43.

In the step S43, the CPU 20a determines whether the operation received in the above-described step S39 is an operation to the "return" key 308 in the preview screen 300. When the operation received in the step S39 is an operation to the "return" key 308 (S43: "YES"), the CPU 20a returns the process to the above-described step S15. On the other hand, when the operation received in the step S39 is not an operation to the "return" key 308 (S43: "NO"), that is, when it is an operation to the key 310, the CPU 20a advances the process to a step S45.

In the step S45, the CPU 20a executes end processing for ending the office direct print function. The end processing in the step S45 includes processing that the above-described end message screen is displayed on the display 28b during a predetermined period of time, instead of the preview screen 300, and then, the above-described home screen is displayed on the display 28b. With this, the CPU 20a ends the font substitution control task.

As described above, according to this first embodiment, especially the office direct print function, when a non-installed font is included in the application data, after the attention message screen 100 is displayed on the display 28b, the font substitution guidance screen 200 is displayed on the display 28b. Then, the user can select an arbitrary font as the substitute font in the font substitution guidance screen 200, in detail, by operating the drop-down list 206 properly with referring to the sample character of the sample character group 208a. This is very useful for the user, as such a print result close to the original can be obtained.

In addition, although the detailed description including illustration is omitted, when multiple types of non-installed fonts are included in the application data, the font substitution guidance screen 200 is displayed one by one for each non-installed font, for example. Then, a substitute font is individually selected for each type of the non-installed font by the font substitution guidance screen 200 thus displayed one by one. Instead of this, the font substitution guidance screen 200 may be configured so that substitute fonts for all types of non-installed fonts included in the application data can be individually selected on a single suitable screen.

Then, the CPU 20a that executes the processing in the steps S1, S3, S7 and S9 in the font substitution control task is an example of a font determination unit of the embodiment according to the present invention. Moreover, the CPU 20a that executes the processing in the step S17 in the font substitution control task, that is, the CPU 20a that displays the font substitution guidance screen 200 on the display 28b constitutes an example of a guidance unit of the embodiment according to the present invention in cooperation with the display 28b. Strictly, the CPU 20a that executes the processing of the step S31 in the font substitution control task, that is, the CPU 20a that updates the content of display of the font substitution guidance screen 200 also constitutes an example of a guidance unit of the embodiment according to the present invention.

Furthermore, the drop-down list 206 in the font substitution guidance screen 200 is an example of a selection operation reception unit of the embodiment according to the present invention. Then, the CPU 20a that displays each sample character of the sample character group 208a in the font substitution guidance screen 200, that is, the CPU 20a that displays the font substitution guidance screen 200 including the sample character group 208a on the display 28b also constitutes an example of a display unit of the embodiment according to the present invention in cooperation with the display 28b.

Moreover, the RAM that is stored with the font data 456 of the main storage unit 20b is also an example of a font data storage unit of the embodiment according to the present invention. Strictly, since the font data is expanded in the RAM of the main storage unit 20b after being stored in the ROM of the main storage unit 20b or the auxiliary storage unit 22, the ROM of the main storage unit 20b or the auxiliary storage unit 22 is also an example of a font data storage unit of the embodiment according to the present invention.

Moreover, the RAM that is stored with the sample data 458 of the main storage unit 20b is also an example of a character data storage unit of the embodiment according to the present invention. Strictly, since the sample data is expanded in the RAM of the main storage unit 20b after being stored in the ROM of the main storage unit 20b or the auxiliary storage unit 22, the ROM of the main storage unit 20b or the auxiliary storage unit 22 is also an example of a character data storage unit of the embodiment according to the present invention. Then, the CPU 20a displays each sample character of the sample character group 208a by applying a substitute font to the sample data 458, that is, displays the font substitution guidance screen 200 including the sample character group 208a on the display 28b, and such the CPU 20a constitutes an example of a display execution unit of the embodiment according to the present invention in cooperation with the display 28b.

Moreover, the CPU 20a that executes the processing of the steps S35 and S37 in the font substitution control task constitute an example of a first preview image display unit of the embodiment according to the present invention in cooperation with the image processing unit 14 and the display 28*b*. Then, the preview image 304 in the preview screen 300 is an example of a first preview image of the embodiment according to the present invention.

Second Embodiment

Next, the second embodiment according to the present invention will be described.

Figure 12:
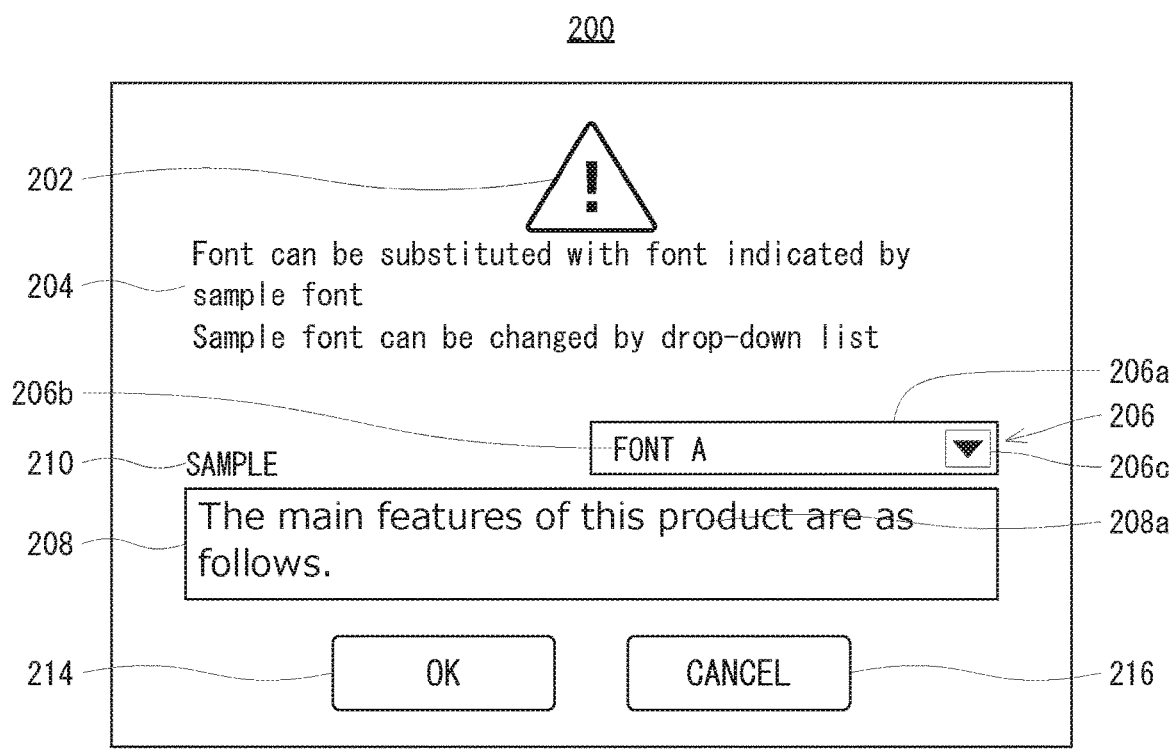
FIG. 12 is an illustrative view showing an example of a font substitution guidance screen in a second embodiment according to the present invention.

In the second embodiment, a font substitution guidance screen 200 in a manner as shown in FIG. 12 is displayed. In the font substitution guidance screen 200 shown in FIG. 12, the sample character group 208*a* in the sample display area 208 is displayed based on a part or all of character data to which the non-installed font in the application data is applied.

Specifically, a part or all of the character data to which the non-installed font is applied in the application data, for example, the data for the first line of the character data is extracted as sample data. Then, by applying a substitute font to this extracted sample data, that is, by applying the font indicated by the character string 206*b* in the box 206*a* of the drop-down list 206 to the sample data, each sample character of the sample character group 208*a* is displayed. Therefore, the user can imagine more accurately with what typeface the characters included in the application data based on the actual character data will be represented.

Figure 13:
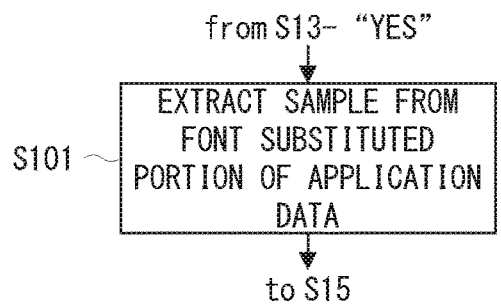
FIG. 13 is a flowchart showing a part of a font substitution control task in the second embodiment.

In such the second embodiment, the CPU 20*a* also executes a font substitution control task, and a step S101 as shown in FIG. 13 is added to the font substitution control task in the second embodiment. Specifically, in the above-described step S13, if the "OK" key 106 in the attention message screen 100 receives an operation (S13: "YES"), the CPU 20*a* advances the process to a step S101 from the step S13.

In this step S101, the CPU 20*a* extracts a part or all of the character data to which the non-installed font is applied in the application data, for example, the data for the first line or few lines of the character data as sample data. Then, the CPU 20*a* advances the process to the step S15.

In addition, in the step S15, as described above, the CPU 20*a* sets the regular font as the substitute font. Then, the CPU 20*a* advances the process to the step S17, and displays the font substitution guidance screen 200 on the display 28*b* in the step S17. At this time, the CPU 20*a* displays each sample character of the sample character group 208*a* with the typeface according to the regular font by applying the regular font that is the substitute font to the sample data extracted in the step S101.

Moreover, when updating the contents of display of the font substitution guidance screen 200 in the above-described step S31, the CPU 20*a* also applies the substitute font after change to the sample data extracted in the step S101. As a result, the typeface of each sample character of the sample character group 208*a* is changed to the typeface according to the changed substitute font.

Thus, according to the second embodiment, the actual character data included in the application data is extracted as the sample data, and each sample character of the sample character group 208*a* is displayed based on this extracted sample data. Therefore, the user can imagine more accurately with what typeface the characters included in the application data based on the actual character data will be represented.

In addition, it takes a reasonable amount (somewhat) of time to extract the character data as sample data from the application data. Therefore, the first embodiment is more advantageous than the second embodiment at a point that the sample character group 208*a* is displayed in the shortest possible time, in other words, the period of time for the user to wait for displaying the sample character group 208*a* is shortened. However, as described above, according to the second embodiment, it is possible to make it easier for the user to imagine with what typeface the characters based on the actual character data included in the application data will be represented, and this point is very useful.

The CPU 20*a* that executes the processing of the step S101 in the font substitution control task in the second embodiment is an example of an extraction unit of the embodiment according to the present invention. This step S101 may be provided, for example, immediately after the step S15 or just before the step S11.

Third Embodiment

Next, the third embodiment according to the present invention will be described.

The third embodiment is premised on the second embodiment, for example. Moreover, considering that the appearance of the print result based on the application data after substitution may be excessively corrupted by substituting the non-installed font included in the application data with the substitute font, a countermeasure is taken in the third embodiment.

Figure 14:
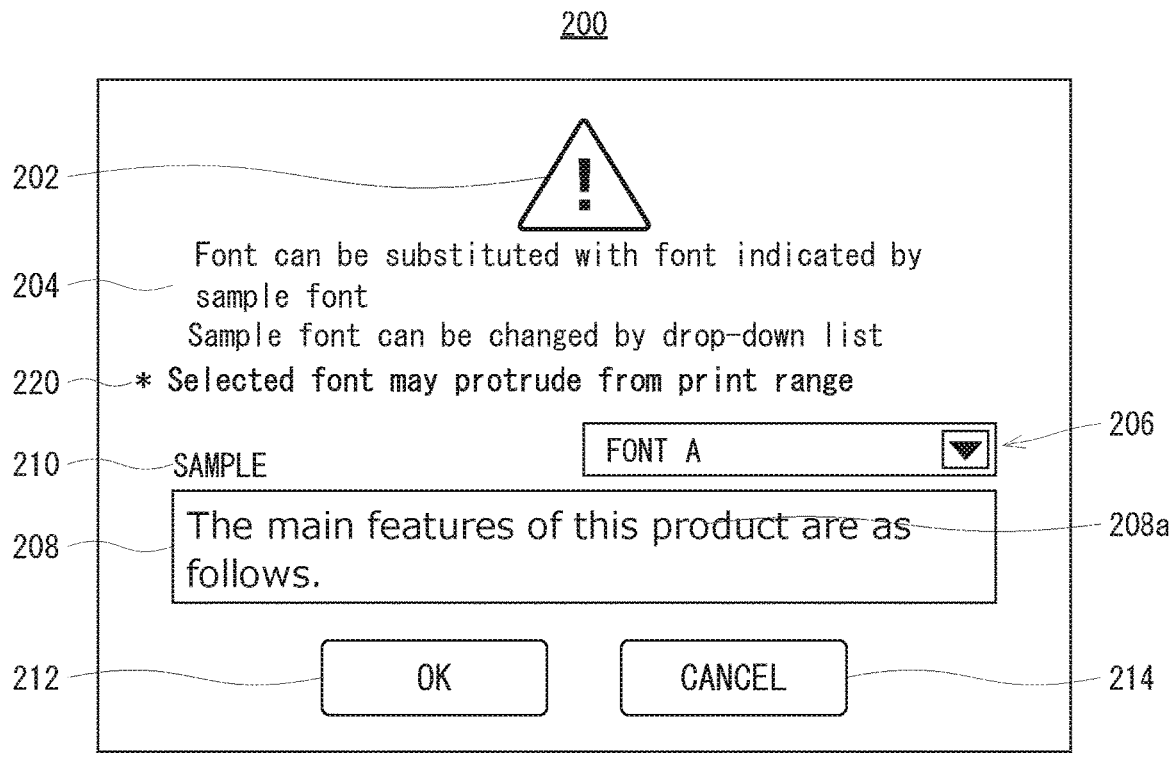
FIG. 14 is an illustrative view showing an example of a font substitution guidance screen in a third embodiment according to the present invention.

Specifically, depending on a character size, character width, style, the number of characters, etc. of a portion substituted with the substitute font, an object included in a print result may protrude from a print range. Therefore, in the third embodiment, when a substitute font is selected by the drop-down list 206 of the font substitution guidance screen 200, prediction on whether an object included in the print result based on the application data to which the substitute font is applied may protrude from the print range is performed. This prediction is performed based on calculations that take into account factors that affect the appearance of the print result such as the character size, character width, style, the number of characters, etc. in the portion substituted with the substitute font, for example. Then, for example, when the object included in the print result may protrude from the print range, as shown in FIG. 14, a character string 220 indicative of a predetermined warning message is arranged in a proper position in the font substitution guidance screen 200.

In addition, the character string 220 is arranged between the character string 204 and the drop-down list 206, for example. Then, the character string 220 includes a content that informs the user that the object included in the print result may protrude from the print range due to a font selected as the substitute font. Furthermore, the character string 220 is set to be a conspicuous manner, for example, a bold character and a conspicuous color such as red. Other than, the character string 220 is set to be a manner that may have an appropriate modification such as a border, an underline or a shading.

Therefore, in response to arranging the character string 220 indicative of the warning message, the user can recognize that with the font currently selected as the substitute font, the object included in the print result may protrude from the print range, that is, the print result may be undesired. In this case, the user can avoid such inexpediency by selecting another font as the substitute font. In addition, when the object included in the print result may not protrude from the print range by selecting another font as the substitute font, the character string 220 is deleted.

Figure 15:
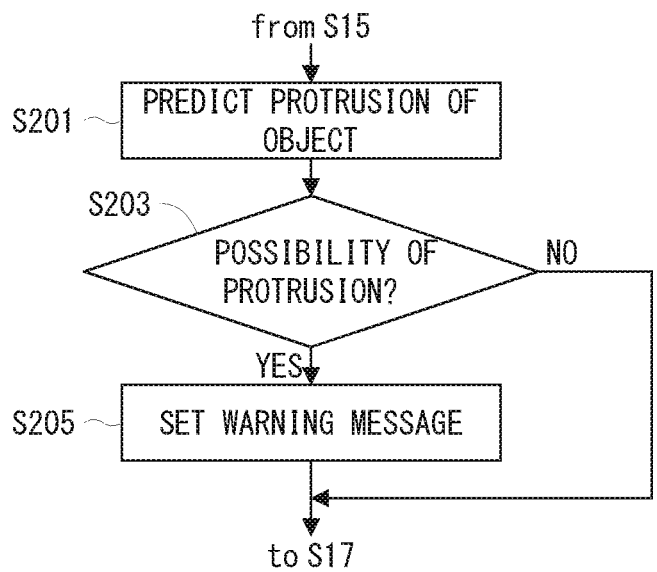
FIG. 15 is a flowchart showing a part of a font substitution control task in the third embodiment.
Figure 16:
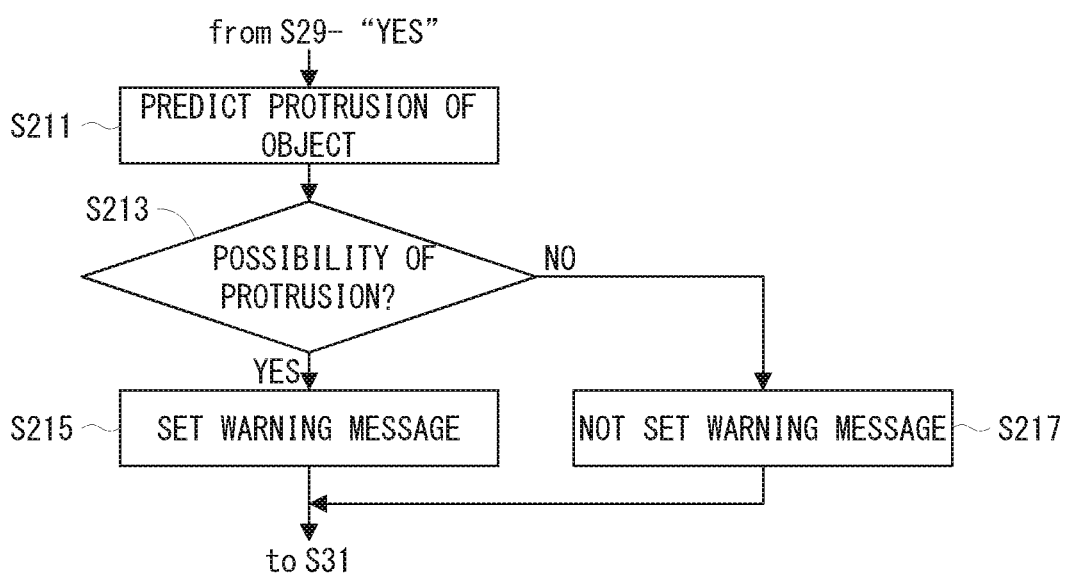
FIG. 16 is a flowchart showing another part of the font substitution control task in the third embodiment.

Although the CPU 20a executes the font substitution control task also in the third embodiment, in the third embodiment, steps S201-S205 as shown in FIG. 15, and steps S211-S217 as shown in FIG. 16 are added to the font substitution control task. Specifically, after setting the regular font as a substitute font in the above-described step S15, the CPU 20a advances the process to a step S201.

In this step S201, the CPU 20a predicts whether the object included in the print result based on the application data after substitution to which the regular font as the substitute font is applied may protrude from the print range. This prediction is performed based on calculations that take into account factors that affect the appearance of the print result such as the character size, character width, etc. in a portion substituted with the substitute font (here, the regular font). Then, the CPU 20a advances the process to a step S203.

In the step S203, the CPU 20a determines, based on a prediction result in the step S201, whether the object included in the print result based on the application data after substitution may protrude from the print range. Here, when the object included in the print result may not protrude from the print range (S203: "NO"), the CPU 20a advances the process to the above-described step S17. On the other hand, when the object included in the print result may protrude from the print range (S203: "YES"), the CPU 20a advances the process to a step S205.

In the step S205, the CPU 20a sets the warning message so that the character string 220 indicative of the warning message is arranged in the font substitution guidance screen 200. Moreover, the CPU 20a advances the process to the step S17.

In addition, when the process is advanced to the step S17 via the step S205, the CPU 20a displays the font substitution guidance screen 200 that the character string 220 indicative of the warning message is arranged on the display 28b in the step S17. On the other hand, when the process is advanced to the step S17 without via the step S205, the CPU 20a displays the font substitution guidance screen 200 that the character string 220 indicative of the warning message is not arranged on the display 28b in the step S17.

Furthermore, when determining in the above-described step S29 (S29: "YES") that the substitute font is changed by the processing of the step S27, the CPU 20a advances the process to a step S211.

In this step S211, the CPU 20a predicts whether the object included in the print result based on the application data after substitution to which the substitute font after change is applied may protrude from the print range. This prediction is performed in the same or similar manner as the step S201. Then, the CPU 20a advances the process to a step S213.

In the step S213, the CPU 20a determines, based on a prediction result in the step S211, whether the object included in the print result based on application data after substitution may protrude from the print range. Here, when the object included in the print result may protrude from the print range (S213: "YES"), the CPU 20a advances the process to a step S215. On the other hand, when the object included in the print result may not protrude from the print range (S213: "NO"), the CPU 20a advances the process to a step S217.

In the step S215, similar to the step S205, the CPU 20a sets the warning message so that the character string 220 indicative of the warning message may be arranged in the font substitution guidance screen 200. Moreover, the CPU 20a advances the process to the above-described step S31.

In contrast, when the process is advanced to the step S217 from the step S213, in the step S217, the CPU 20a does not set the warning message so that the character string 220 indicative of the warning message is not arranged in the font substitution guidance screen 200. Moreover, the CPU 20a advances the process to the above-described step S31.

In addition, when the process is advanced to the step S31 via the step S215, the CPU 20a updates the content of display of the font substitution guidance screen 200 so as to display the font substitution guidance screen 200 that the character string 220 indicative of the warning message is arranged on the display 28b in the step S31. On the other hand, when the process is advanced to the step S31 without via the step S215, the CPU 20a updates the content of display of the font substitution guidance screen 200 so as to display the font substitution guidance screen 200 that the character string 220 indicative of the warning message is not arranged on the display 28b in the step S31.

Thus, according to the third embodiment, when the object included in the print result may protrude from the print range due to substitution of the non-installed font with the substitute font, the character string 220 indicative of the predetermined warning message is arranged in the font substitution guidance screen 200. Therefore, in response to arranging the character string 220 indicative of the warning message, the user can recognize that with the font currently selected as the substitute font, the object included in the print result may protrude from the print range, that is, the print result may be undesired. Moreover, the user can avoid such inexpediency by selecting another font as a substitute font.

In addition, although the third embodiment is premised on the second embodiment, instead, may be premised on the first embodiment.

Moreover, the warning message indicated by the character string 220 may be output an auditory manner such as a sound rather than a visual manner such as display of the character string 220.

Furthermore, prediction on whether the object included in the print result based on the application data after substitution may protrude from the print range is performed based on calculations that take into account factors that affect the appearance of the print result such as the character size, character width, etc. in the portion substituted with the substitute font; however, it does not need to be limited to this. For example, prediction referred to here may be performed based on the image data after proper image processing such as rasterizing is applied to the application data after substitution. However, the calculations referred to here have a shorter processing time than the image processing such as rasterization and a burden on the CPU 20a and so on for the processing is smaller.

In the third embodiment, the CPU 20a that executes the processing of the step S201 and the processing of the steps S203, S211 and S213 in the font substitution control task is an example of a first protrusion determining unit of the embodiment according to the present invention. Then, the character string 220 indicative of the warning message arranged in the font substitution guidance screen 200 is an example of first information of the embodiment according to the present invention. Furthermore, the CPU 20a that displays on the display 28b the font substitution guidance screen 200 that the character string 220 is arranged, that is, the CPU 20a that executes the processing of the step S17 via the step S205, or executes the processing of the step S31 via the step S215 constitutes an example of a first information output unit of the embodiment according to the present invention in cooperation with the display 28b.

Fourth Embodiment

Next, the fourth embodiment according to the present invention will be described.

The fourth embodiment is premised on the third embodiment. Moreover, in the fourth embodiment, out of all the fonts installed in the multifunction peripheral 10, that is, out of all the fonts included in the font data 456, a font that the object included in the print result based on the application data after substitution may protrude from the print range is excluded from a selection target (candidate) as a substitute font. In other words, in the fourth embodiment, a substitute font narrowing function is provided to narrow-down the selection candidate for the substitute font so that only fonts that the object included in the print result may not protrude from the print range, that is, only substitution adaptive fonts become the selection candidate.

Figure 17:
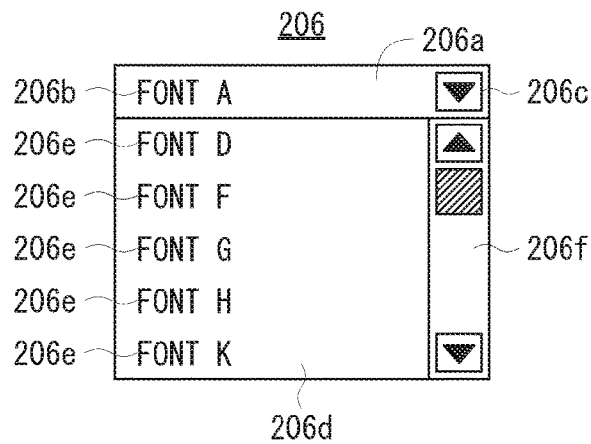
FIG. 17 is an illustrative view showing a state of a drop-down list in a fourth embodiment according to the present invention.

According to this substitute font narrowing function, comparing with FIG. 4, as shown in FIG. 17, only the character strings 206e, 206e—indicative of the substitution adaptive font are arranged to the drop-down list 206 (list box 206d) that is for selecting a substitute font. Specifically, the fonts that can be selected by the drop-down list 206, that is, the selection candidate as the substitute font is narrowed-down to only the substitution adaptive font. As a result, a font that may cause the object included in the print result to protrude from the print range, that is, a font that results in undesired print result is no longer selected as the substitute font, and thus, the trouble of the user due to selection of such a font can be reduced.

In addition, the regular font is automatically selected as a substitute font as described above immediately after displaying the font substitution guidance screen 200. Therefore, when the regular font does not correspond to the substitution adaptive font, that is, when the object included in the print result based on the application data after substitution in case of applying the regular font may protrude from the print range, the font substitution guidance screen 200 that the character string 220 indicative of the warning message as shown in FIG. 14 is arranged is displayed. Then, the font that can be selected by the drop-down list 206 is narrowed to only the substitution adaptive font in operating the drop-down list 206.

Figure 18:
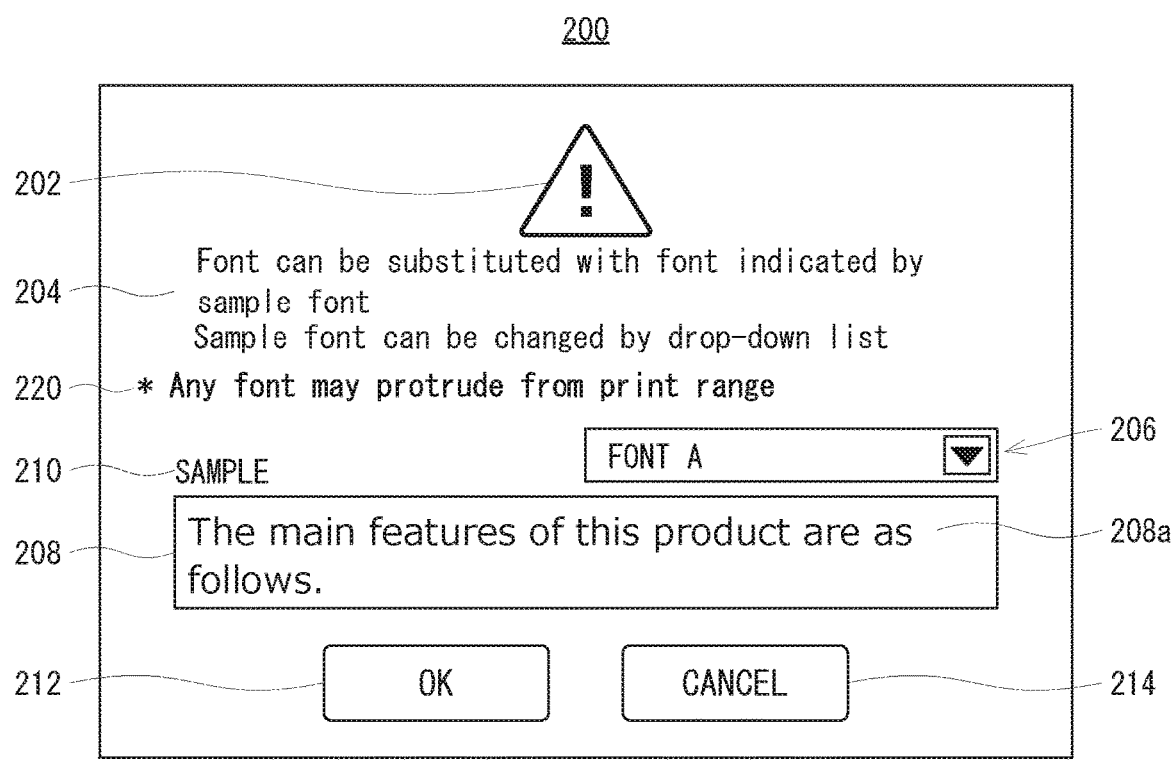
FIG. 18 is an illustrative view showing an example of a font substitution guidance screen in the fourth embodiment.

Moreover, when no substitution adaptive font exist, that is, when the object included in the print result may protrude from the print range for all the fonts installed in the multifunction peripheral 10, the font substitution guidance screen 200 becomes a manner as shown in FIG. 18. Specifically, the content of the warning message indicated by the character string 220 is changed. This character string 220 in FIG. 18 includes a content that informs the user that even if the non-installed font included in the application data is substituted with any font installed in the multifunction peripheral 10, the object included in the print result may protrude from the print range. Moreover, although it cannot be understood from FIG. 18, in a state shown in FIG. 18, that is, when no substitution adaptive font exist, the character strings 206e, 206e,—indicative of all the fonts installed in the multifunction peripheral 10 are displayed in the drop-down list 206 (list box 206d). There may be a user request to proceed with a print job even if there is no substitution adaptive font, and this is to meet such a request.

Figure 19:
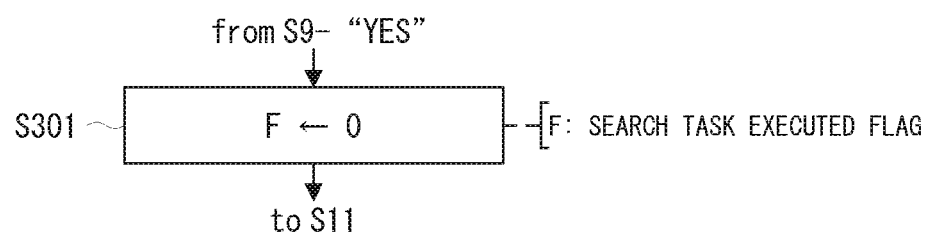
FIG. 19 is a flowchart showing a part of a font substitution control task in the fourth embodiment.
Figure 20:
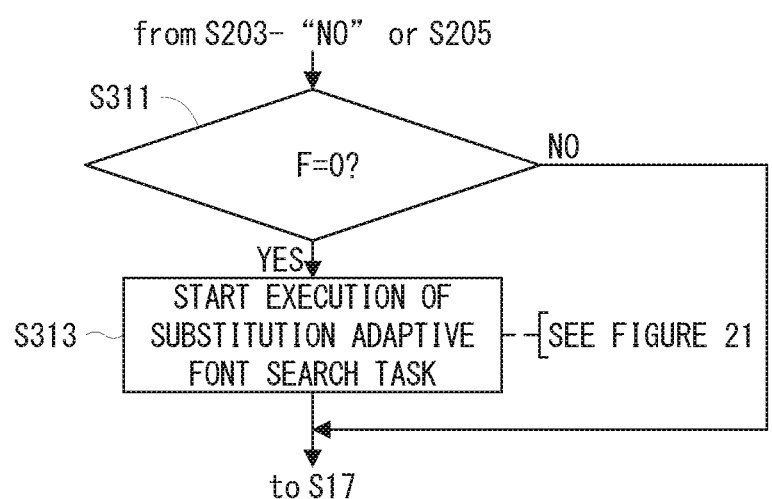
FIG. 20 is a flowchart showing another part of the font substitution control task in the fourth embodiment.

The CPU 20a executes the font substitution control task also in the fourth embodiment, in the fourth embodiment, and the step S301 as shown in FIG. 19 and the steps S311-S313 as shown in FIG. 20 are added to the font substitution control task. Moreover, the CPU 20a executes a substitution adaptive font search task that is a subprogram of the font substitution control task. This substitution adaptive font search task will be described later.

First, when it is determined in the above-described step S9 that a non-installed font is included in the application data (S9: "YES"), the CPU 20a advances the process to a step S301. Then, in this step S301, the CPU 20a sets "0" to a substitution adaptive font search task executed flag F. In addition, the substitution adaptive font search task executed flag F is an index indicating whether the substitution adaptive font search task is executed. For example, when "0" is set to the substitution adaptive font search task executed flag F, it is indicated that the substitution adaptive font search task has not ben executed. On the other hand, when "1" is set to the substitution adaptive font search task executed flag F, it is indicated that the substitution adaptive font search task has been executed. After setting "0" to such a substitution adaptive font search task executed flag F, the CPU 20a advances the process to the above-described step S11.

Furthermore, when determining that the object included in the print result based on the application data after substitution in case of applying the regular font may not protrude from the print range in the above-described step S203 (S203: "NO"), the CPU 20a advances the process to the step S311. Moreover, the CPU 20a also advances the process to the step S311 even when passing through the above-described step S205.

In this step S311, the CPU 20a determines whether "0" is set to the substitution adaptive font search task executed flag F. Here, when "1" is set to the substitution adaptive font search task executed flag F, that is, when the substitution adaptive font search task has been executed (S311: "NO"), the CPU 20a advances the process to the above-described step S17. On the other hand, when "0" is set to the substitution adaptive font search task executed flag F, that is, when the substitution adaptive font search task has not been executed (S311: "YES"), the CPU 20a advances the process to the step S313.

In the step S313, the CPU 20a starts execution of the substitution adaptive font search task. Moreover, the CPU 20a advances the process to the step S17.

Figure 21:
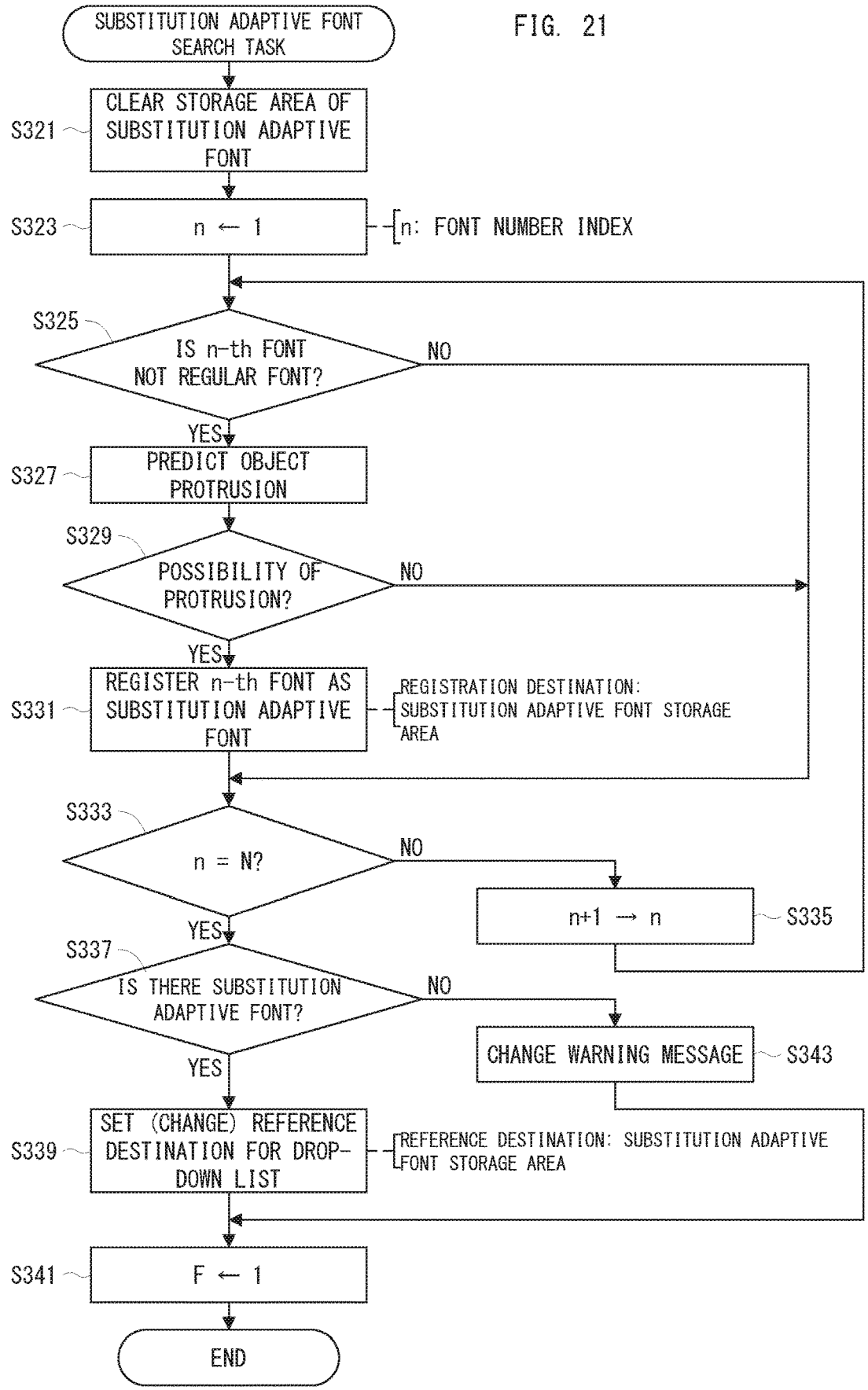
FIG. 21 is a flowchart showing a substitute font search task in the fourth embodiment.

FIG. 21 shows procedure of the substitution adaptive font search task. As shown in FIG. 21, first, the CPU 20a clears a substitution adaptive font storage area not shown in step S321. This substitution adaptive font storage area is an area for storing temporarily information indicative of a substitution adaptive font, for example, a font number described later, and is provided in the data storage area of the RAM of the main storage unit 20b. Then, the CPU 20a advances the process to a step S323.

In the step S323, the CPU 20a sets "1" that is a minimum value of the font number to an index n indicative of the font number. In addition, the font number is an identification number given to all the fonts installed in the multifunction peripheral 10, for example, is an individual number from the minimum value "1" to a maximum value "N". Then, the CPU 20a advances the process to a step S325.

In the step S325, the CPU 20a determines whether a font of the font number "n" is not the regular font. Here, when a font of the font number "n" is the regular font (S325: "NO"), the CPU 20a advances the process to a step S333 described later. On the other hand, when a font of the font number "n" is not the regular font (S325: "YES"), the CPU 20a advances the process to a step S327.

In the step S327, on the assumption that a font of the font number "n" is adopted as the substitute font, the CPU 20a predicts whether the object included in the print result based on the application data after substitution in case of applying the substitute font may protrude from the print range. This prediction is performed in the same or similar manner as the above-described step S201. Then, the CPU 20a advances the process to a step S329.

In the step S329, the CPU 20a determines, based on a prediction result in step S327, whether the object included in the print result based on the application data after substitution may protrude from the print range. Here, when the object included in the print result may not protrude from the print range (S229: "NO"), the CPU 20a advances the process to the step S333. On the other hand, when the object included in the print result may protrude from the print range (S229: "YES"), the CPU 20a advances the process to the step S331.

In the step S331, the CPU 20a registers the font of the font number "n" as the substitution adaptive font, specifically, stores the font number in the above-described substitution adaptive font storage area. Then, the CPU 20a advances the process to the step S333.

In the step S333, the CPU 20a determines whether the value of the font number index "n" is the maximum value "N". Here, when the value of the font number index "n" is not the maximum value "N" (S333: "NO"), the CPU 20a advances the process to a step S335. On the other hand, when the value of the font number index "n" is the maximum value "N" (S333: "YES"), the CPU 20a advances the process to a step S337 described later.

In the step S335, the CPU 20a increments the value of the font number index "n". Moreover, the CPU 20a returns the process to the step S325.

In contrast, when advancing the process to the step S337 from the step S333, the CPU 20a determines, in the step S337, whether a font that is registered as the substitution adaptive font exists, that is, whether one or more font numbers are stored in the above-described substitution adaptive font storage area. Here, when the substitution adaptive font exists (S337: "YES"), the CPU 20a advances the process to a step S339. On the other hand, when no substitution adaptive font exist (S337: "NO"), the CPU 20a advances the process to a step S343 described later.

In the step S339, the CPU 20a sets the substitution adaptive font storage area as a reference designation at the time of displaying the drop-down list 206 (each character string 206e, 206e,—in the list box 206d) in the font substitution guidance screen 200. As a result, when the drop-down list 206 is displayed, the substitution adaptive font storage area is referred to, and only the font corresponding to the font number stored (registered) in the substitution adaptive font storage area, that is, only the substitution adaptive font comes to be displayed on the drop-down list 206. The CPU 20a advances the process to a step S341 after execution of the processing in this step S339.

In the step S341, the CPU 20a sets "1" to the search task executed flag F. As a result, it is indicated that the substitution adaptive font search task is executed. With the execution of the step S341, the CPU 20a ends the substitution adaptive font search task.

Furthermore, the CPU 20a changes the content of the warning message in the step S343 when the process is advanced to the step S343 from the above-described step S337. In addition, the data indicative of the content of the warning message is stored in advance in the data storage area 450 of the RAM of the main storage unit 20b, for example. As a result, when the content of display of the font substitution guidance screen 200 is updated, the character string 220 indicative of the warning message after change comes to be arranged in the font substitution guidance screen 200. Moreover, the CPU 20a advances the process to the step S341.

Thus, according to the fourth embodiment, especially the substitute font narrowing function, the selection target (candidate) is narrowed-down so that only fonts that the object included in the print result may not protrude from the print range, that is, only substitution adaptive fonts become the selection candidate. As a result, a font that may cause the object included in the print result to protrude from the print range, that is, a font that results in undesired print result is no longer selected as the substitute font, and thus, the trouble of the user due to selection of such a font can be reduced.

In addition, in the fourth embodiment, the CPU 20a that executes the substitution adaptive font search task, especially the CPU 20a that executes the processing in the steps S323-S335 is an example of a second protrusion judgement unit of the embodiment according to the present invention. Then, the CPU 20a that executes the processing in the step S339 is an example of a narrowing unit of the embodiment according to the present invention. Furthermore, the character string 220 indicative of the warning message after change by the step S343, that is, the character string shown in FIG. 18 is an example of second information of the embodiment according to the present invention. Then, the CPU 20a that displays on the display 28b the font substitution guidance screen 200 including the character string 220 shown in FIG. 18 constitutes an example of a second information output unit of the embodiment according to the present invention in cooperation with the display 28b.

Moreover, the step S301 in the font substitution control task may be provided immediately after the step S11 or just before or immediately after the step S15.

Fifth Embodiment

In the following, the fifth embodiment according to the present invention will be described.

In the fifth embodiment, as shown in the multifunction peripheral 10, strictly the communication unit 256 is connected with a management server 70 that is one of external devices through a communication network 60. In addition, the management server 70 is provided in a management center not shown. This management server 70 has a font database (font DB) 70a that is stored with font data of various fonts. The management server 70 including this font database 70a will be described in detail.

The multifunction peripheral 10 according to the fifth embodiment also has an office direct printing function. Then, when a non-installed font is included in the application data, a print job is executed after the non-installed font is substituted.

However, if the non-installed font is substituted, there is an occasion that a print result of characters to which the substitute font is applied may differ from an original one and thus an original print result is not obtained. Therefore, if there is a measure to execute a print job without substitution of the non-installed font, that is, in a state where an original font being the non-installed font is applied as it is, there is an occasion that the user may want to select such a measure. On the other hand, even if the non-installed font is substituted, the non-installed font may be allowed to be replaced if there is no particular inconvenience, such as no significant influence on the print result. Therefore, when a non-installed font is included in the application data, if there are a plurality of options including a first option that the print job is executed with substituting for the non-installed font and a second option that the print job is executed with being applied with the non-installed font that is the original font as it is, it is very useful for the user.

Figure 23:
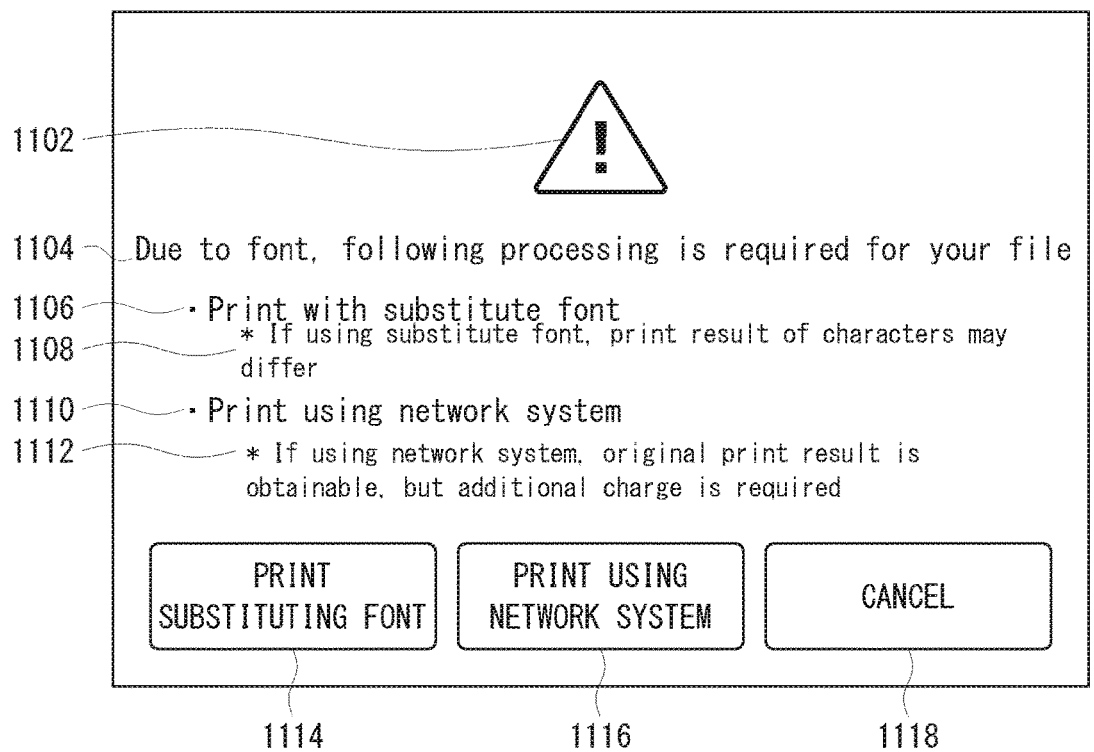
FIG. 23 is an illustrative view showing a first message screen in the fifth embodiment.

Then, according to the multifunction peripheral 10 according to the fifth embodiment, when a non-installed font is included in the application data in the office direct print function, a first message screen 1100 as shown in FIG. 23 is displayed on the display 28*b*. This first message screen 1100 is a modal dialog, for example.

In this first message screen 1100, an alert mark 1102 applied with an exclamation mark (!) is arranged in an upper center thereof. Then, an appropriate character string 1104 including a content that informs the user that predetermined processing is required due to a font in application data of the user (your) is arranged below the alert mark 1102. Then, below the character string 1104, there is arranged an appropriate character string 1106 that simply indicates that a print job is executed, after substitution of the font, which is one of the predetermined processing referred to here. Moreover, below the character string 1106, there is arranged an appropriate character string 1108 indicating an annotation when the print job is executed after substitution of the font. This character string 1108 includes a content that informs the user that a print result of a character (the substitute font is applied) may differ from the original when substituting for the font.

Furthermore, below the character string 1108, there is arranged an appropriate character string 1110 that simply indicates that a print job is executed using a network system, which is different from the print job represented by the above-described character string 1106. Executing a print job using the network system referred to here means receiving support of the management server 70 in order to make possible a print job in a state where the original font is applied as it is. Then, an appropriate character string 1112 that indicates an annotation in case of executing a print job using the network system is arranged below the character string 1110. This character string 1112 includes a content that informs the user that an additional charge is required while capable of obtaining an original print result if the network system is used.

Moreover, below the character string 1112, that is, in a lower portion of the first message screen 110, there are arranged three operation keys 1114, 1116 and 1118 side-by-side. The operation key 1114 at the left end out of these three operation keys 1114, 1116 and 1118 is a "print substituting font" key for instructing to execute the print job with substituting the font, which is one of the above-described processing, that is, corresponding to the character string 1106. The operation key 1116 of the center is a "print using network system" key for instructing to execute the print job with using the network, that is, corresponding to the character string 1110. The operation key 1118 at the right end is a "cancel" key for instructing to shelve execution of the print job, that is, for ending an operation in the first message screen 1100.

Specifically, according to the first message screen 1100, three options are presented to the user, including an option that the print job is executed with substituting the font, an option that the print job is executed with using the network and an option that the print job is shelved. Out of these options, the option that the print job is executed with substituting for the font is corresponding to the above-described first option. Then, the option that the print job is executed with using the network is corresponding to the above-described second option. Moreover, the other option that execution of the print job is shelved is presented to the user.

Figure 24:
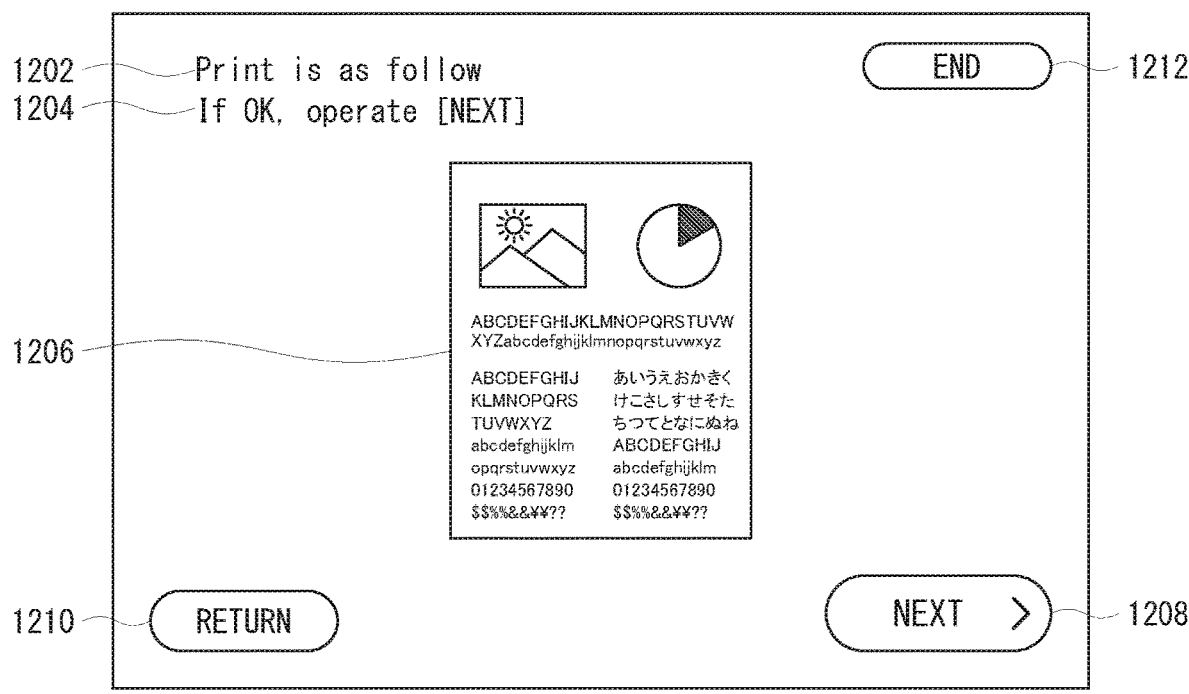
FIG. 24 is an illustrative view showing a preview screen in the fifth embodiment.

It is supposed that the "print substituting font" key 1114 is operated in this first message screen 1100, the first message screen 1100 is deleted. Then, a preview screen 1200 as shown in FIG. 24 is displayed on the display 28*b*. Strictly, if the "print substituting font" key 1114 is operated, in response thereto, image processing for generating the preview image data based on the application data is performed by the image processing portion 14. During this period of time, the display 28*b* displays a during processing message screen not shown indicating that the predetermined processing including the image processing by the image processing unit 14 is being performed. Specifically, if the "print substituting font" key 1114 is operated, the first message screen 1100 is deleted and the during processing message screen displayed on the display 28*b*. Then, if the preview image data is generated by the image processing portion 14, instead of the during processing message screen, a preview screen 1200 is displayed on the display 28*b*.

As shown in FIG. 24, in the preview screen 1200, a character string 1202 is arranged in an upper left position, for example. This character string 1202 includes a content that informs the user that a print job to be executed is expected to obtain a print result as represented by the preview image 1206 described later. Then, another character string 1204 is arranged below the character string 1202. This character string 1204 includes a content that prompts the user to operate a "next" key 1208 described later if the user agrees that the print result as represented by the preview image 304 can be obtained (if there is no particular problem). Furthermore, below the character string 1204, that is, in the mostly center of the preview screen 1200, a preview image 1206 is arranged.

The preview image 1206 is a reduced image of an image expected as a print result, and is arranged based on the preview image data generated by the above-described image processing unit 14. In addition, FIG. 24 shows an example of the preview image 304 based on the application data (document file) created by certain word processing software as compatible application software, strictly based on the application data after substitution. Then, although it does not understand from FIG. 24, the typeface of a character portion of the substitute font in the preview image 304 is slightly different from that of the original font. Moreover, when application data is created by application software other than word processing software such as spreadsheet software, the preview image 1206 based on the application data, strictly, based on application data after substitution is arranged.

Furthermore, a "next" key 1208 is arranged in a suitable position, near a lower right corner of the preview screen 1200, for example. This "next" key 1208 is an operation key for instructing to proceed to next procedure required for executing a print job. Moreover, a "return" key 1210 is arranged near a lower left corner of the preview screen 1200. This "return" key 1210 is an operation key for instructing the first message screen 1100, which is the previous screen for the preview screen 1200, to return to a state displayed on the display 28*b* again. Furthermore, an "end" key 1212 is arranged near an upper right corner of the preview screen 1200. This "end" key 1212 is an operation key for instructing to end the use of the office direct print function while shelving execution of the print job.

In response to displaying such a preview screen 1200, the user can confirm, before the print job is executed, what kind of print result is obtainable by especially referring to the preview image 1206. Here, if the user agrees that a print result as represented by the preview image 1026 can be obtained, for example, it is possible for the user to proceed to next procedure required for executing the print job by operating the "next" key 1208. In this case, a suitable operation screen not shown is displayed on the display 28b instead of the preview screen 1200, which is for advancing to next procedure required for executing the print job based on the application data after substitution.

In contrast, if the "return" key 1210 is operated in the preview screen 1200, the first message screen 1100 that is the previous screen for the preview screen 1200 is displayed on the display 28b again instead of the preview screen 300. As a result, the user can select again any one of the first the option that the print job is executed with substituting the font, the second option that the print job is executed with using the network and the other option that the print job is shelved.

On the other hand, when the "end" key 1212 is operated, the execution of the print job is shelved. Then, instead of the preview screen 1200, an end message screen not shown that indicates that use of the office direct print function is to be ended is displayed on the display 28b during a predetermined period of time (several seconds, for example). Then, a home screen not shown is displayed on the display 28b.

Returning to FIG. 23, it is supposed that the "print using network system" key 1116 is operated in this first message screen 1100, the first message screen 1100 is deleted. Then, a during communication message screen not shown is displayed on the display 28b. Moreover, support is requested for executing the print job with the original font applied as it is from the multifunction peripheral 10 to the management server 70, including transmission of the application data from the multifunction peripheral 10 to the management server 70.

The management server 70 is a management device for managing the multifunction peripheral 10, and also a support device for supporting the print job by the multifunction peripheral 10. Specifically, the management server 70 has the font database 70a as described above, and the font data of various fonts including a font(s) not installed in the multifunction peripheral 10 is stored in the font database 70a. Then, when the management server 70 receives a support request from the multifunction peripheral 10, the management server 70 extracts from the font database 70a a font as same as a font included in the application data that is received accompanying the support request, that is, the original font. Moreover, the management server 70 converts the application data into predetermined format data that enables the print job with the original font included in the application data applied as it is. This predetermined format data is a PDF file, for example, and strictly, is a PDF file that the original font is embedded therein. Then, the management server 40 performs a reply to the support request from the multifunction peripheral 10, including transmitting the predetermined format data after conversion to the multifunction peripheral 10.

If the reply from the management server 70 is received by the multifunction peripheral 10, instead of the above-described during communication message screen, the preview screen 1200 (see FIG. 24) is displayed on the display 28b. At this time, the image processing for generating the preview image data based on the predetermined format data by the image processing portion 14 is performed, whereby the preview image 1206 based on the preview image data is arranged in the preview screen 1200. Such a preview image 1206 is an image that the original font is applied (reflected)

as it is. Then, when the "next" key 1208 is operated, the above-described operation screen to proceed next procedure required for executing the print job based on the predetermined format data, that is, required for executing the print job in a state where the original font is applied as it is displayed on the display 28b. In addition, if the "return" key 1210 is operated, as similar to the above, instead of the preview screen 1200, the first message screen 1100 is displayed on the display 28b. Then, if the "end" key 1212 is operated, as similar to the above, after execution of the print job is shelved, instead of the preview screen 1200, an end message screen is displayed on the display 28b for a predetermined period of time, and then, a home screen is displayed on the display 28b.

Returning to FIG. 23 again, the "cancel" key 1118 in the first message screen 1100 is operated, the first message screen 1100 is deleted. Then, execution of the print job is shelved. Moreover, the above-described data acquisition screen for selecting and acquiring the application data to be applied to the print job is from a proper data source such as the external storage medium 50 is displayed on the display 28b. As a result, the user can appropriately redo the previous operations including selecting and acquiring further application data from the proper data source such as the external storage medium 50, etc.

In addition, when all the fonts included in application data are installed in the multifunction peripheral 10, that is, when not substituting for the font, the first message screen 1100 and the preview screen 1200 are not displayed. In this case, as similar to the time that the "next" key 1208 in the preview screen 1200 is operated, an operation screen for advancing to next procedure required for executing a print job is displayed on the display 28b. As a case where the font is not substituted, there is a case where the application data may be created by the predetermined application software that is not compatible application software, for example. Moreover, for example, if the application data is a so-called environment non-dependent file such as a PDF file that does not depend on the handling environment, the font is also not substituted. Furthermore, even in a case where the application data is created by the compatible application software, if all the fonts included in the application data are installed in the multifunction peripheral 10, the font is not substituted. Then, when the font is not originally included in the application data, the font is not substituted.

Figure 6:
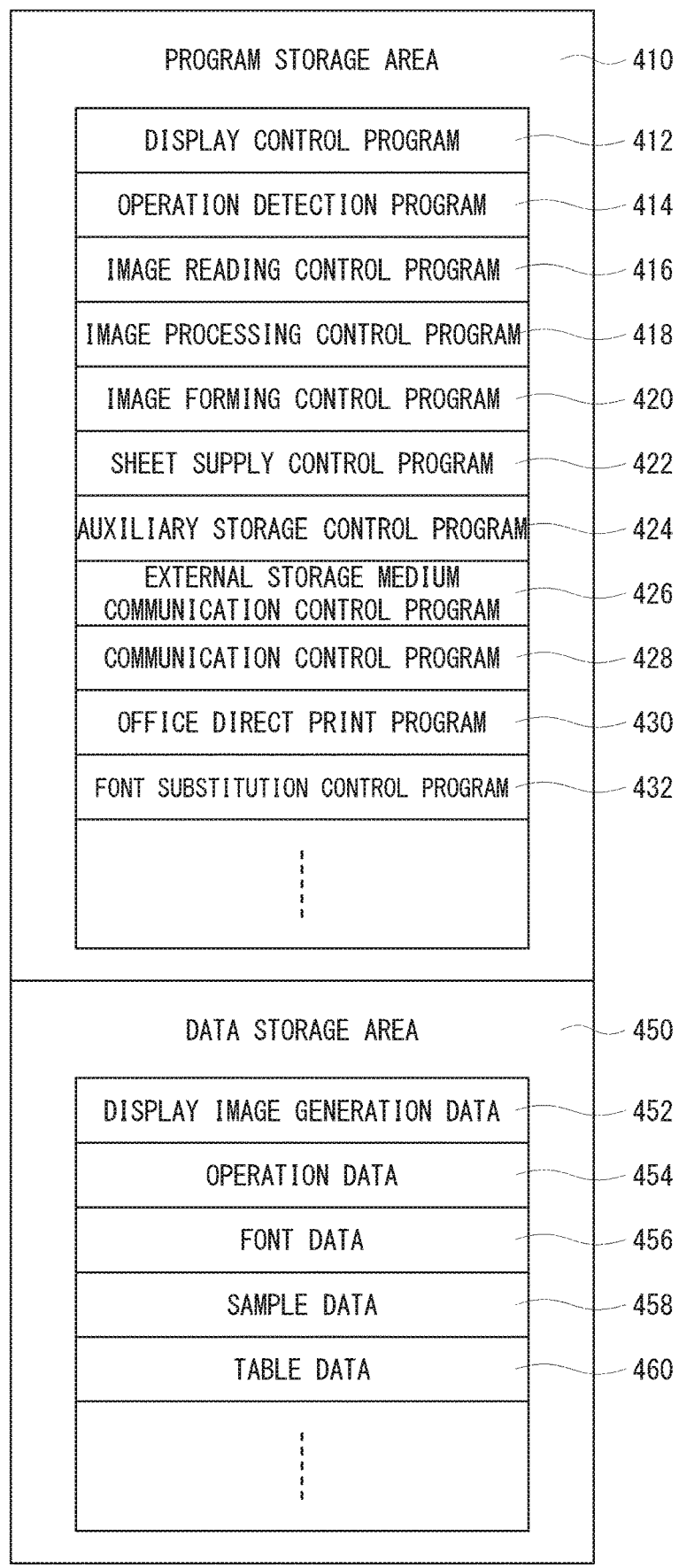
FIG. 6 is a memory map conceptually showing structure in a RAM of a main storage unit in the first embodiment.
Figures 25, 26:
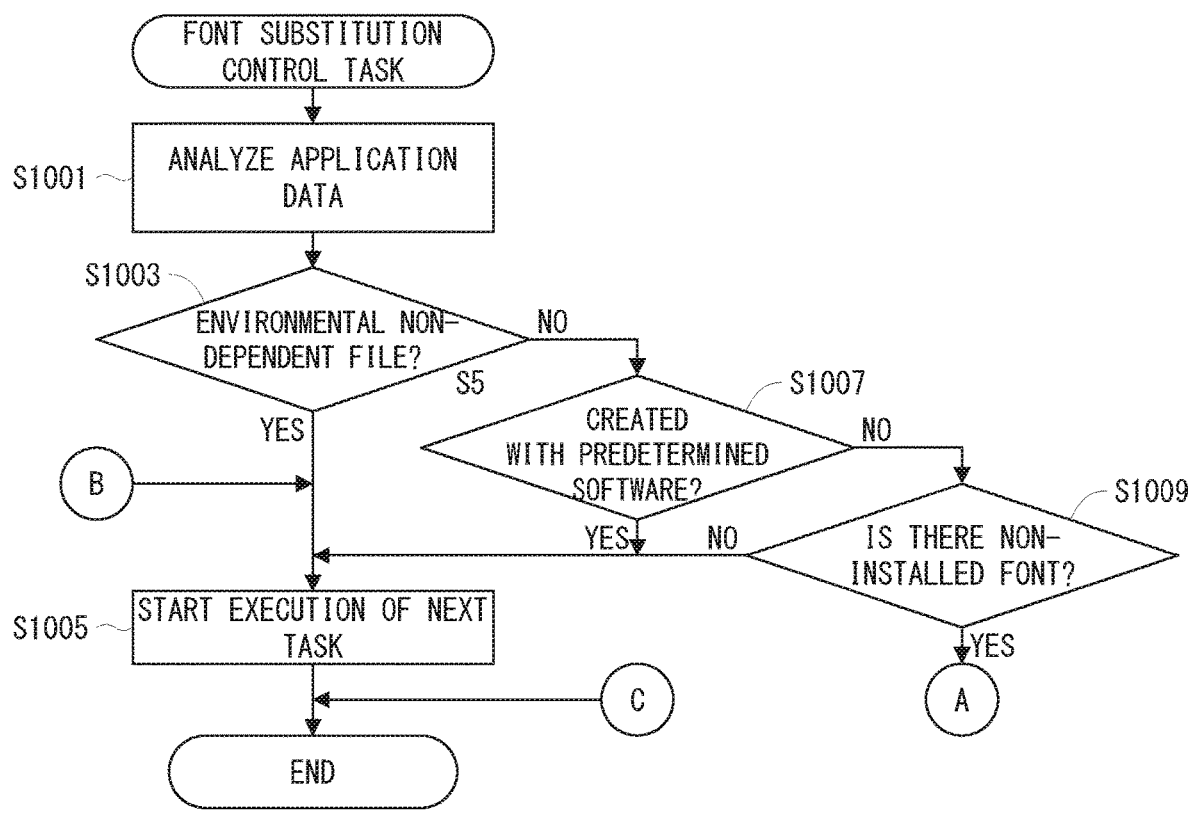
FIG. 25 is an illustrative view conceptually showing structure of a substitute font table in the fifth embodiment.
FIG. 26 is a flowchart showing a part of a font substitution control task in the fifth embodiment.

In the fifth embodiment, a substitute font table 460c shown in FIG. 25 is provided. This substitute font table 460c is included in the above-described table data 460 (FIG. 6). This substitute font table 460c is a table that summarizes correspondence that the fonts not included in the font data 456 (see FIG. 6), that is, the non-installed fonts that are not installed in the multifunction peripheral 10 are to be substituted with what fonts included in the font data 456. Specifically, when the non-installed font is included in the application data to be applied to the print job by the office direct prin function, the correspondence that the non-installed font is to be substituted with what font included in the font data 456 is summarized in the substitute font table 460c.

Figure 27:
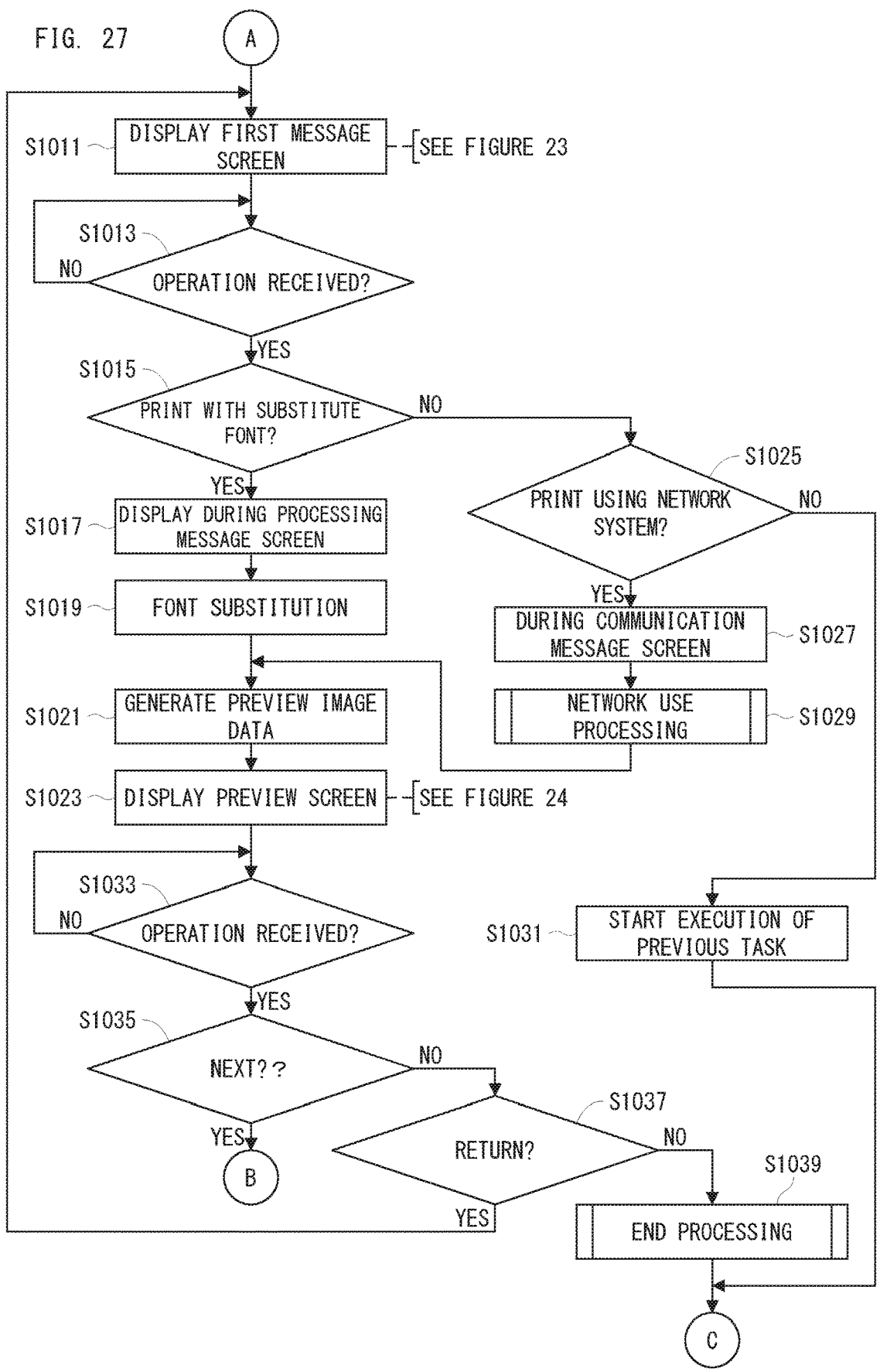
FIG. 27 is a flowchart showing a remaining part of the font substitution control task in the fifth embodiment.

Also in the fifth embodiment, the CPU 20a executes a font substitution control task when executing the print job by the office direct print function. The flow of the font substitution control task in the fifth embodiment is shown in FIG. 26 and FIG. 27.

In the font substitution control task of the fifth embodiment, in a step S1001, the CPU 20a first analyzes the application data to be applied to the print job by the direct print function, and analyzes attribute information including a file extension of the application data, etc., for example. Then, the CPU 20*a* advances the process to a step S1003.

In the step S1003, the CPU 20*a* determines whether the application data to be applied to the print job is environment non-dependent file such as a PDF file based on an analysis result in the step S1001. Here, when the application data is the environment non-dependent file (S1003: "YES"), the CPU 20*a* advances the process to a step S1005. On the other hand, when the application data is environmental dependent file (S1003: "NO"), the CPU 20*a* advances the process to a step S1007 described later.

In the step S1005, that CPU 20*a* starts execution of a next task required for executing a print job based on the application data. As a result, the operation screen for advancing to the above-described next procedure is displayed on the display 28*b*. As a result, the CPU 20*a* ends the font substitution control task.

In contrast, when the process proceeds to a step S1007 from the step S1003, the CPU 20*a* determines, in the step S1007, whether the application data is created by the predetermined application software. Determination in this step S1007 is also performed based on the analysis result in the step S1001. When it is determined that the application data is created by the predetermined application software in the step S1007 (S1007: "YES"), the CPU 20*a* advances the process to the step S1005. On the other hand, when the application data is not created by the predetermined application software, that is, when the application data is created by the compatible application software (S1007: "NO"), the CPU 20*a* advances the process to a step S1009.

In the step S1009, the CPU 20*a* determines whether a font not included in the font data 456 is included in the application data, that is, whether a non-installed font is included in the application data. Determination in this step S1009 is also performed based on the analysis result in the step S1001. Here, when the non-installed font is not included in the application data (S1009: "NO"), for example, the CPU 20*a* advances the process to the step S1005. On the other hand, when the non-installed font is included in the application data (S1009: "YES"), the CPU 20*a* advances the process to a step S1011. In addition, when no font is included in the application data, the CPU 20*a* advances, of course, the process to the step S1005.

In the step S1011, the CPU 20*a* displays the first message screen 1100 on the display 28*b*. Then, the CPU 20*a* advances the process to a step S1013.

In the step S1013, the CPU 20*a* waits for the first message screen 1100 to receive an operation (S1013: "NO"). Then, if the first message screen 1100 receives an operation (S1013: "YES"), the CPU 20*a* advances the process to a step S1015.

In the step S1015, the CPU 20*a* determines whether the operation received in the step S1013 is an operation to the "print substituting font" key 1114 in the first message screen 1100. Here, when the operation received in the step S1013 is an operation to the "print substituting font" key 1114 (S1015: "YES"), the CPU 20*a* advances the process to a step S1017. On the other hand, when the operation received in the step S1013 is not an operation to the "print substituting font" key 1114 (S1015: "NO"), the CPU 20*a* advances the process to a step S1025 described later.

In the step S1017, the CPU 20*a* displays the above-described during processing message screen on the display 28*b*, strictly after deleting the first message screen 1100, displays the during processing message screen on the display 28*b*. Then, the CPU 20*a* advances the process to a step S1019.

In the step S1019, the CPU 20*a* substitutes the non-installed font included in the application data with the font (substitute font) according to the substitute font table 460*c* while referring to the substitute font table 460*c*. Then, the CPU 20*a* advances the process to a step S1021.

In the step S1021, based on the application data after substitution, the CPU 20*a* controls the image processing unit 14 so as to generate preview image data. Accordingly, the image processing unit 14 performs the image processing for generating preview image data, including rasterizing. Then, the CPU 20*a* advances the process to the step S1023.

In the step S1023, the CPU 20*a* displays the preview screen 1200 on the display 28*b* instead of the during processing message screen. At this time, the CPU 20*a* arranges the preview image 1206 in the preview screen 1200 based on the preview image data generated in the step S1021. Then, the CPU 20*a* advances the process to a step S1033 described later.

In contrast, when advancing the process to the step S1025 from the above-described step S1015, the CPU 20*a* determines, in the step S1025, whether the operation received in the step S1013 is an operation to the "print using network system" key 1116 in the first message screen 1100. Here, when the operation received in the step S1013 is an operation to the "print using network system" key 1116 (S1025: "YES"), the CPU 20*a* advances the process to a step S1027. On the other hand, when the operation received in the step S1013 is not an operation to the "print using network system" key 1116, that is, when it is to the "cancel" key 1118 (S1025: "NO"), the CPU 20*a* advances the process to a step S1031 described later.

In the step S1027, the CPU 20*a* displays the above-described during communication message screen on the display 28*b*. Then, the CPU 20*a* advances the process to a step S1029.

In the step S1029, the CPU 20*a* executes network use processing that is a subtask (subroutine) of the font substitution control task. Although the network use processing in this step S1029 will be described in detail later, in the network use processing of the step S1029, the CPU 20*a* requests support to the management server 70, for enabling execution of the print job in a state where the original font is applied as it is. Then, the CPU 20*a* receives a reply from the management server 70 to this support request. A PDF file as the above-described predetermined format data is included in this reply from the management server 70. Then, the CPU 20*a* advances the process to the step S1021 if receiving the reply from the management server 70.

In this case, in the step S1021, based on the predetermined format data, the CPU 20*a* controls the image processing unit 14 so as to generate preview image data. Furthermore, in the step S1023, the CPU 20*a* displays the preview screen 1200 on the display 28*b* instead of the during communication message screen. At this time, the CPU 20*a* arranges the preview image 1206 in the preview screen 1200 based on the preview image data generated in the step S1021, that is, the preview image data based on the predetermined format data. Then, the CPU 20*a* advances the process to a step S1033 described later.

Furthermore, when advancing the process to step S1031 from the above-described step S1025, the CPU 20*a* starts, in the step S1031, execution of the data acquisition task that is a previous task prior to the font substitution control task in order to display the above-described data acquisition screen on the display 28*b*. As a result, the first message screen 1100 is deleted, and the data acquisition screen is displayed on the display 28*b*. With this, the CPU 20*a* ends the font substitution control task.

Moreover, when advancing the process to the step S1033 from the above-described step S1023, in the step S1033, the CPU 20*a* waits for the preview screen 1200 to receive an operation, (S1033: "NO"). Then, if the preview screen 1200 receives an operation (S1033: "YES"), the CPU 20*a* advances the process to a step S1035.

In the step S1035, the CPU 20*a* determines whether the operation received in the step S1033 is an operation to the "next" key 1208 in the preview screen 1200. Here, when the operation received in the step S1033 is an operation to the "next" key 1208 (S1035: "YES"), the CPU 20*a* advances the process to the above-described step S1005. On the other hand, when the operation received in the step S1033 is not an operation to the "next" key 1208 (S1035: "NO"), the CPU 20*a* advances the process to a step S1037.

In the step S1037, the CPU 20*a* determines whether the operation received in the above-described step S1033 is an operation to the "return" key 1210 in the preview screen 1200. Here, when the operation received in the step S1033 is an operation to the "return" key 1210 (S1037: "YES"), the CPU 20*a* returns the process to the above-described step S1011. On the other hand, when the operation received in the step S1033 is not an operation to the "return" key 1210, that is, an operation to "end" key 1212 (S1037: "NO"), the CPU 20*a* advances the process to a step S1039.

In the step S1039, the CPU 20*a* executes end processing for ending the office direct print function. The end processing in this step S1039 includes processing that the above-described end message screen is displayed on the display 28*b* during a predetermined period of time instead of the preview screen 1200, and then, the above-described home screen is displayed on the display 28*b*. With this, the CPU 20*a* ends the font substitution control task.

Figure 28:
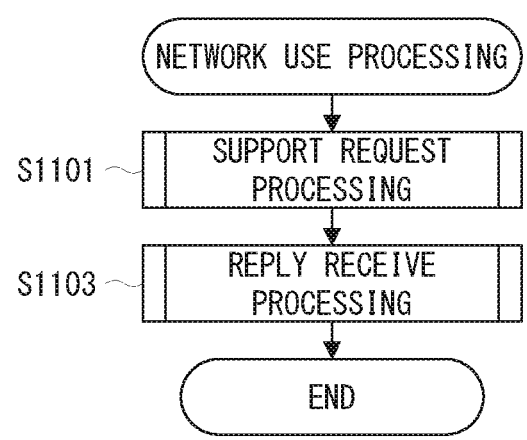
FIG. 28 is a flowchart showing details of network use processing in the fifth embodiment.

With reference to FIG. 28, the network use processing of the above-described step S1029 will be described in detail. In this network use processing, the CPU 20*a* first executes support request processing in a step S1101. In the support request processing in this step S1101, the CPU 20*a* requests to the management server 70 support for enabling execution of the print job in a state where the original font is applied as it, including transmission of the application data to the management server 70. Then, the CPU 20*a* advances the process to a step S1103.

In the step S1103, the CPU 20*a* executes reply reception processing. In the reply reception processing in this step 1103, the CPU 20*a* receives a reply from the management server 70 to the support request in the step S1101. The PDF file as the above-described predetermined format data is included in this reply from the management server 70. If this reply from the management server 70 is received, the CPU 20*a* ends the network use processing.

Figure 29:
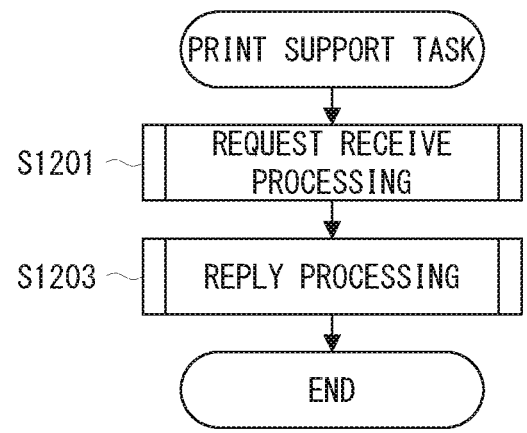
FIG. 29 is a flowchart showing a print support task in the fifth embodiment.

While such the network use processing is executed by the CPU 20*a*, the management server 70 (strictly, a computer of the management server 70) executes a print support task. The flow of this print support task is shown in FIG. 29. In addition, when there is an access demand from the multifunction peripheral 10 (CPU 20*a*), the print support task is executed in response thereto.

According to this print support task, the management server 70 first executes request reception processing in a step S1201. In the request reception processing of this step S1201, the management server 70 receives the support request from the multifunction peripheral 10, including reception of the application data that is transmitted from the multifunction peripheral 10. Then, the management server 70 advances the process to a step S1203.

In the step S1203, the management server 70 executes reply processing. In the reply processing of this step S1203, the management server 70 converts the application data received by the request reception processing in the step S1201 into the predetermined format data for enabling execution of the print job in the state where the original font is applied as it is. As described above, the predetermined format data is a PDF file, for example. Then, the management server 70 performs a reply to the support request from the multifunction peripheral 10, including transmitting the predetermined format data after conversion to the multifunction peripheral 10. With this, the management server 70 ends the print support task.

As described above, according to the fifth embodiment, especially according to the office direct print function, when a non-installed font is included in the application data, the first message screen 1100 (see FIG. 23) is displayed on the display 28*b*. Specifically, three options are presented to the user, including the first option that the print job is executed with substituting the font, the second option that the print job is executed with using the network and the other option that the print job is shelved. This is very useful for the user.

In addition, in the fifth embodiment, that CPU 20*a* that executes the processing of the steps S1001, S1003, S1007 and S1009 in the font substitution control task (see FIG. 26) is an example of a font determining unit of the embodiment according to the present invention. Moreover, the CPU 20*a* that executes the processing of the step S1011 in the font substitution control task (see FIG. 27), that is, the CPU 20*a* that displays the first message screen 1100 on the display 28*b* constitutes an example of a presentation unit of the embodiment according to the present invention in cooperation with the display 28*b*.

Furthermore, proper processing that is executed by the CPU 20*a* in response to reception of the operation to the "print substituting font" key 1114 in the first message screen 1100 is an example of first processing of the embodiment according to the present invention. Moreover, proper processing that is executed by the CPU 20*a* in response to reception of the operation to the "print using network system" key 1116 in the first message screen 1100, especially proper processing including the network use processing of the step S1029 in the font substitution control task is an example of second processing of the embodiment according to the present invention. Then, the CPU 20*a* that executes the first processing and the second processing is an example of a processing performing unit of the embodiment according to the present invention.

Moreover, the support request processing of the step S1101 in the network use processing (see FIG. 28) is an example of transmission processing of the embodiment according to the present invention. Then, the reply reception processing of the step S1103 in the network use processing is an example of reception processing of the embodiment according to the present invention.

Moreover, the CPU 20*a* that executes the processing of the steps S1021 and S1023 in the font substitution control task constitute an example of a second preview image display unit of the embodiment according to the present invention in cooperation with the image processing unit 14 and the display 28*b*. Then, the preview image 1206 in the preview screen 1200 is an example of a second preview image of the embodiment according to the present invention.

Sixth Embodiment

Next, the sixth embodiment according to the present invention will be described.

Figure 30:
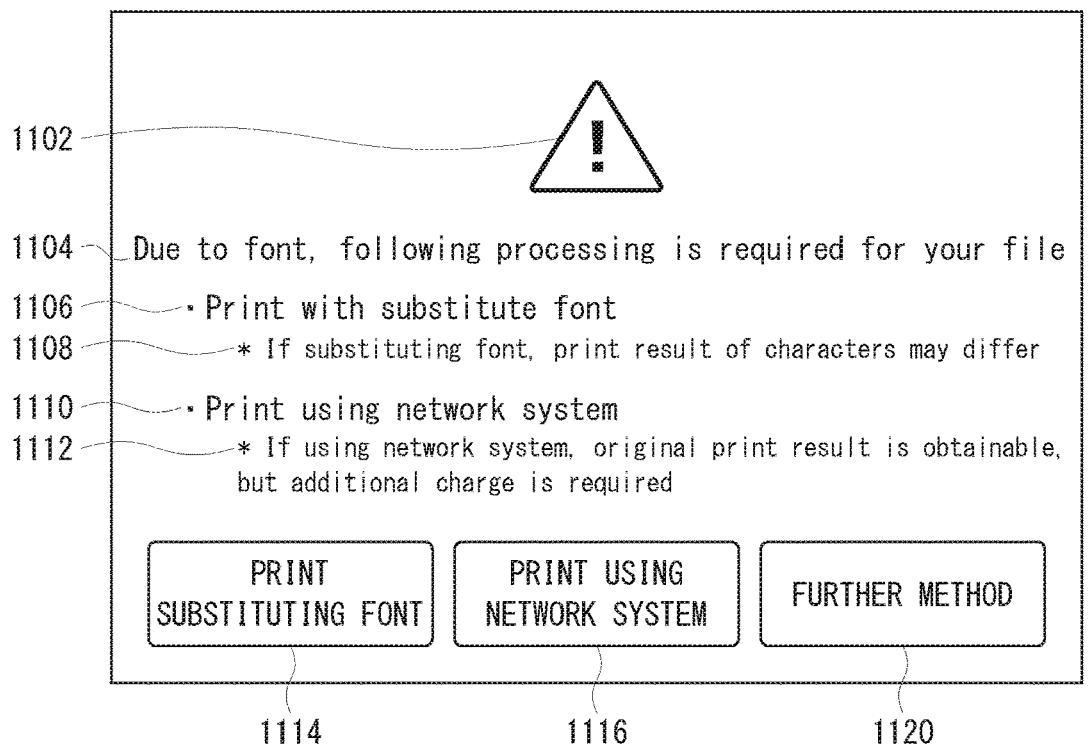
FIG. 30 is an illustrative view showing a first message screen in a sixth embodiment according to the present invention.

In the sixth embodiment, a first message screen 1100a of a manner as shown in FIG. 30 is displayed. In the first message screen 1100a shown in FIG. 30, instead of the "cancel" key 1118 of the first message screen 1100 in the fifth embodiment shown in FIG. 23, another key referred to as "further method" key 1120 is arranged. In addition, since the structure of those other than this of the first message screen 1100a shown in FIG. 30 is the same as the structure of the first message screen 1100 in the fifth embodiment shown in FIG. 23, by applying the same or similar reference numerals to the same or similar portions, detailed description thereof will be omitted.

Figure 31:
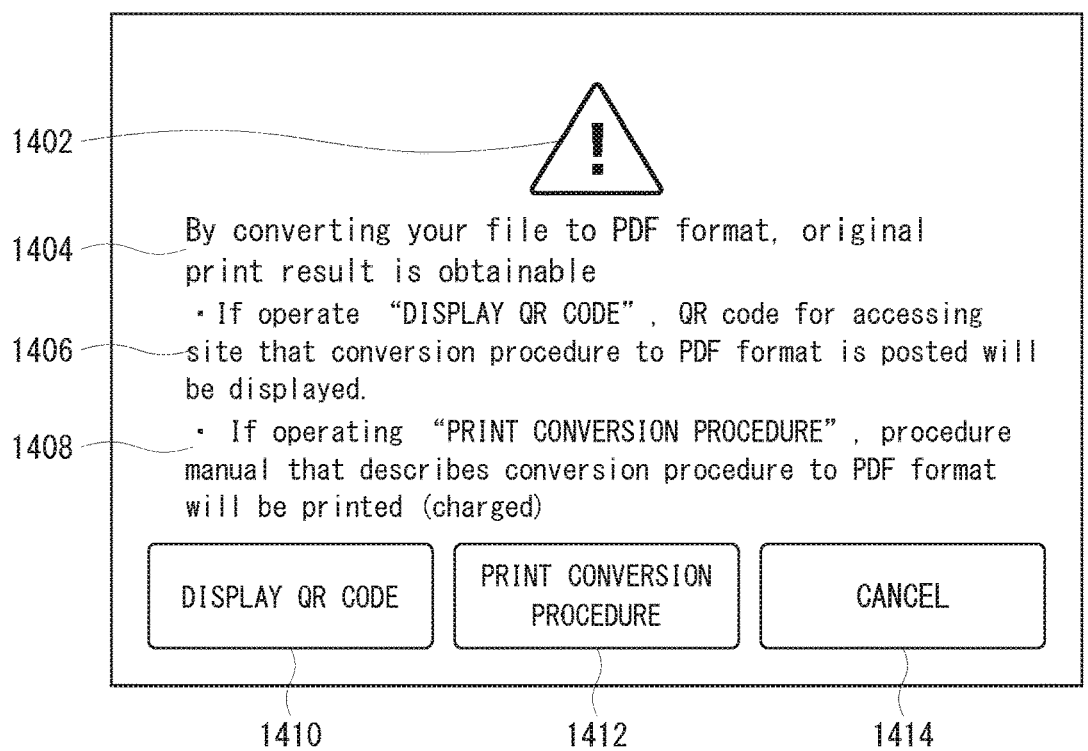
FIG. 31 is an illustrative view showing a second message screen in the sixth embodiment.

The "further method" key 1120 of the first message screen 1100a shown in this FIG. 30, an operation key corresponding to a third option different from the first option corresponding to "print substituting font" key 114 and the second option corresponding to "print using network system" key 1116. Specifically, according to the first message screen 1100a in the sixth embodiment, three options referred to as the first option, the second option and the third option are presented to the user. Then, if the "further method" key 1120 corresponding to the third option is operated, for example, the first message screen 1100a is deleted and a second message screen 1400 as shown in FIG. 31 is displayed on the display 28b. In addition, the second message screen 1400 is a modal dialog similar to the first message screen 1100a.

In this second message screen 1400, an alert mark 1402 as the same as that in the first message screen 1100a is arranged in an upper center thereof. Then, below the character string 1402, there is arranged a character string 1404 that includes a content that informs the user that an original print result is obtainable by converting the application data of the user (your) into a PDF format. Furthermore, a character string 1406 that includes a suitable explanatory note on a "display QR code" key 1410 described later is arranged below the character string 1404. This character string 1406 include a content that informs the user that if the "display QR code" key 1410 is operated, a QR code (registered trademark) for accessing a website not shown that describes procedure for converting the application data of the user into the PDF format is displayed. Moreover, below the character string 1406, a character string 1408 that includes a suitable explanatory note on a "print conversion procedure" key 1412 is arranged. This character string 1408 includes a content that informs the user that if the "print conversion procedure" key 1412 is operated, a procedure manual that describes the conversion procedure to PDF format is printed with a charge.

Moreover, below the character string 1408, that is, in a lower portion of the first message screen 1100a, three operation keys 1410, 1412 and 1414 are arranged side-by-side. The operation key 1410 at the left end out of the three operation keys 1410, 1412 and 1414 is a "display QR code" key corresponding to the character string 1406. Then, the operation key 1412 in the center is a "print conversion procedure" key corresponding to the character string 1408. The operation key 1414 at the right end is a "cancel" key for instructing to shelve execution of the print job, that is, for ending an operation in the second message screen 1100, and thus, instructing to transit to a state where the above-described data acquisition screen is displayed on the display 28b.

Figure 32:
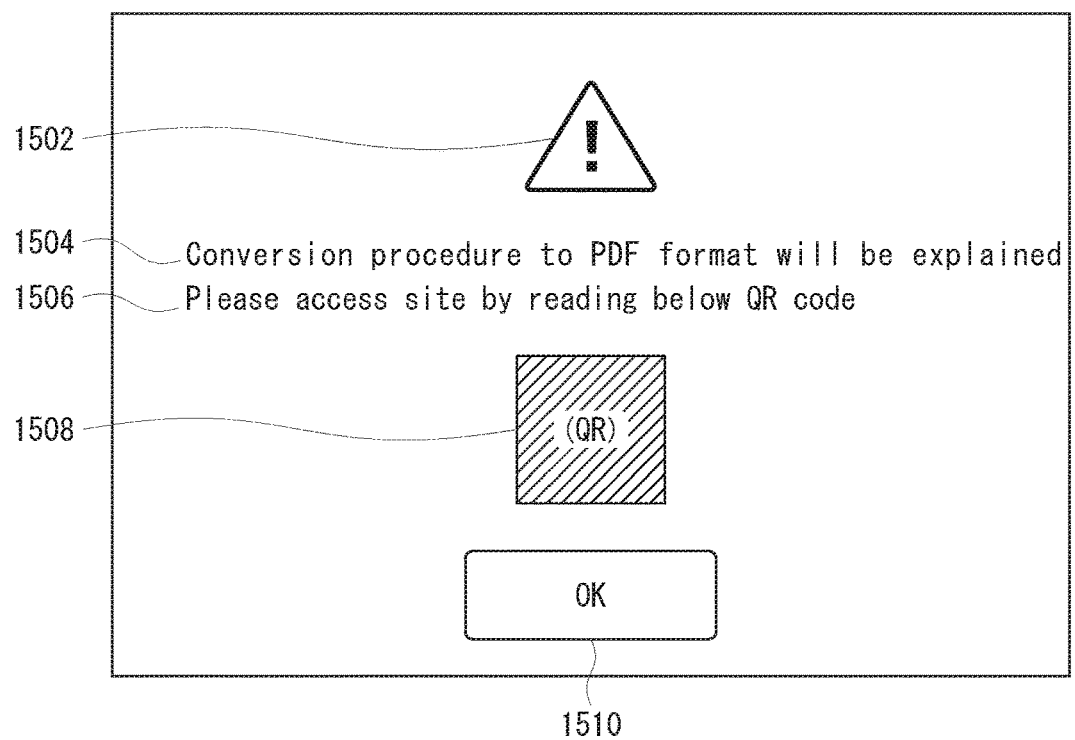
FIG. 32 is an illustrative view showing a QR code presentation screen in the sixth embodiment.

It is supposed that the "display QR code" key 1410 is operated in this second message screen 1100. Then, instead of the second message screen 1400, a QR code presentation screen 1500 as shown in FIG. 32 is displayed on the display 28b. In addition, the QR code presentation screen 1500 is also a modal dialog, for example.

In the QR code presentation screen 1500, an alert mark 1502 as the same as that in the first message screen 1100a (and the second message screen 1400) is arranged in an upper center thereof. Then, below the alert mark 1502, there is arranged an appropriate character string 1504 including a content that informs the user that the procedure for converting (now on) the application data into the PDF format is to be explained. Moreover, below the character string 1504, there is arranged an appropriate character string 1406 that includes a content that prompts the user to access the above-described website by reading a QR code 1508 (by a mobile communication terminal with camera owned by the user). Then, the QR code 1508 is arranged below the character string 1506. This QR code 1508 includes information (URL information) for accessing to the above-described website. Furthermore, below the QR Code 1508, that is, in a lower portion of the QR code presentation screen 1500, an "OK" key 1510 is arranged. This "OK" key 15010 is an operation key for the user to express that the user recognizes the content of the QR code presentation screen 1500, preferably, the user reads the QR code 1508.

In response to displaying such a QR code presentation screen 1500, the user reads the QR code 1508 with a portable communication terminal that self possesses. As a result, the user can obtain information for accessing to the above-described website, and thus, recognize the procedure for converting the application data into the PDF format. Then, if the "OK" key 1510 in the QR code presentation screen 1500 is operated, the QR code presentation screen 1500 is deleted, and after the above-described end message screen is displayed on the display 28b during a predetermined period of time, the above-described home screen is displayed on the display 28b.

In addition, although the website referred to here is configured by the management server 70, for example, it may be configured by another server. Moreover, although the procedure for converting the application data into the PDF format is described in the website as described above, in addition thereto, appropriate annotation including a content that informs the user that the original print result can be obtained by subjecting the converted PDF file to the print job by the office direct print function of the multifunction peripheral 10 are also posted.

Thereafter, the user becomes able to obtain a print result as originally intended by the application data by performing the following operations, for example. Specifically, the user converts the application data into an environment non-dependent file referred to as a PDF format using a personal computer (for example, used for creating the application data) self-possesses, according to the conversion procedure to the PDF format acquired from the above-described website. Moreover, the user subjects the converted PDF file to the print job by the office direct print function. As a result, a print result as the original is obtained, that is, a print result that the original font is applied as it is obtained.

Figure 33:
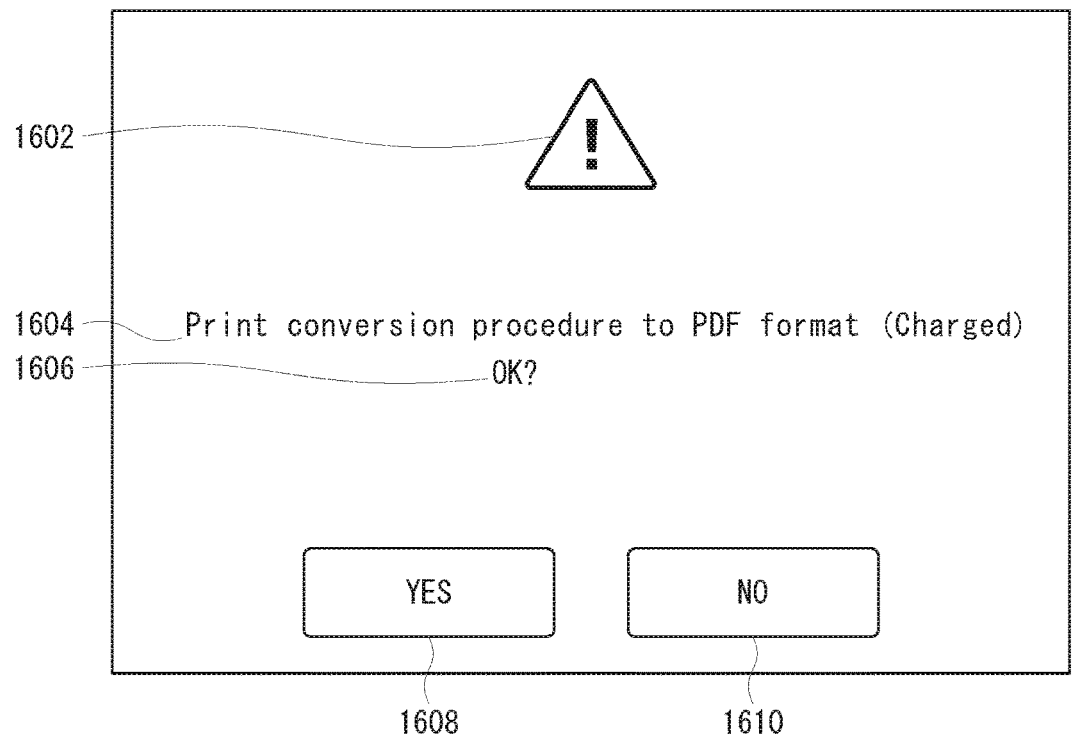
FIG. 33 is an illustrative view showing a conversion procedure print confirmation screen in the sixth embodiment.

Returning to FIG. 31, for example, if the "print conversion procedure" key 1412 in the second message screen 1400 is operated. Then, instead of the second message screen 1400, a conversion procedure print confirmation screen 1600 as shown in FIG. 33 is displayed on the display 28b. In addition, the conversion procedure print confirmation screen 1600 is also a modal dialog, for example.

In the conversion procedure print confirmation screen 1600 shown in this FIG. 33, an alert mark 1602 as same as that in the first message screen 1100a is arranged in an upper center thereof. Then, there is arranged an appropriate character string 1604 including a content that informs the user that a procedure manual that describes the procedure for converting the application data into the PDF format will be printed with charge. Moreover, below the character string 1604, there is arranged an appropriate character string 1606 including a content that asks the user whether a print of the procedure manual may be executed. Furthermore, below the character string 1606, that is, in a lower portion of the conversion procedure print confirmation screen 1600, two operation keys 1608 and 1610 are arranged. The operation key 1608 of the left side out of the two operation keys 1608 and 1610 is a "yes" key for instructing execution of print of the procedure manual. Then, the operation key 1610 of the right side operation is a "no" key for instructing to shelve execution of print of the procedure manual.

If the "yes" key 1608 is operated in such a conversion procedure print confirmation screen 1600, the procedure manual is printed, specifically, print processing of the procedure manual is performed by the image forming unit 16. Moreover, the conversion procedure print confirmation screen 1600 is deleted, and after the above-described end message screen is displayed on the display 28b during a predetermined period of time, the above-described home screen is displayed on the display 28b. In addition, although the procedure for converting the application data into the PDF format is described in the procedure manual as described above, in addition thereto, appropriate annotation including a content that informs the user that the original print result can be obtained by subjecting the converted PDF file to the print job by the office direct print function of the multifunction peripheral 10 are also posted.

The user becomes able to obtain a print result as originally intended by the application data by performing the following operations, for example, after printing the procedure manual. Specifically, the user converts the application data into an environment non-dependent file referred to as a PDF format using a personal computer (for example, used for creating the application data) self-possesses, according to the conversion procedure to the PDF format described in the procedure manual. Moreover, the user subjects the converted PDF file to the print job by the office direct print function. As a result, a print result as the original is obtained, that is, a print result that the original font is applied as it is obtained.

On the other hand, if the "no" key 1610 is operated in the conversion procedure print confirmation screen 1600, the conversion procedure print confirmation screen 1600 is deleted without printing the procedure manual. Then, the above-described home screen is displayed on the display 28b after the above-described end message screen is displayed on the display 28b during a predetermined period of time.

Returning to FIG. 31 again, the "cancel" key 1400 in the second message screen 1400 is operated, the second message screen 4100 is deleted. Then, the above-described data acquisition screen is displayed on the display 28b. As a result, the user can appropriately redo the previous operations including selecting and acquiring further application data from the proper data source such as the external storage medium 50, etc.

Figure 34:
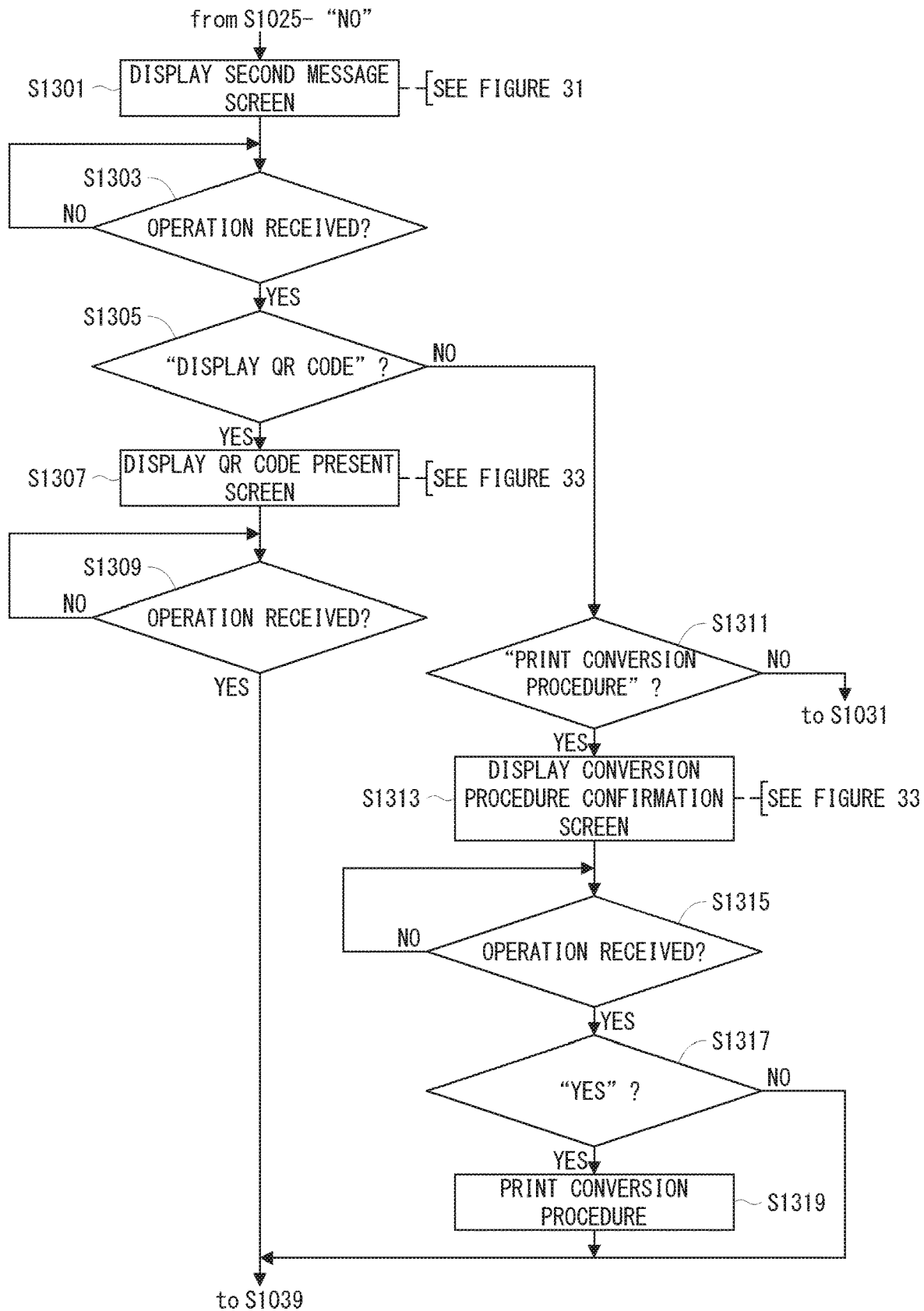
FIG. 34 is a flowchart showing a part of a font substitution control task in the sixth embodiment.

In the sixth embodiment, the CPU 20a also executes the font substitution control task, and in the sixth embodiment, steps S1301-S1319 as shown in FIG. 34 are added to the font substitution control task. Specifically, when the operation received in the step S1013 is not an operation to the "print using network system" key 1116 in the first message screen 1100a in the above-described step S1025 (FIG. 27)", that is, when it is an operation to the "further method" key 1120 (S1025: "NO"), the CPU 20a advances the process to the step S1301 rather than to the step S1031.

In this step S1301, the CPU 20a displays, instead of the first message screen 1100a, the second message screen 1400 on the display 28b. Then, the CPU 20a advances the process to a step S1303.

In the step S1303, the CPU 20a waits for the second message screen 1400 to receive an operation (S1303: "NO"). Then, if the second message screen 1400 receives an operation (S1303: "YES"), the CPU 20a advances the process to a step S1305.

In the step S1305, the CPU 20a determines whether the operation received in the step S1303 is an operation to the "display QR code" key 1410. Here, when the operation received in the step S1303 is an operation to the "display QR code" key 1410 (S1305: "YES"), the CPU 20a advances the process to a step S1307. On the other hand, when the operation received in the step S1303 is not an operation to the "display QR code" key 1410 (S1305: "NO"), the CPU 20a advances the process to a step S1311 described later.

In the step S1307, the CPU 20a displays, instead of the second message screen 1400, a QR code presentation screen 1500 on the display 28b. Then, the CPU 20a advances the process to the step S1309.

In the step S1309, the CPU 20a waits for the QR code presentation screen 1500 to receive an operation, tha is, waits for an operation to the "OK" key 1510 (S1309: "NO"). Then, if an operation to the "OK" key 1510 is received in the QR code presentation screen 1500 (S309: "YES"), the CPU 20a advances the process to the above-described step S1039 (FIG. 27) in order to end the office direct print function.

In contrast, when advancing the process to the step S1311 from the step S1305, the CPU 20a determines, in the step S1311, whether the operation received in the step S1303 is an operation to the "print conversion procedure" key 1412 in the second message screen 1400. Here, when the operation received in the step S1303 is an operation to the "print conversion procedure" key 1412 (S1311: "YES"), the CPU 20a advances the process to a step S1313. On the other hand, when the operation received in the step S1303 is not an operation to the "print conversion procedure" key 1412, that is, it is an operation to the "cancel" key 1414 (S1311: "NO"), the CPU 20a advances the process to the above-described step S1031 (FIG. 27) in order to display the above-described data acquisition screen on the display 28b.

In the step S1313, the CPU 20a displays, instead of the second message screen 1400, the conversion procedure print confirmation screen 1600 on the display 28b. Then, the CPU 20a advances the process to a step S1315.

In the step S1315, the CPU 20a waits for the conversion procedure print confirmation screen 1600 to receive an operation (S1315: "NO"). Then, if the conversion procedure print confirmation screen 1600 receives an operation (S1315: "YES"), the CPU 20a advances the process to a step S1317.

In the step S1317, the CPU 20a determines whether the operation received in the step S1315 is an operation to the "yes" key 1608 in the conversion procedure print confirmation screen 1600. Here, when the operation received in the step S1315 is an operation to the "yes" key 1608 (S1317: "YES"), the CPU 20a advances the process to the step S1319. On the other hand, when the operation received in the step S1315 is not an operation to the "yes" key 1608, that is, it is an operation to the "no" key 1610 (S1317: "NO"), the CPU 20*a* advances the process to the above-described step S1039 (FIG. 27) in order to end the office direct print function.

In the step S1319, the CPU 20*a* controls the image forming unit 16 so as to execute the print processing of the procedure manual by the image processing unit 14. Moreover, the CPU 20*a* advances the process to the above-described step S1039 (FIG. 27) in order to end the office direct print function.

Thus, according to the sixth embodiment, in addition to the first option and the second option both described above, the third option that the procedure for converting the application data into the PDF format is guided is presented to the user. Specifically, the options to the user increase, and become much more useful for the user.

In addition, in the sixth embodiment, the proper processing executed by the CPU 20*a* in response to reception of the operation to the "further method" key 1120 of the first message screen 1100*a* is an example of third processing of the embodiment according to the present invention. Then, the procedure that converts the application data into the PDF format, which is posted in the above-described website or described in the procedure manual, is an example of first procedure of the embodiment according to the present invention. Moreover, the personal computer (for example, the user possesses) used in converting the application data into the PDF format is an example of a first device of the embodiment according to the present invention.

Furthermore, an option that the "display QR code" key 1410 is operated in the second message screen 1400 in the sixth embodiment is an example of a first guidance option of the embodiment according to the present invention. Then, the website in the sixth embodiment is an example of a first website of the embodiment according to the present invention. Moreover, information for accessing the website, that is, information (URL information) included in the QR code 1508 of the QR code presentation screen 1500 (see FIG. 32) is an example of first access information of the embodiment according to the present invention. Then, in order to display the QR code presentation screen 1500 on the display 28*b*, the step S1307 (see FIG. 34) in the font substitution control task is executed by the CPU 20*a*, and the step S1307 is an example of first guidance processing of the embodiment according to the present invention.

Moreover, the option that the "print conversion procedure" key 1412 is operated in the second message screen 1400 in the sixth embodiment is an example of a second guidance option of the embodiment according to the present invention. Then, the information described on the procedure manual of the sixth embodiment, especially the information on the procedure for converting the application data into the PDF format is an example of first procedure information of the embodiment according to the present invention. Moreover, the step S1319 in the font substitution control task is executed by the CPU 20*a* in order to print the procedure manual, and the step S1319 is an example of second guidance processing of the embodiment according to the present invention.

Seventh Embodiment

Next, the seventh embodiment according to the present invention will be described.

The seventh embodiment is premised on the sixth embodiment, for example. Moreover, considering that the application data cannot be converted into the predetermined format data in a state of being applied with the original font by the management server 70, a countermeasure is taken in the seventh embodiment. For example, if the application data is created by excessively old application software and thus the font included in the application data does not exist even in the font database 70*a* of the management server 70, the application data cannot be properly converted into the predetermined format data with the management server 70. In such a case, the seventh embodiment is very useful.

Figure 35:
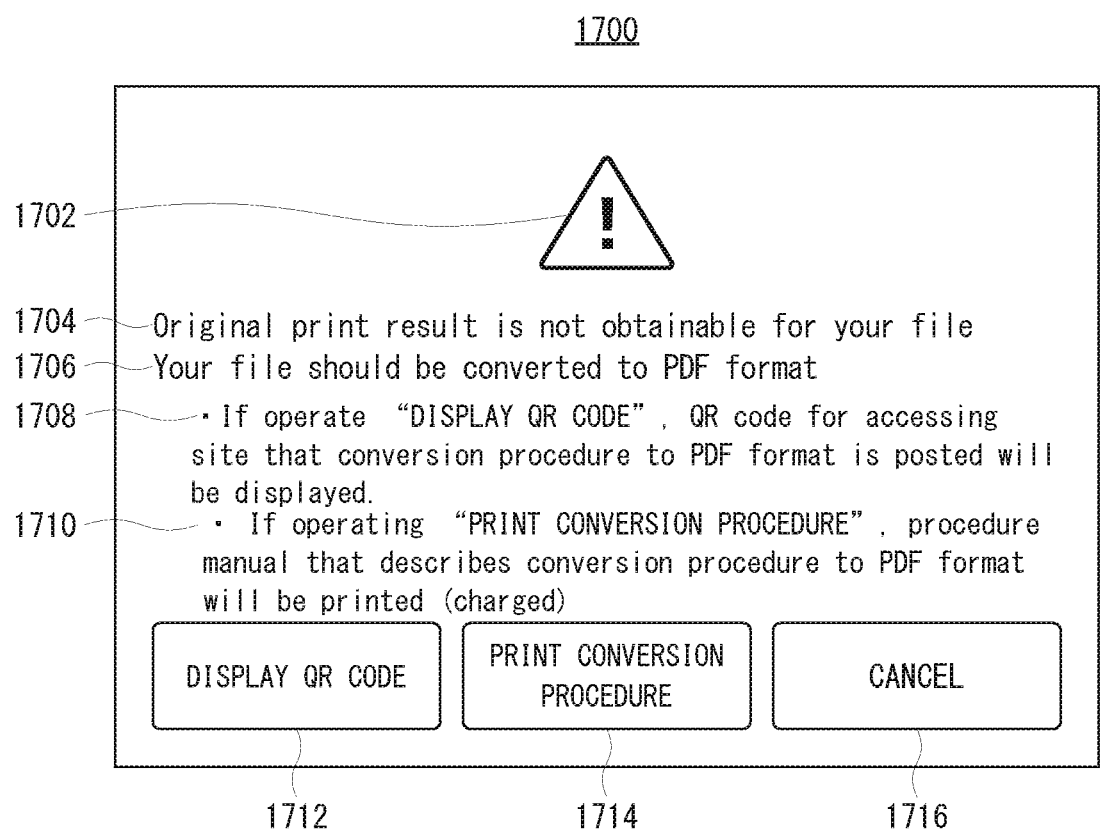
FIG. 35 is an illustrative view showing a third message screen in a seventh embodiment according to the present invention.

Specifically, when the font included in application data does not exist even in the font database 70*a* of the management server 70, the application data cannot be properly converted into the predetermined format data with the management server 70 as described above. In this case, the management server 70 notifies to the multifunction peripheral 10 that it is impossible to respond to the support request, as a reply to the support request from the multifunction peripheral 10. If receiving such a reply, a third message screen 1700 as shown in FIG. 35 is displayed on the display 28*b* of the multifunction peripheral 10.

In this third message screen 1700, an alert mark 1702 as the same as that of the first message screen 1100*a* etc. is arranged in an upper center thereof. Then, an appropriate character string 1704 including a content that informs the user that an original print result cannot be obtained by the application data (file) of the user (your) is arranged below the alert mark 1702. Moreover, an appropriate character string 1706 including a content that informs the user that it is necessary to convert the application data of the user into a PDF format (in order to obtain an original print result) is arranged below the character string 1704.

Furthermore, a character string 1708 including a suitable explanatory note on a "display QR code" key 1712 described later is arranged below the character string 1706. This character string 1708 includes a content that informs the user that a QR code for accessing to a website not shown that describes procedure for converting the application data of the user into the PDF format is displayed when the "display QR code" key 1712 is operated. Moreover, a character string 1710 including a suitable explanatory note on a "print conversion procedure" key 1714 described later is arranged below the character string 1708. This character string 1710 includes a content that informs the user that if the "print conversion procedure" key 1714 is operated, a procedure manual that describes the conversion procedure to the PDF format is printed with a charge.

Moreover, below the character string 1710, that is, in a lower portion of the third message screen 1700, three operation keys 1712, 1714 and 1716 are arranged side-by-side. The operation key 1712 at the left end out of the three operation keys 1712, 1714 and 1716 is a "display QR code" key corresponding to the character string 1708. Then, the operation key 1714 in the center is a "print conversion procedure" key corresponding to the character string 1710. The operation key 1716 at the right end is a "cancel" key for instructing to shelve execution of the print job, that is, for ending an operation in the third message screen 1700, and thus, instructing to transit to a state where the above-described data acquisition screen is displayed on the display 28*b*.

If the "display QR code" key 1712 is operated in this third message screen 1100, instead of the third message screen 1700, the QR code presentation screen 1500 described above is displayed on the display 28*b*. As a result, the user can obtain information for accessing the above-described website, and thus, recognize the procedure for converting the application data into the PDF format.

Then, for example, if the "print conversion procedure" key 1714 in the third message screen 1700 is operated, instead of the third message screen 1700, a conversion procedure print confirmation screen 1600 described above (FIG. 33) is displayed on the display 28*b*. As a result, the user can instruct print the above-described procedure manual, and thus, recognize the procedure for converting the application data into the PDF format.

Furthermore, if the "cancel" key 1716 in the third message screen 1700 is operated, the third message screen 1700 is deleted. Then, the above-described data acquisition screen is displayed on the display 28*b*. As a result, the user can appropriately redo the previous operations including selecting and acquiring further application data from the proper data source such as the external storage medium 50, etc.

Figure 36:
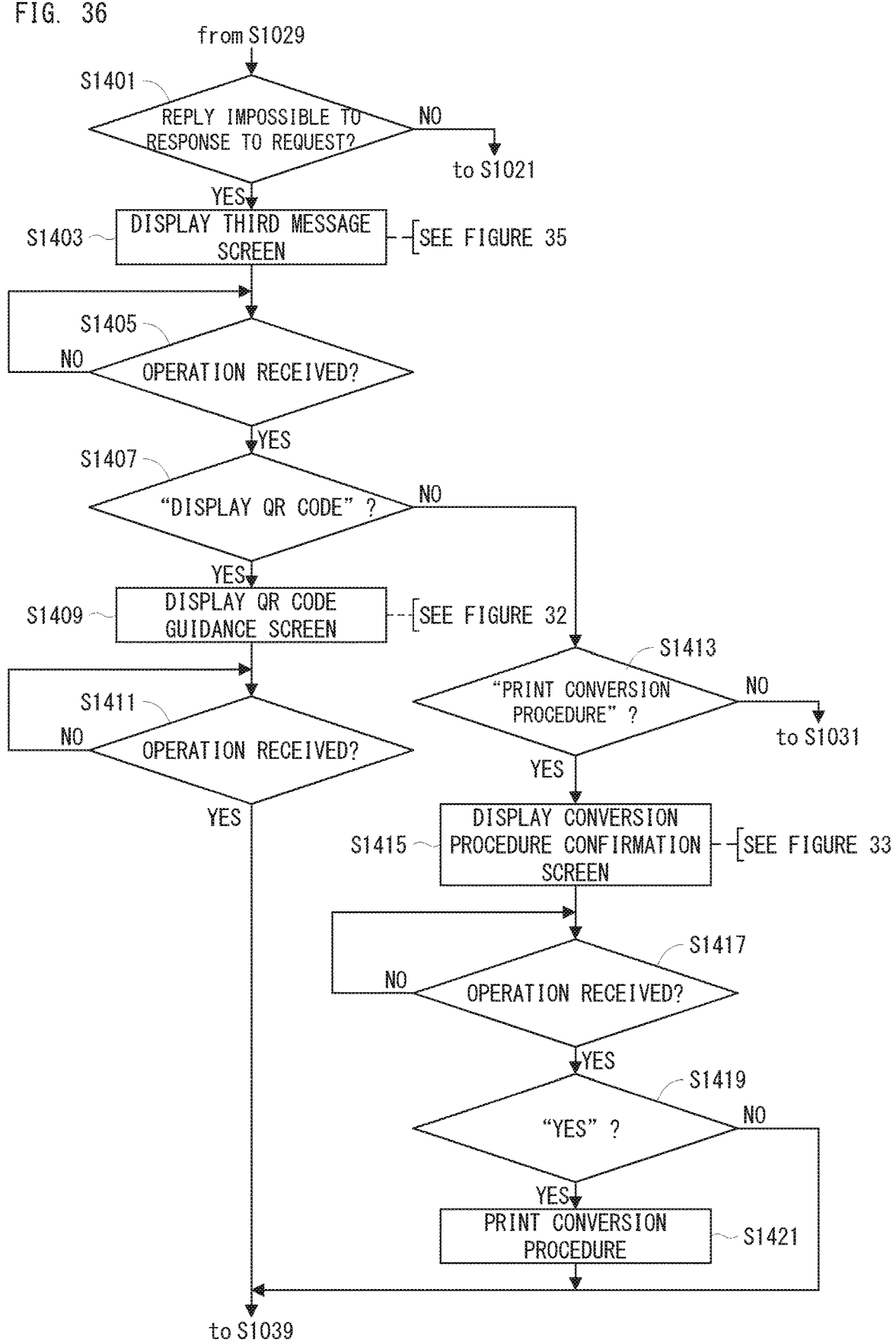
FIG. 36 is a flowchart showing a part of a font substitution control task in the seventh embodiment.

Also in such a seventh embodiment, the CPU 20*a* executes the font substitution control task, and in the seventh embodiment, steps S1401-S1421 as shown in FIG. 36 are added to the font substitution control task. Specifically, the CPU 20*a* advances the process to a step S1401 after executing the network use processing in the above-described step S1029 (FIG. 27).

In this step S1401, the CPU 20*a* determines whether the reply received from the management server 70 by the network use processing in the step S1029, that is, the reply from the management server 70 to the support request from the multifunction peripheral 10 indicates that it is impossible to respond the support request. Here, when the reply from the management server 70 indicates that it is possible to respond to the support request from the multifunction peripheral 10, that is, when the reply includes the PDF file as printable data (S1401: "NO"), the CPU 20*a* advances the process to the step S1021. On the other hand, when the reply from the management server 70 indicates that it is impossible to respond to the support request from the multifunction peripheral 10, that is, no printable data is included in the reply (S1401: "YES"), the CPU 20*a* advances the process to a step S1403.

In the step S1403, the CPU 20*a* displays, instead of the above-described during communication message screen, the third message screen 1700 on the display 28*b*. Then, the CPU 20*a* advances the process to a step S1405.

In the step S1405, the CPU 20*a* waits for the third message screen 1700 to receive an operation (S1405: "NO"). Then, if the third message screen 1700 receives an operation (S1405: "YES"), the CPU 20*a* advances the process to a step S1407.

In the step S1407, the CPU 20*a* determines whether the operation received in the step S1405 is an operation to the "display QR code" key 1712 in the third message screen 1700. Here, when the operation received in the step S1405 is an operation to the "display QR code" key 1712 (S1407: "YES"), the CPU advances the process to a step S1409. On the other hand, when the operation received in the step S1405 is not an operation to the "display QR code" key 1712 (S1407: "NO"), the CPU advances the process to a step S1413 described later.

In the step S1409, the CPU 20*a* displays, instead of the third message screen 1700, the QR code presentation screen 1500 on the display 28*b*. Then, the CPU 20*a* advances the process to a step S1411.

In the step S1411, the CPU 20*a* waits for the QR code presentation screen 1500 to receive an operation, that is, waits for an operation to the "OK" key 1510 (S1411: "NO"). Then, if an operation to the "OK" key 1510 is received in the QR code presentation screen 1500 (S1411: "YES"), the CPU 20*a* advances the process to the step S1039 (see FIG. 27) in order to end the office direct print function.

In contrast, when advancing the process to the step S1413 from the step S1407, the CPU 20*a* determines, in the step S1413, whether the operation received in the step S1405 is an operation to the "print conversion procedure" key 1714 in the third message screen 1400. Here, when the operation received in the step S1405 is an operation to the "print conversion procedure" key 1714 (S1413: "YES"), the CPU 20*a* advances the process to a step S1415. On the other hand, when the operation received in the step S1405 is not an operation to the "print conversion procedure" key 1714, that is, it is an operation to the "cancel" key 1716 (S1413: "NO"), the CPU 20*a* advances the process to the above-described step S1031 (see FIG. 27) in order to display the above-described data acquisition screen on the display 28*b*.

In the step S1415, the CPU 20*a* displays, instead of the third message screen 1700, the conversion procedure print confirmation screen 1600 on the display 28*b*. Then, the CPU 20*a* advances the process to the step S1417.

In the step S1417, the CPU 20*a* waits for the conversion procedure print confirmation screen 1600 to receive an operation (S1417: "NO"). Then, if the conversion procedure print confirmation screen 1600 receives an operation (S1417: "YES"), the CPU 20*a* advances the process to a step S1419.

In the step S1419, the CPU 20*a* determines whether the operation received in the step S1417 is an operation to the "yes" key 1608 in the conversion procedure print confirmation screen 1600. Here, when the operation received in the step S1417 is an operation to the "yes" key 1608, the CPU 20*a* advances the process to a step S1421. On the other hand, when the operation received in the step S1417 is not an operation to the "yes" key 1608, that is, it is an operation to the "no" key 1610, (S1419: "NO"), the CPU 20*a* advances the process to the step S1039 in order to end the office direct print function.

In the step S1421, the CPU 20*a* controls the image forming unit 16 so as to execute the print processing of the procedure manual by the image processing unit 14. Moreover, the CPU 20*a* advances the process to the step S1039 in order to end the office direct print function.

Thus, according to the seventh embodiment, the third message screen 1700 is displayed when the font included in the application data does not exist even in the font database 70*a* of the management server 70 either, that is, when the application data cannot be properly converted into the predetermined format data with the management server 70. As a result, the procedure for converting the application data into the PDF format is guided to the user. This is also very useful for the user.

In addition, the CPU 20*a* that executes the steps S1401-S1421 in the font substitution control task (FIG. 36) in the seventh embodiment, especially, the CPU 20*a* that executes the step S1403 to display the third message screen 1700 on the display 28*b* constitutes an example of a guidance unit of the embodiment according to the present invention in cooperation with the display 28*b*. Then, the procedure for converting the application data into the PDF format described in the above-described website or the procedure manual is also an example of second procedure of the embodiment according to the present invention. Moreover, the personal computer (for example, the user possesses) used in converting the application data into the PDF format is also an example of a second device of the embodiment according to the present invention.

Furthermore, the option that the "display QR code" key 1712 is operated in the third message screen 1700 in the seventh embodiment is an example of a third guidance option of the embodiment according to the present invention. Then, the website in the seventh embodiment is also an example of a second website of the embodiment according to the present invention. Moreover, the information for accessing the website, that is, the information (URL information) included in the QR code 1508 of the QR code presentation screen 1500 (see FIG. 32) is also an example of second access information of the embodiment according to the present invention. Then, in order to display the QR code presentation screen 1500 on the display 28*b*, the step S1409 (see FIG. 36) in the font substitution control task is executed by the CPU 20*a*, and the step S1409 is an example of third guidance processing of the embodiment according to the present invention.

Additionally, the option the "print conversion procedure" key 1714 is operated in the third message screen 1700 in the seventh embodiment is an example of a fourth guidance option of the embodiment according to the present invention. Then, the information described on the procedure manual in the seventh embodiment, especially, the information on the procedure for converting the application into the PDF format is also an example of second procedure information of the embodiment according to the present invention. Moreover, the step S1421 in the font substitution control task is executed by the CPU 20*a* in order to print a point description, and the step S1421 is an example of fourth guidance processing of the embodiment according to the present invention.

Eighth Embodiment

Next, the eighth embodiment according to the present invention will be described.

The eighth embodiment is premised on the seventh embodiment, for example. Moreover, considering that the appearance of the print result including the character may be excessively corrupted dependent on a position and a size of the character to which the substitute font is applied when substituting the non-installed font included in the application data, a countermeasure is taken in the eighth embodiment.

Figure 37:
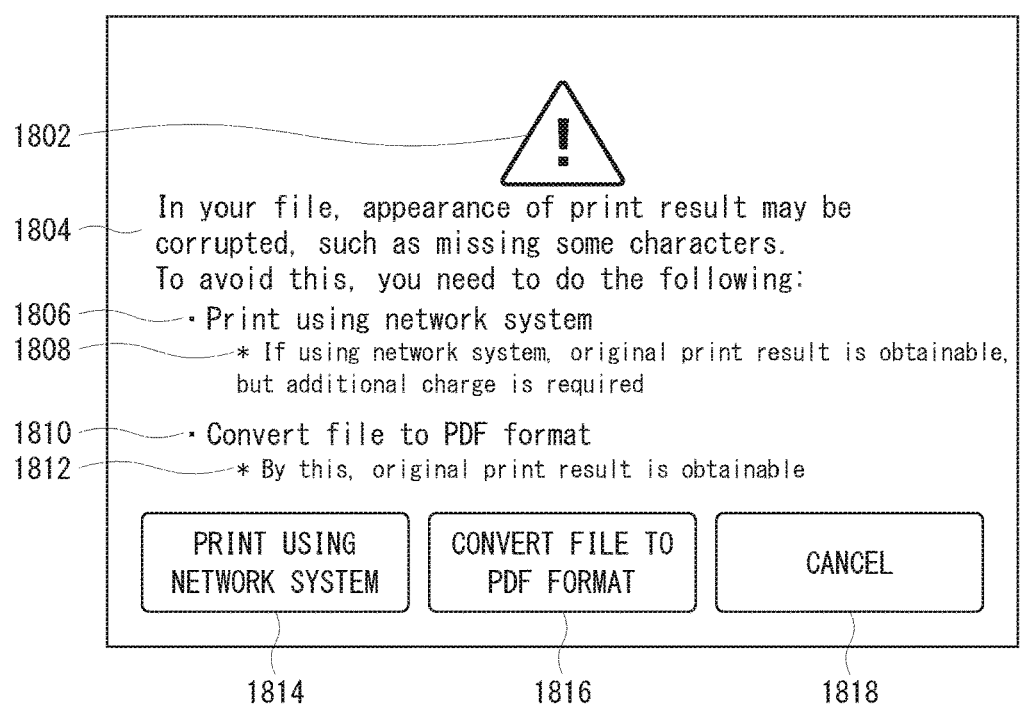
FIG. 37 is an illustrative view showing a fourth message screen in a eighth embodiment according to the present invention.

Specifically, in the eighth embodiment, it is determined when substituting for the non-installed font included in the application data, whether an object (characters, photographs, figures (graphs), etc.) included in the print result may protrude from the print range due to the substitution of the non-installed font. This determination is performed in generating the above-described preview image by the image processing unit 14, strictly based on the image data after rasterization. Here, when there is no possibility that the object included in the print result protrudes from the print range, the above-described preview screen 1200 (FIG. 24) is displayed on the display 28*b*. On the other hand, when the object included in the print result may protrude from the print range, a fourth message screen 1800 as shown in FIG. 37 is displayed on the display 28*b*.

In this fourth message screen 1800, an alert mark 1802 as the same as that of the first message screen 1100*a* etc. is arranged in an upper center thereof. Then, there is arranged below the alert mark 1802, an appropriate character string 1804 including a content that informs the user that the appearance of the print result is corrupted, such as missing some characters by the application data (file) of the user (your), and a content that informs the user that predetermined processing is required in order to avoid such corruption. Then, there is arranged below the character string 1804, an appropriate character string 1806 that simply indicates that the print job is executed using the above-described network system, which is one of the predetermined processing referred to here. Moreover, an appropriate character string 1808 that is indicative of a note at the time of executing the print job using the network system is arranged below the character string 1806. This character string 1808 includes a content that informs the user that an additional charge is required while capable of obtaining an original print result if the network system is used.

Furthermore, there is arranged below the character string 1808 an appropriate character string 1810 that simply indicates that the application data (file) is converted into the PDF format, which is predetermined processing different from indicated by the above-described character string 1806 is arranged. Moreover, an appropriate character string 1812 that is indicative of a note on converting the application data into the PDF format is arranged below the character string 1810. This character string 1812 includes a content that informs the user that the original print result can be obtained also by a method of converting the application data into the PDF format.

Moreover, below the character string 1812, that is, in a lower portion of the fourth message screen 1800, there are arranged three operation keys 1814, 1816 and 1818 side-by-side. The operation key 1814 at the left end out of these three operation keys 1814, 1816 and 1818 is a "print using network system" key for instructing to execute the print job with using the network, that is, corresponding to the character string 1806. The operation key 1816 in the center is a "convert file to PDF format" key for instructing to convert the application data into the PDF format, that is, corresponding to the character string 1810. The operation key 1818 at the right end is a "cancel" key for instructing to shelve execution of the print job, that is, for ending an operation in the fourth message screen 1800.

It is supposed that the "print using network system" key 1814 is operated in this fourth message screen 1800. Then, processing the same as the time of the "print using network system" key 1114 in the above-described first message screen 1100*a* is executed. Moreover, when the "convert file to PDF format" key 1816 is operated 1816 in the fourth message screen 1800, processing the same as the time that "further method" key 1120 in the first message screen 1100*a* is operated executed. Furthermore, when the "cancel" key 1818 in the fourth message screen 1800 is operated, the fourth message screen 1800 is deleted, and the execution of the print job is shelved and then, the above-described data acquisition screen is displayed on the display 28*b*.

Figure 38:
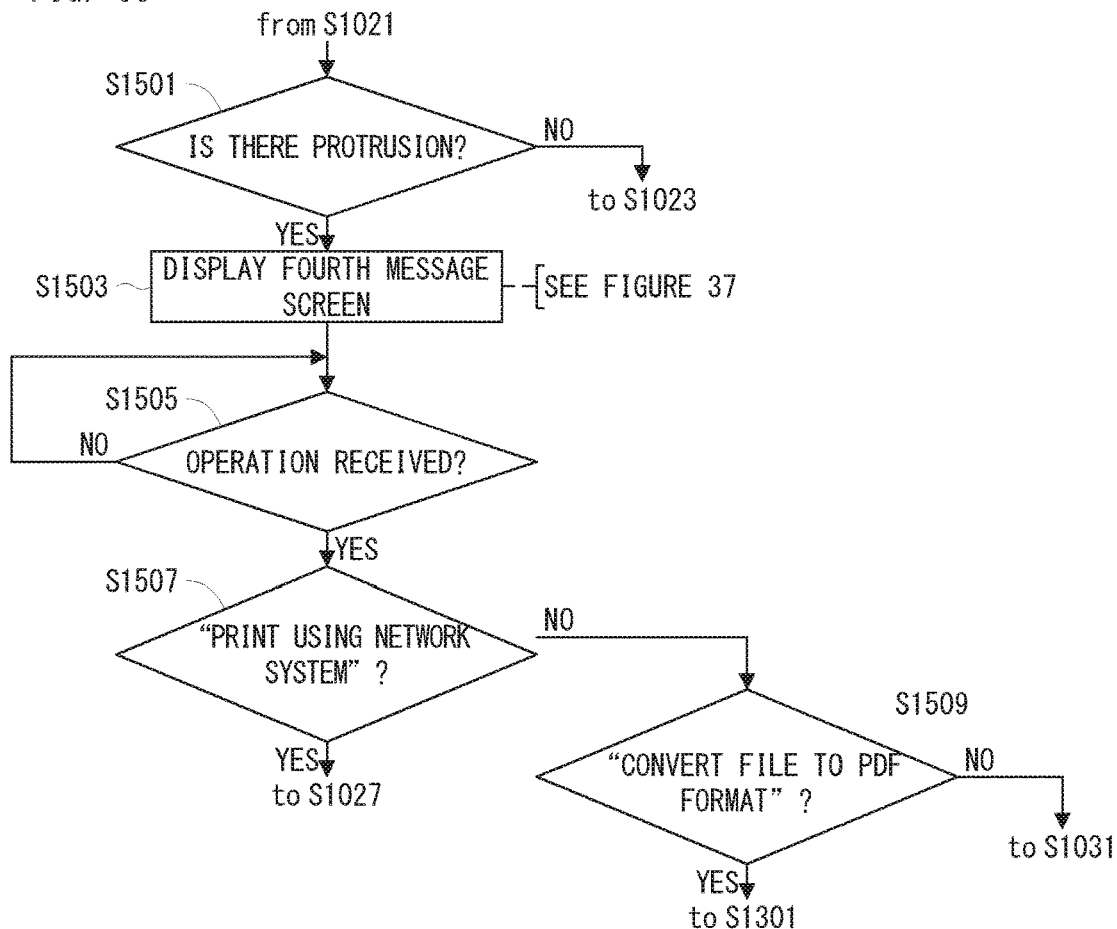
FIG. 38 is a flowchart showing a part of a font substitution control task in the eighth embodiment.

Also in such an eighth embodiment, although the CPU 20*a* executes the font substitution control task, and in the eighth embodiment, steps S1501-S1509 as shown in FIG. 38 are added to the font substitution control task. Specifically, in the above-described step S1021 (FIG. 27), the CPU 20*a* advances the process to the step S1501 after generating preview image data.

In this step S1501, the CPU 20*a* determines, based on the above-described image data after rasterization used for generation of a preview image, whether the object included in the print result may protrude from the print range. Here, when the object included in the print result may not protrude from the print range (S1501: "NO"), the CPU 20*a* advances the process to the step S1023 in order to display the preview screen 1200 on the display 28*b*. On the other hand, when the object included in the print result may protrude from the print range (S1501: "YES"), the CPU 20*a* advances the process to a step S1503.

In the step S1503, the CPU 20*a* displays the fourth message screen 1800 on the display 28*b*, strictly after deleting the during processing message screen, the CPU 20*a* displays the fourth message screen 1800 on the display 28*b*. Then, the CPU 20*a* advances the process to a step S1505.

In the step S1505, the CPU 20*a* waits for the fourth message screen 1800 to receive an operation (S1505: "NO"). Then, if the fourth message screen 1800 receives an operation (S1505: "YES"), the CPU 20*a* advances the process to a step S1507.

In the step S1507, the CPU 20*a* determines whether the operation received in the step S1505 is an operation to the "print using network system" key 1814 in the fourth message screen 1800. Here, when the operation received in the step S1505 is an operation to the key "print using network system" 1814 (S1507: "YES"), the CPU 20*a* advances the process to the step S1027. As a result, the network use processing of the step S1029 is executed, after the fourth message screen 1800 is deleted and the during communication message screen is displayed on the display 28*b*. On the other hand, when the operation received in the step S1505 is an operation to the "print using network system" key 1814 (S1507: "NO"), the CPU 20*a* advances the process to a step S1509.

In the step S1509, the CPU 20*a* determines whether the operation received in the step S1505 is an operation to the "convert file to PDF format" key 1816 in the fourth message screen 1800. Here, when the operation received in the step S1505 is an operation to the "convert file to PDF format" key 1816 (S1509: "YES"), the CPU 20*a* advances the process to the step S1301 (see FIG. 34). As a result, instead of the fourth message screen 1800, the second message screen 1400 (see FIG. 31) is displayed on the display 28*b*. On the other hand, when the operation received in the step S1505 is not an operation to the "convert file to PDF format" key 1816, that is, it is an operation to the "cancel" key 1818 (S1509: "NO"), the CPU 20*a* advances the process to the step S1031 in order to display the above-described data acquisition screen on the display 28*b*.

Thus, according to the eighth embodiment, when the object included in the print result may protrude from the print range due to substitution of the non-installed font with the substitute font, the fourth message screen 1800 is displayed on the display 28*b*. Specifically, the option that prevents the object included in the print result from protruding from the print range, in other word, the option for enabling execution of the print job in a state where the original font is applied as it, is presented to the user. This is also very useful for a user.

In addition, the CPU 20*a* that executes the step S1501 in the font substitution control task in the eighth embodiment is an example of a third protrusion judgement unit of the embodiment according to the present invention. Then, the option that the "print using network system" key 1814 is operated is presented to the user by displaying the fourth message screen 1800, and the option of operating the "print using network system" key 1814 is an example of a fourth option of the embodiment according to the present invention. Moreover, the option that the "convert file to PDF format" key 1816 is operated is presented to the user by displaying the fourth message screen 1800, and the option of operating the "convert file to PDF format" key 1816 is an example of a fifth option of the embodiment according to the present invention. Then, the CPU 20*a* that displays the fourth message screen 1800 on the display 28*b* by executing the step S1503 in the font substitution control task constitutes an example of a presentation unit of the embodiment according to the present invention in cooperation with the display 28*b*.

Furthermore, also in the eighth embodiment, the procedure that converts the application data into the PDF format with a personal computer is described at the above-described website or in the procedure manual. The personal computer referred to here is an example of a third device of the embodiment according to the present invention, and the procedure that converts the application data into the PDF format with the personal computer is an example of third procedure of the embodiment according to the present invention.

Moreover, proper processing executed in response to reception of the operation to the "convert file to PDF form" key 1816 is an example of fifth processing of the embodiment according to the present invention. Then, the CPU 20*a* that executes proper processing in response to execution of proper processing as the fifth processing or reception of the operation to "print using network system" key 1814 in the fourth message screen 1800 is an example of a processing executing unit of the embodiment according to the present invention.

Moreover, if the "convert file to PDF format" key 1816 in the fourth message screen 1800 is operated, as described above, processing the same as the time that "further method" key 1120 in the first message screen 1100*a* is operated is executed, that is, the second message screen 1400 is displayed on the display 28*b*. The option that the "display QR code" key 1410 is operated in this second message screen 1400 is an example of a fifth guidance option of the embodiment according to the present invention. Then, the above-described website in the eighth embodiment is also an example of a third website of the embodiment according to the present invention. Moreover, the information for accessing the website concerned, that is, the information included in QR Code 1508 of the QR code presentation screen 1500 (see FIG. 22)(URL information) is also an example of the third access information of the embodiment according to the present invention. Then, also in the eighth embodiment, the step S1409 (see FIG. 36) in the font substitution control task is executed by the CPU 20*a* in order to display the QR code presentation screen 1500 on the display 28*b*, and the step S1409 is an example of fifth guidance processing of the embodiment according to the present invention. Moreover, the option that the "print conversion procedure" key 1412 is operated in the second message screen 1400 in the eighth embodiment is an example of a sixth guidance option of the embodiment according to the present invention. Then, the information described on the procedure manual in the eighth embodiment, especially the information on the procedure for converting the application data into the PDF format is also an example of third procedure information of the embodiment according to the present invention. Moreover, also in the eighth embodiment, the step S1421 in the font substitution control task is executed by the CPU 20*a* in order to print the procedure manual, and the step S1421 is an example of sixth guidance processing embodiment according to the present invention.

Other Applicable Examples

Each of the above-described embodiments is a specific example of the present invention, and does not have an intention to limit a technical scope of the present invention. The present invention is applicable also to aspects other than each of these embodiments.

For example, in each of the embodiments, the application data to be subjected to the print job by the office direct print function seems to be a single page of data, but this is not the case. The present invention is applicable regardless of whether the application data is data for a single page or data for a plurality of pages.

The screens including the attention message screen 100 are not limited to the configurations described above, including their respective designs. For example, in the font substitution guidance screen 200, the drop-down list 206 is adopted as an operator for selecting a substitute font, but proper widgets other than the drop-down list 206, such as a radio button, may be adopted. Moreover, for example, as for the first message screen 1100 shown in FIG. 23, an appropriate character string including an explanatory note on the "cancel" key 1118 may be arranged.

Furthermore, an appropriate screen explaining the procedure for converting the application data into the PDF format may be displayed on the display 28b instead of or in addition to the QR code presentation screen 1500 shown in FIG. 32 being displayed on the display 28b. Moreover, the procedure for converting the application data into the PDF format may be output in an auditory manner such as a sound. Moreover, a screen explaining the procedure for converting the application data into the PDF format may be displayed on a portable information device the user possesses.

Similarly, an appropriate screen explaining the procedure for converting the application data into the PDF format may be displayed on the display 28b instead of or in addition to displaying the conversion procedure print confirmation screen 1600 shown in FIG. 33. Moreover, the procedure for converting the application data into the PDF format may be output with a sound.

Then, the above-described procedure manual may be printed by the above-described paper-pieces printer, for example, rather than the image forming unit 16.

Additionally, for example, the seventh embodiment is premised on the sixth embodiment, but not limited to this, and the fifth embodiment may be premised. Moreover, for example, the eighth embodiment is premised on the seventh embodiment, but not limited to this, and the fifth embodiment or the sixth embodiment may be premised. That is, respective embodiments may be combined appropriately.

Furthermore, in the above-described embodiments, the multifunction peripheral 10 that is installed in public spaces such as a convenience store and a supermarket, but not limited to this. For example, the present invention is applicable also to the multifunction peripheral 10 installed in an office. Then, the present invention is applicable not only to the multifunction peripheral 10 but an image forming apparatus other than the multifunction-peripheral 10d, such as a printer.

Moreover, the present invention can be provided not only in a form of an image forming apparatus but also in a form of a method of controlling the image forming apparatus. Moreover, the present invention can be provided also in a form of a system such as an image forming system comprising an image forming apparatus and a support apparatus.

Then, the present invention can be provided also in a form of a non-transitory computer-readable storage medium storing a control program for an image forming apparatus. In this case, the control program stored in the storage medium is read by a computer of the image forming apparatus, and the control program is executed by the computer, whereby an image forming apparatus the same or similar to the present invention can be implemented. As a storage medium referred to here, there is a portable medium such as the above-described external storage medium 50. Moreover, instead of a portable medium, an embedded (built-in) medium incorporated in an image forming apparatus, such as a ROM or a hard disk drive can also be adopted as the storage medium referred to here.

Although the present invention has been described and illustrated in detail, it is clearly understood that the same is by way of illustration and example only and is not to be taken by way of limitation, the spirit and scope of the present invention being limited only by the terms of the appended claims. Furthermore, it is intended that the scope of the present invention covers all modifications within the meaning and range of equivalency of the claims.

What is claimed is:

1. An image forming apparatus that is capable of receiving an input of application data created by predetermined application software or application data created by compatible software that is compatible with the predetermined application software, and executing a print job based on the application data, comprising:
    a font data storage unit that is stored with font data on multiple types of fonts;
    a font determination unit that determines whether a non-installed font different from the multiple types of fonts is included in application data;
    a presentation unit that presents a plurality of options to a user;
    an operation reception unit that receives an operation by the user; and
    a processing execution unit that executes processing according to the operation received by the operation reception unit, wherein
    the presentation unit presents, when it is determined by the font determination unit that a non-installed font is included in the application data, a first option that a print job is executed after the non-installed font is substituted with a substitute font corresponding to the non-installed font out of multiple types of fonts and a second option that a print job is executed in a state where the non-installed font is applied,
    the processing execution unit executes first processing according to the first option when an operation for selecting the first option is received by the operation reception unit and second processing according to the second option when an operation for selecting the second option is received by the operation reception unit, the second processing including transmission processing that transmits the application data to an external support device that is capable of converting the application data into predetermined format data that a print job can be executed in a state where the non-installed font is applied.

2. The image forming apparatus according to claim 1, wherein the second processing further includes reception processing that receives the predetermined format data converted by the support device from the support device.

3. The image forming apparatus according to claim 1, further comprising a second preview image display unit that displays a second preview image indicating an image that is expected to be formed by the print job.

4. The image forming apparatus according to claim 1, wherein the presentation unit presents a third option that guides to the user first procedure for converting the application data into predetermined format data by a first device that is an external device other than the support device, in addition to the first option and the second option, and the processing execution unit executes third processing according to the third option when an operation for selecting the third option is received by the operation reception unit.

5. The image forming apparatus according to claim 4, wherein
the processing execution unit makes the presentation unit present, as the third processing, a first guidance option that outputs first access information for accessing a first website that the first procedure is disclosed and a second guidance option that outputs first procedure information indicative of the first procedure, and
the processing execution unit executes first guidance processing according to the first guidance option when an operation for selecting the first guidance option is received by the operation reception unit and second guidance processing according to the second guidance option when an operation for selecting the second guidance option is received by the operation reception unit.

6. The image forming apparatus according to claim 1, further comprising a guidance unit that guides to the user second procedure for converting the application data into the predetermined format data by a further external device different from the support device when it is impossible to convert the application data into predetermined format data by the support device.

7. The image forming apparatus according to claim 6, wherein
the guidance unit makes the presentation unit present a third guidance option that outputs second access information for accessing a second website that discloses the second procedure and a fourth guidance option that outputs second procedure indicative of the second procedure,
the guidance unit makes the processing execution unit execute third guidance processing according to the third guidance option when an operation for selecting the third guidance option is received by the operation reception unit, and the guidance unit makes the processing execution unit execute fourth guidance processing according to the fourth guidance option when an operation for selecting the fourth guidance option is received by the operation reception unit, so that the guidance unit guides the second procedure to the user.

8. The image forming apparatus according to claim 1, further comprising a third protrusion judgement unit that judges, when an operation for selecting the above-described first option is received by the operation reception unit and prior to the first processing is executed by the processing execution unit, whether an object included in the application data may protrude from a print range by the print job based on the application data, wherein
the presentation unit presents, when it is judged by the third judgement unit that the object may protrude from the print range, a fourth option that executes the print job in a state where the non-installed font is applied and a fifth option is an option that guides to the user third procedure for converting the application data into the predetermined format data by a third device that is an external device different from the support device,
the processing execution unit executes the second processing when an operation for selecting the fourth option is received by the operation reception unit and fifth processing according to the fifth option when an operation for selecting the fifth option is received by the operation reception unit, and
the processing execution unit executes the first processing when the operation for selecting the first selection option is received by the operation reception unit and it is judged by the third protrusion judgement unit that the object may not protrude from the print range, and shelves the first processing when it is judged by the third protrusion judgement unit that the object may protrude from the print range.

9. The image forming apparatus according to claim 8, wherein
the processing execution unit makes the presentation unit present a fifth guidance option that outputs third access information for accessing a third website that discloses third procedure is output and a sixth guidance option that outputs third procedure information indicative of the third procedure, and
the processing execution unit executes fifth guidance processing according to the fifth guidance option when an operation for selecting the fifth guidance option is received by the operation reception unit and sixth guidance processing according to the sixth guidance option when an operation for selecting the sixth guidance option is received by the operation reception unit.

10. An image forming system, comprising: the image forming apparatus recited in the claim 1; and the support device.

11. A control method of an image forming apparatus is capable of receiving an input of application data created by predetermined application software or application data created by compatible software that is compatible with the predetermined application software, and executing a print job based on the application data, and comprises a font data storage unit that is stored with font data on multiple types of fonts, comprising steps of:
a font determination step that determines whether a non-installed font different from the multiple types of fonts is included in application data;
a presentation step that presents a plurality of options to a user;
an operation reception step that receives an operation by the user; and
a processing execution step that executes processing according to an operation received in the operation reception step, wherein
the presentation step presents, when it is determined in the font determination step that a non-installed font is included in the application data, a first option that a print job is executed after the non-installed font is substituted with a substitute font corresponding to the non-installed font out of multiple types of fonts that are installed in the image forming apparatus and a second option that executes a print job in a state where the non-installed font is applied,
the processing execution step executes first processing according to the first option when an operation for selecting the first option is received in the operation reception step second processing according to the second option when an operation for selecting the second option is received in the operation reception step,
the second processing includes transmission processing that transmits the application data to an external support port device capable of converting the application data into predetermined format data that a print job can be executed in a state where the non-installed font is applied.

\* \* \* \* \*